US 012373786B2

(12) United States Patent
Sahoo et al.

(10) Patent No.: US 12,373,786 B2
(45) Date of Patent: Jul. 29, 2025

(54) SYSTEMS AND METHODS FOR DYNAMIC SKU GENERATION IN DISTRIBUTION MANAGEMENT

(71) Applicant: Ingram Micro Inc., Irvine, CA (US)

(72) Inventors: Sanjib Sahoo, Naperville, IL (US); Jim Annes, Porter Ranch, CA (US); Dhamodharan Pathervellai, Naperville, IL (US)

(73) Assignee: INGRAM MICRO INC., Irvine, CA (US)

( * ) Notice: Subject to any disclaimer, the term of this patent is extended or adjusted under 35 U.S.C. 154(b) by 0 days.

(21) Appl. No.: 18/768,998

(22) Filed: Jul. 10, 2024

(65) Prior Publication Data

US 2025/0021933 A1    Jan. 16, 2025

Related U.S. Application Data

(60) Provisional application No. 63/515,076, filed on Jul. 21, 2023, provisional application No. 63/513,078, filed on Jul. 11, 2023.

(51) Int. Cl.
*G06Q 10/087* (2023.01)
*G06Q 30/0201* (2023.01)
*G06Q 30/0601* (2023.01)

(52) U.S. Cl.
CPC ....... *G06Q 10/087* (2013.01); *G06Q 30/0206* (2013.01); *G06Q 30/0603* (2013.01); *G06Q 30/0633* (2013.01)

(58) Field of Classification Search
None
See application file for complete search history.

(56) References Cited

U.S. PATENT DOCUMENTS 5,870,717 A * 2/1999 Wiecha .............. G06Q 30/0643
                                                                   705/26.81
5,870,719 A    2/1999 Maritzen et al.
(Continued)

FOREIGN PATENT DOCUMENTS

JP    2001005863 A    1/2001
JP    2004538542 A    12/2004
(Continued)

OTHER PUBLICATIONS

Basumallick C., "What is a Software Engine? Types, Applications, and Importance," Spiceworks, Oct. 7, 2022, 16 Pages, Retrieved from URL: https://www.spiceworks.com/tech/devops/articles/what-is-software-engine/.

(Continued)

*Primary Examiner* — Fateh M Obaid
(74) *Attorney, Agent, or Firm* — ICE MILLER LLP

(57) ABSTRACT

System and methods are provided for automated SKU management. Embodiments include a user interface for receiving diverse catalog files, a Catalog Transformation module, a Real-Time Data Mesh (RTDM) module, a Master Data Governance (MDG) module, a Global Data Repository (GDR), and a Search Platform. The Catalog Transformation module, through iterative learning, transforms catalog files to a standard format and predicts categorization and attribute mapping. The RTDM module is configured to perform real-time data exchange. The MDG module validates the transformed catalogs. The GDR stores validated catalogs. Embodiments can include a Dynamic SKU Creation module and a Global Pricing Engine for real-time pricing. Embodiments improve data accuracy and SKU management, facilitating integrated order processing and fulfillment.

20 Claims, 30 Drawing Sheets

(56) References Cited

U.S. PATENT DOCUMENTS

| | | |
|---|---|---|
| 6,385,543 B1 | 5/2002 | Keiser |
| 7,188,075 B1 | 3/2007 | Smirnov |
| 7,548,612 B2 | 6/2009 | Weissman et al. |
| 7,698,170 B1* | 4/2010 | Darr .................. G06Q 30/02 705/26.35 |
| 7,720,720 B1* | 5/2010 | Sharma ............... G06Q 30/02 705/26.7 |
| 8,452,636 B1 | 5/2013 | Verastigui |
| 8,781,882 B1* | 7/2014 | Arboletti ......... G06Q 10/0639 705/7.41 |
| 9,958,291 B1* | 5/2018 | Shunturov ........... G01D 4/002 |
| 10,410,125 B1 | 9/2019 | Finkelstein et al. |
| 10,417,728 B1 | 9/2019 | Yoggi et al. |
| 10,489,845 B2 | 11/2019 | Mullakkara Azhuvath et al. |
| 10,664,799 B2 | 5/2020 | O'Brien et al. |
| 10,718,632 B1* | 7/2020 | Platt .................. H04L 67/125 |
| 10,757,154 B1 | 8/2020 | Jacobs et al. |
| 11,062,319 B1 | 7/2021 | Hecht et al. |
| 11,074,643 B1 | 7/2021 | Ellithorpe et al. |
| 11,113,770 B1 | 9/2021 | Magoon et al. |
| 11,163,846 B1 | 11/2021 | Kadayam et al. |
| 11,860,613 B2 | 1/2024 | Maury et al. |
| 12,107,934 B1 | 10/2024 | Bailey et al. |
| 2002/0015480 A1 | 2/2002 | Daswani et al. |
| 2002/0091991 A1* | 7/2002 | Castro .................... G06F 9/06 717/106 |
| 2002/0120521 A1 | 8/2002 | Forth et al. |
| 2003/0028451 A1 | 2/2003 | Ananian |
| 2003/0055700 A1 | 3/2003 | Hoffman et al. |
| 2003/0070061 A1 | 4/2003 | Wong et al. |
| 2003/0130863 A1 | 7/2003 | Grey et al. |
| 2003/0144858 A1 | 7/2003 | Jain et al. |
| 2003/0171962 A1 | 9/2003 | Hirth et al. |
| 2004/0044565 A1 | 3/2004 | Kumar et al. |
| 2004/0054800 A1* | 3/2004 | Shah ................. H04L 67/1095 709/240 |
| 2004/0267674 A1 | 12/2004 | Feng et al. |
| 2005/0049938 A1* | 3/2005 | Venkiteswaran ...... G06Q 30/06 705/26.8 |
| 2005/0163951 A1 | 7/2005 | Oles et al. |
| 2007/0033569 A1 | 2/2007 | Davidson et al. |
| 2007/0050229 A1* | 3/2007 | Tatro .................. G06Q 50/12 705/15 |
| 2008/0133569 A1* | 6/2008 | Vu .................. H04N 21/435 707/999.102 |
| 2009/0177714 A1* | 7/2009 | Obermeyer ........ G06Q 30/0603 707/999.203 |
| 2012/0036089 A1 | 2/2012 | Washington et al. |
| 2012/0226573 A1 | 9/2012 | Zakas et al. |
| 2012/0323933 A1 | 12/2012 | He et al. |
| 2014/0025529 A1 | 1/2014 | Honeycutt et al. |
| 2014/0052840 A1 | 2/2014 | Shukla |
| 2014/0222641 A1 | 8/2014 | Køber et al. |
| 2014/0279254 A1 | 9/2014 | Hastman |
| 2014/0322678 A1* | 10/2014 | Briancon ........... G09B 19/0092 434/127 |
| 2014/0324549 A1 | 10/2014 | Chelap et al. |
| 2014/0358723 A1 | 12/2014 | Ballaro et al. |
| 2015/0189014 A1 | 7/2015 | Grunenberger |
| 2015/0286645 A1 | 10/2015 | Sinha et al. |
| 2016/0092474 A1 | 3/2016 | Stojanovic et al. |
| 2016/0232624 A1* | 8/2016 | Goldberg ............... G06Q 30/08 |
| 2016/0335345 A1 | 11/2016 | Wang |
| 2017/0006135 A1 | 1/2017 | Siebel et al. |
| 2017/0060641 A1 | 3/2017 | Ramaswamy et al. |
| 2017/0091327 A1 | 3/2017 | Bostic et al. |
| 2017/0134516 A1 | 5/2017 | Gutman et al. |
| 2017/0193527 A1 | 7/2017 | Backer et al. |
| 2017/0255903 A1 | 9/2017 | Chowdhry et al. |
| 2017/0364796 A1 | 12/2017 | Wiebe et al. |
| 2018/0136992 A1 | 5/2018 | Solinger et al. |
| 2018/0143975 A1 | 5/2018 | Casal et al. |
| 2018/0343491 A1* | 11/2018 | Loheide ............. H04N 21/2393 |
| 2019/0095992 A1 | 3/2019 | Soh |
| 2019/0102753 A1 | 4/2019 | Harrison et al. |
| 2019/0149725 A1* | 5/2019 | Adato .................. H04N 1/00 348/158 |
| 2019/0215424 A1* | 7/2019 | Adato .................. G06T 7/521 |
| 2019/0220914 A1 | 7/2019 | Flannery et al. |
| 2019/0243836 A1 | 8/2019 | Nanda et al. |
| 2020/0279200 A1 | 9/2020 | Makhija et al. |
| 2020/0320095 A1 | 10/2020 | Haase et al. |
| 2020/0327252 A1 | 10/2020 | McFall et al. |
| 2020/0394398 A1 | 12/2020 | Pamarthi et al. |
| 2020/0394455 A1 | 12/2020 | Lee et al. |
| 2021/0012358 A1 | 1/2021 | Wical |
| 2021/0065294 A1 | 3/2021 | Trevathan et al. |
| 2021/0144250 A1 | 5/2021 | Mahar et al. |
| 2021/0158259 A1 | 5/2021 | Evans et al. |
| 2021/0166251 A1 | 6/2021 | Mehmanpazir et al. |
| 2021/0182746 A1 | 6/2021 | Muthukrishnan |
| 2021/0241299 A1 | 8/2021 | Ramini et al. |
| 2021/0241301 A1 | 8/2021 | Christensen et al. |
| 2021/0248151 A1 | 8/2021 | Kadel et al. |
| 2021/0269244 A1* | 9/2021 | Ahmann ............... B65G 1/0492 |
| 2021/0334871 A1* | 10/2021 | Quinn ................. G06Q 30/0603 |
| 2021/0350429 A1 | 11/2021 | Gangadarappa |
| 2021/0357959 A1 | 11/2021 | Cella et al. |
| 2022/0067085 A1 | 3/2022 | Nihas et al. |
| 2022/0114509 A1 | 4/2022 | Pinheiro et al. |
| 2022/0122134 A1 | 4/2022 | Hoffman et al. |
| 2022/0129803 A1 | 4/2022 | Bikumala et al. |
| 2022/0197246 A1 | 6/2022 | Cella et al. |
| 2022/0245008 A1 | 8/2022 | Deljavan Farshi et al. |
| 2022/0383400 A1 | 12/2022 | Wade et al. |
| 2022/0405775 A1 | 12/2022 | Siebel et al. |
| 2023/0075794 A1 | 3/2023 | Muttreja |
| 2023/0091441 A1 | 3/2023 | Go et al. |
| 2023/0206251 A1 | 6/2023 | Acharya et al. |
| 2023/0222536 A1 | 7/2023 | Hoang et al. |
| 2023/0367696 A1 | 11/2023 | Liu et al. |
| 2023/0418980 A1 | 12/2023 | Abrougui et al. |
| 2023/0419387 A1 | 12/2023 | Ballaro et al. |
| 2024/0144170 A1 | 5/2024 | Kim et al. |
| 2024/0184650 A1 | 6/2024 | O'Kelley et al. |
| 2024/0311853 A1 | 9/2024 | Rendahl et al. |
| 2024/0370902 A1 | 11/2024 | Miglani |

FOREIGN PATENT DOCUMENTS

| | | |
|---|---|---|
| JP | 2020514860 A | 5/2020 |
| JP | 2020514860 A5 | 2/2021 |
| KR | 20070057806 A | 6/2007 |
| WO | 02063530 A2 | 8/2002 |
| WO | 2006026673 A2 | 3/2006 |
| WO | 2018116252 A1 | 6/2018 |
| WO | 2018231850 A1 | 12/2018 |
| WO | 2024233674 A2 | 11/2024 |

OTHER PUBLICATIONS

Biswas S., et al., "A Proposed Architecture for Big Data Driven Supply Chain Analytics," ICFAI University Press (IUP) Journal of Supply Chain Management, 2016, vol. 13, No. 3, pp. 7-34 (24 Pages), Retrieved from URL: https://arxiv.org/abs/1705.04958.

European Search Report for European Application No. 24186933, dated Nov. 25, 2024, 09 Pages.

Extended European Search Report for European Application No. 24184819.1, dated Nov. 27, 2024, 10 Pages.

Extended European Search Report for European Application No. 24187943.6, dated Nov. 19, 2024, 8 Pages.

Extended European Search Report for European Application No. 24187967.5, dated Nov. 25, 2024, 7 Pages.

Holzer D., et al., "Developing a Framework for Linking Design Intelligence from Multiple Professions in the AEC Industry," CAAD Futures, 2007, pp. 303-316, Retrieved from URL: ttps://link.springer.com/content/pdf/10.1007/978-1-4020-6528-6_23.pdf.

Machado I.A., et al., "Data Mesh: Concepts and Principles of a Paradigm Shift in Data Architectures," Procedia Computer Science, Amsterdam, NL, Jan. 10, 2022, vol. 196, pp. 263-271, DOI:

(56) References Cited

OTHER PUBLICATIONS 10.1016/j.procs.2021.12.013, ISSN: 1877-0509, XP093050267, Retrieved from URL: https://www.sciencedirect.com/science/article/pii/S1877050921022365.
Office Action for Japanese Application No. 2024-101794, dated Sep. 13, 2024, 21 Pages.
Office Action for Japanese Application No. 2024-108629, dated Oct. 29, 2024, 10 Pages.
PCMAG: "Engine," Definition, Dec. 1, 2020, 1 Page, Snapshot Via Archive. org, Retrieved from URL: https://www.pcemag.com/encyclopedia/term/engine.
Suzumura K., "Latest IT Trends by Field: Inter-System Integration: The Key Lies in the Use of Open Technology, Performance and Reliability," Nikkei Computer, Japan, Nikkei BP, Sep. 23, 2002, No. 557, pp. 28-29 (6 Pages), ISSN 0285-4619.
Techopedia: "Engine," Definition, Oct. 19, 2012, 12 Pages, Retrieved from URL: https://www.techopedia.com/definition/24155/engine.
Wikipedia: "Data Mesh," May 25, 2023, 3 Pages, XP093199672, Retrieved from URL: https://en.Wikipedia.org/w/index.php?title=Data_mesholdid=1157039904.
Office Action issued in Japanese Patent Application No. 2024-112073 mailed Oct. 15, 2024, 4 pgs.
English Translation of the Office Action issued in Japanese Patent Application No. 2024-112073 mailed Oct. 15, 2024, 5 pgs.
European Search Report issued in European Patent Application No. 24187967 mailed Nov. 25, 2024, 8 pgs.

\* cited by examiner

SYSTEMS AND METHODS FOR DYNAMIC SKU GENERATION IN DISTRIBUTION MANAGEMENT

CROSS-REFERENCE TO RELATED APPLICATIONS

This application claims the benefit of U.S. Provisional Patent Application No. 63/513,078, filed Jul. 11, 2023 and U.S. Provisional Patent Application No. 63/515,076, filed Jul. 21, 2023. Each of these applications is incorporated herein by reference in its entirety.

BACKGROUND

The disclosed embodiments relate to aspects of a user interface (UI) method and system. The traditional global distribution industry faces a multitude of challenges that encompass supply chain management, inventory control, stock keeping unit (SKU) management, compliance, and evolving consumer expectations.

Managing SKUs traditionally presents numerous challenges, impeding operational efficiency, scalability, and customer satisfaction. Existing platforms and systems struggle to address these complexities, leading to manual processes, data inconsistencies, and limited scalability. The IT distribution industry faces a primary challenge in handling the vast number and diversity of SKUs. The processes of creating, categorizing, and pricing these SKUs involve numerous manual interventions, leading to errors, inconsistencies, and delays. Such inefficiencies not only consume valuable time and resources but also hinder the effective handling of a large volume of SKUs. Additionally, collaborating with vendors poses further difficulties, as existing platforms lack streamlined processes and self-service capabilities, leading to delays, inaccuracies, and inefficiencies when synchronizing product data across platforms.

Scalability stands as another critical challenge for IT distribution platforms, particularly when dealing with a wide range of vendors offering a diverse array of products, including long-tail and mid-tail suppliers. Maintaining data integrity and ensuring quality control in SKU management are paramount. However, current platforms often fall short in guaranteeing accurate and consistent data, resulting in internal operational challenges and subpar customer experiences. Inconsistent categorization, attribute mapping errors, and data discrepancies hinder customers from finding and comparing products due to inconsistent and inaccurate data across platforms.

Pricing SKUs adds to the complexity, considering factors such as special pricing, margin rules, and real-time market conditions. Existing platforms lack efficient mechanisms for computing and updating prices, leading to delays, inaccuracies, and missed revenue opportunities. Manual price management processes exacerbate the problem, resulting in inefficiencies, errors, and potential revenue loss. Moreover, the concept of virtual SKUs complicates SKU management in the IT distribution domain. Virtual SKUs represent products available for customer viewing but not yet fully processed. Transitioning virtual SKUs into actual SKUs upon order placement requires integration, real-time updates, and efficient back-end processes. However, current systems struggle to handle this dynamic transition smoothly, leading to delays, data inconsistencies, and unsatisfactory customer experiences.

Additionally, legacy systems and outdated architectures introduce significant operational challenges. Inadequate handling of diverse data formats, types, and legacy systems employed by different vendors further adds complexity and impedes integration. Consequently, SKU management platforms struggle to efficiently process, transform, and validate vendor catalogs, resulting in delays, errors, and operational inefficiencies. There is a need for a real-time and synchronous solution that can efficiently handle SKU generation, pricing, and integration with vendors.

BRIEF SUMMARY OF THE DISCLOSED EMBODIMENTS

The global distribution industry is at a critical juncture, grappling with an array of challenges that span across multiple domains. These obstacles, which are both historical and emergent, necessitate the crafting of innovative and effective solutions to steer the sector towards growth and efficiency. Among these numerous hurdles, the most significant ones reside within the realms of supply chain management, inventory and compliance issues, SKU management, the shift to direct-to-consumer models, and the rapidly evolving consumer expectations and behavior.

In some embodiments, a real-time and synchronous solution is provided for SKU generation in a distribution platform. The management of distribution and supply chain, traditionally not within a distributor's core competencies, creates inefficiencies compounded by difficulties in handling disruptions. Market trends are increasingly favoring direct-to-consumer models, necessitating a reevaluation of existing business strategies to align with this dynamic shift.

Inventory management poses another quintessential problem in distribution. The mercurial nature of market demands requires flexible distribution and supply chain, and the complexity of the distribution model including cloud services, XaaS (everything as a service), etc., adds an additional complexity to the process.

Further complicating matters are the issues surrounding product localization, varying distribution rights, and managing global SKUs. Reconciling data from diverse OEMs, each with unique systems and processes, introduces complexity, while adhering to the requirements of different jurisdictions adds inefficiencies and potential errors.

Also, the evolving landscape of consumer behavior and expectations necessitates the creation of user-friendly, efficient, and configurable platforms for technology purchasing. Traditional customer interaction methods are being replaced by the demand for real-time and synchronous interactions, prompting companies to evolve and meet these new customer expectations.

Despite these formidable challenges, the distribution model retains numerous advantages over direct-to-consumer models. Specialized entities handling logistics and distribution allow manufacturers to focus on their core competencies. Extensive distribution networks reach customers in remote areas, and value-added services enhance the overall customer experience. For these benefits to materialize and for the distribution model to remain effective, embracing real-time and synchronous SKU generation solutions is imperative. Addressing current pain points and streamlining processes through cutting-edge technologies ensures the sustainability and competitiveness of the distribution model.

Single Pane of Glass

The Single Pane of Glass (SPoG) disclosed herein can provide a comprehensive solution that aims to address these challenges with a real-time and synchronous approach to SKU generation. It offers a holistic, user-friendly, and efficient platform that streamlines the distribution process, enhancing supply chain visibility, and inventory management.

Incorporating real-time tracking and analytics, SPoG delivers valuable insights into inventory levels and the status of goods, ensuring that supply chain management is handled efficiently in real-time. By integrating multiple communication channels into a single platform, SPoG emulates a direct consumer channel into a distribution platform, enhancing the overall customer experience through synchronous interactions.

SPoG's advanced forecasting capabilities provide an innovative solution for improved inventory management through real-time predictive analytics. These insights highlight demand trends, guiding companies in mitigating the risks of stockouts or overstocks in real-time.

The platform also includes a real-time global distribution database, enabling distributors to stay abreast of the latest international laws and regulations in real-time. This feature reduces manual tracking burdens and facilitates compliant cross-border transactions without delays.

SKU management and product localization are streamlined through SPoG's integration of data from various OEMs into a single platform, ensuring data consistency and reducing potential errors in real-time. The platform's highly configurable and user-friendly interface aligns with the expectations of the new generation of tech buyers, providing real-time access to technology.

SPoG's flexible and scalable design ensures it remains a future-proof solution, adapting to changing business needs without significant infrastructural changes, thus meeting the demand for real-time and synchronous interactions in the dynamic distribution landscape.

Real-Time Data Mesh (RTDM)

Implementing a Real-Time Data Mesh (RTDM) in the platform offers an innovative solution to address the need for real-time and synchronous SKU generation capabilities in the distribution domain. RTDM provides a distributed data architecture enabling real-time data availability across multiple sources and touchpoints.

RTDM empowers predictive analytics, offering a real-time solution for efficient inventory control. Insights into demand trends help companies manage inventory in sync with market fluctuations, reducing risks of overstocking or stockouts in real-time.

Global distribution and compliance is facilitated through the real-time updates provided by RTDM, ensuring distributors remain current with compliance, as well as changes and SKU management in real-time. The platform significantly reduces manual tracking burdens, facilitating integrated cross-border transactions without delays.

RTDM's integration of data from various OEMs simplifies SKU management and localization, enhancing data consistency and reducing error potential, further aligning with the demand for synchronous interactions in real-time.

Enhancing customer experience, RTDM consolidates and synchronizes data in an intuitive interface, allowing easy access and real-time transactions of technology, meeting the expectations of the consumer-driven generation of technology partners.

Advantages of SPoG and RTDM Integration

Integrating the SPoG UI platform with the RTDM enables a consolidated, holistic approach to technical challenges encountered in a distribution platform with an emphasis on real-time and synchronous SKU generation. SPoG leverages RTDM's capabilities to enhance supply chain visibility, streamline inventory management, ensure compliance, simplify SKU management, and deliver a superior customer experience.

RTDM's real-time tracking and analytics significantly improve SPoG's ability to manage the supply chain and inventory effectively, providing accurate and up-to-date information for informed decision-making in real-time.

Integrating SPoG with RTDM ensures synchronous data consistency, reducing errors and latency in SKU management and pricing. The centralized platform for managing data from various OEMs simplifies product localization, aligning with market needs in real-time. This integration highlights the groundbreaking aspect of real-time/synchronous SKU generation in the distribution platform, setting it apart as a novel and innovative solution for the evolving global market.

DETAILED DESCRIPTION OF THE DISCLOSED EMBODIMENTS

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 1:
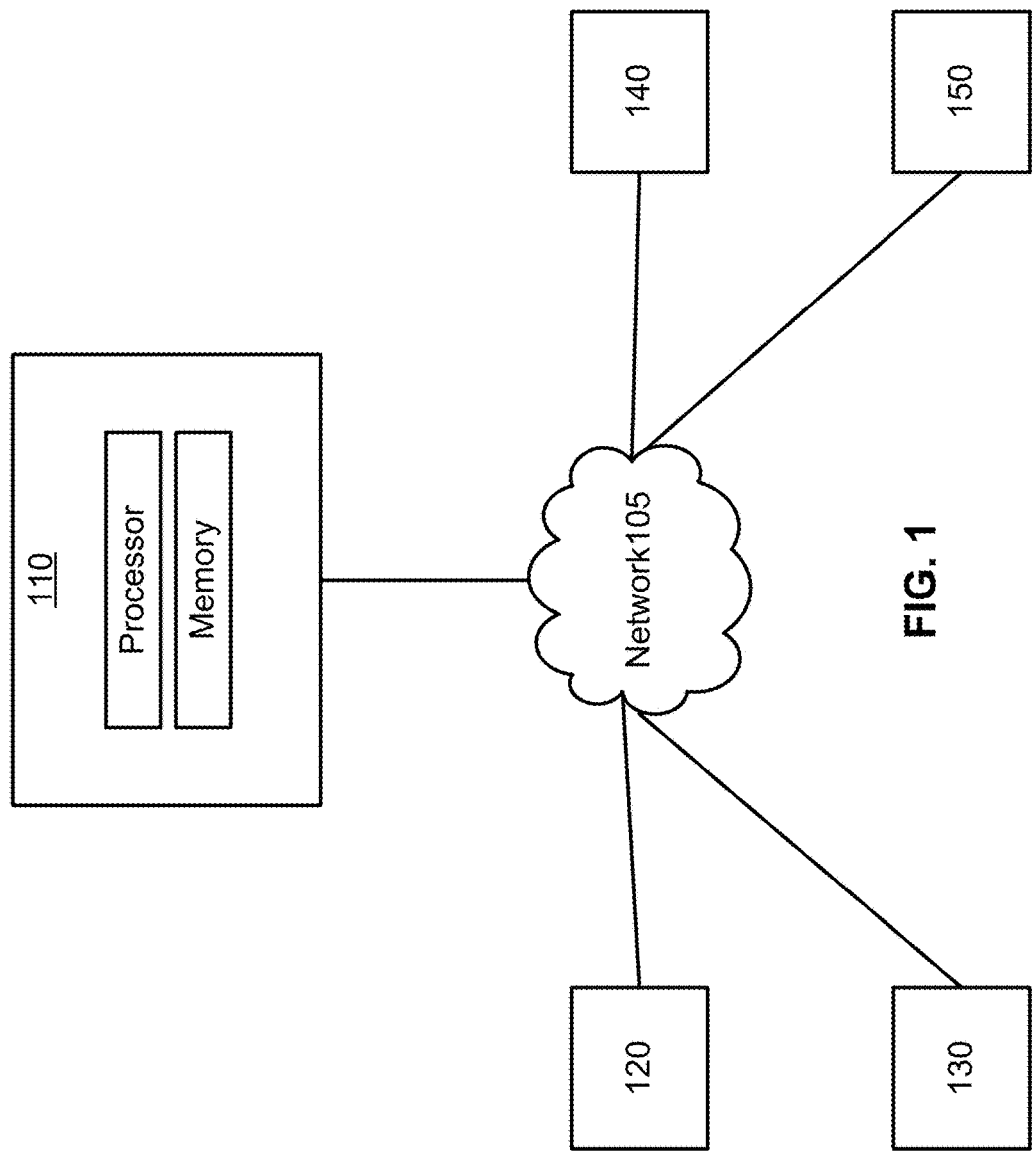
FIG. 1 illustrates one embodiment of an operating environment of a distribution platform, referred to as System in this embodiment.

FIG. 1 illustrates an operating environment 100 of a distribution platform, referred to as system 110 in this embodiment. System 110 operates within the context of an information technology (IT) distribution model, catering to various stakeholders such as customers 120, end customers 130, vendors 140, resellers 150, and other entities involved in the distribution process. This operating environment encompasses a broad range of characteristics and dynamics that contribute to the success and efficiency of the distribution platform.

Customers 120 within the operating environment of system 110 represent businesses or individuals seeking IT solutions to meet their specific needs. These customers may require a diverse range of IT products such as hardware components, software applications, networking equipment, or cloud-based services. System 110 provides customers with a user-friendly interface, allowing them to browse, search, and select the most suitable IT solutions based on their requirements. Customers can also access real-time data and analytics through system 110, empowering them to make informed decisions and optimize their IT infrastructure.

End customers 130 are the ultimate beneficiaries of the IT solutions provided by system 110. They may include businesses or individuals who utilize IT products and services to enhance their operations, productivity, or daily activities. End customers rely on system 110 to access a wide array of IT solutions, ensuring they have access to the latest technologies and innovations in the market. System 110 enables end customers to track their orders, receive updates on delivery status, and access customer support services, thereby enhancing their overall experience.

Vendors 140 play a crucial role within the operating environment of system 110. These vendors encompass manufacturers, distributors, and suppliers who offer a diverse range of IT products and services. System 110 acts as a centralized platform for vendors to showcase their offerings, manage inventory, and facilitate transactions with customers and resellers. Vendors can leverage system 110 to streamline their supply chain operations, manage pricing and promotions, and gain insights into customer preferences and market trends. By integrating with system 110, vendors can expand their reach, access new markets, and enhance their overall visibility and competitiveness.

Resellers 150 are intermediaries within the distribution model who bridge the gap between vendors and customers. They play a vital role in the IT distribution ecosystem by connecting customers with the right IT solutions from various vendors. Resellers may include retailers, value-added resellers (VARs), system integrators, or managed service providers. System 110 enables resellers to access a comprehensive catalog of IT solutions, manage their sales pipeline, and provide value-added services to customers. By leveraging system 110, resellers can enhance their customer relationships, optimize their product offerings, and increase their revenue streams.

Within the operating environment of system 110, there are various dynamics and characteristics that contribute to its effectiveness. These dynamics include real-time data exchange, integration with existing enterprise systems, scalability, and flexibility. System 110 ensures that relevant data is exchanged in real-time between stakeholders, enabling accurate decision-making and timely actions. Integration with existing enterprise systems such as enterprise resource planning (ERP) systems, customer relationship management (CRM) systems, and warehouse management systems allows for integrated communication and interoperability, eliminating data silos and enabling end-to-end visibility.

Scalability and flexibility are key characteristics of system 110. It can accommodate the growing demands of the IT distribution model, whether it involves an expanding customer base, an increasing number of vendors, or a wider range of IT products and services. System 110 is designed to handle large-scale data processing, storage, and analysis, ensuring that it can support the evolving needs of the distribution platform. Additionally, System 110 leverages a technology stack that includes .NET, Java, and other suitable technologies, providing a robust foundation for its operations.

In summary, the operating environment of system 110 within the IT distribution model encompasses customers 120, end customers 130, vendors 140, resellers 150, and other entities involved in the distribution process. System 110 serves as a centralized platform that facilitates efficient collaboration, communication, and transactional processes between these stakeholders. By leveraging real-time data exchange, integration, scalability, and flexibility, System 110 empowers stakeholders to optimize their operations, enhance customer experiences, and drive business success within the IT distribution ecosystem.

Figure 2:
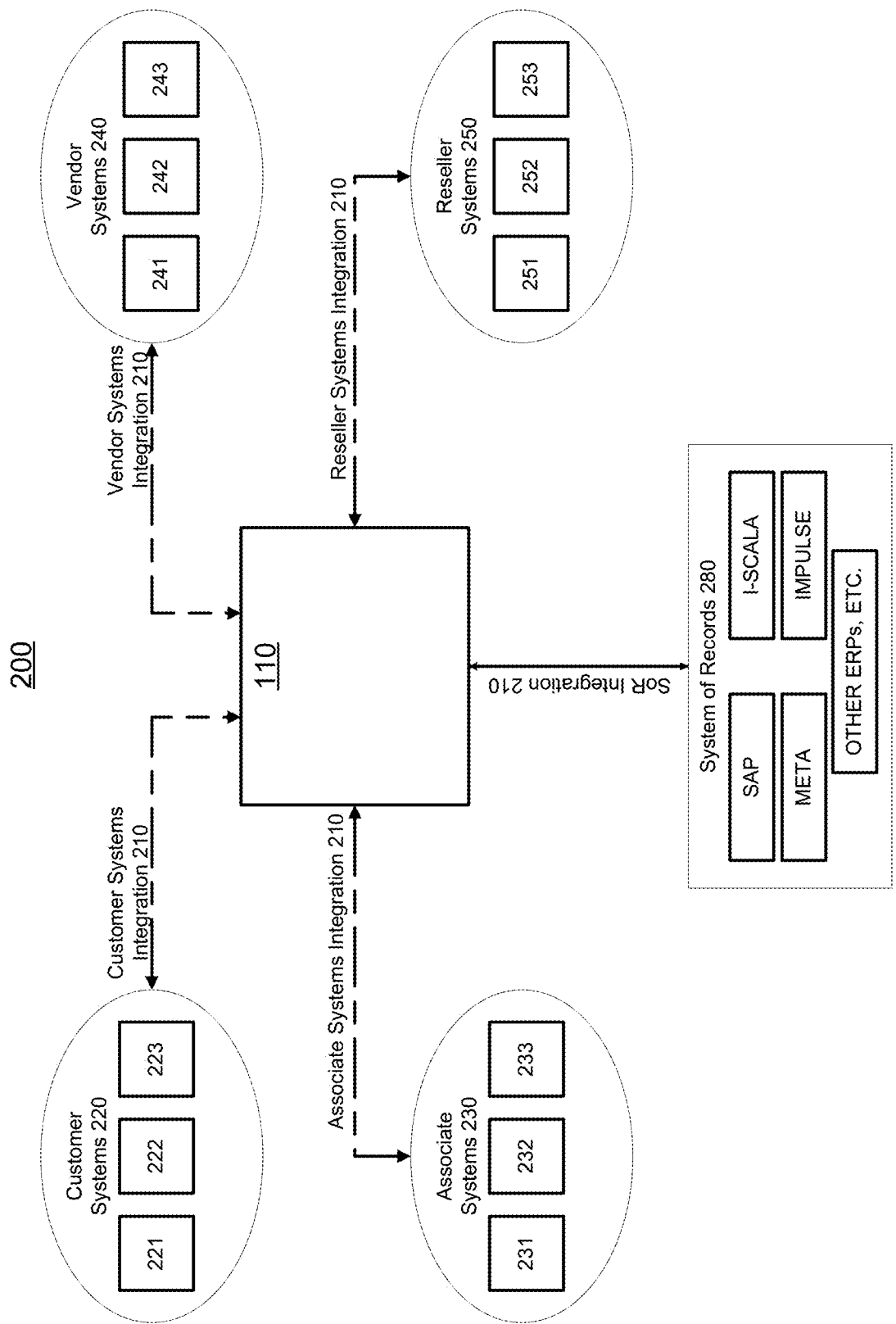
FIG. 2 illustrates one embodiment of an operating environment of the distribution platform, which builds upon the elements introduced in FIG. 1.

FIG. 2 illustrates an operating environment 200 of the distribution platform, which builds upon the elements introduced in FIG. 1. Within this operating environment, integration points 210 facilitate integrated data flow and connectivity between various customer systems 220, associate systems 230, vendor systems 240, reseller systems 250, and other entities involved in the distribution process. The diagram showcases the interconnectedness and the mechanisms that enable efficient collaboration and data-driven decision-making.

Operating environment 200 can include system 110 as a distribution platform that serves as the central hub for managing and facilitating the distribution process. System 110 can be configured to perform functions and operations as a bridge between customer systems 220, vendor systems 240, reseller systems 250, and other entities within the ecosystem. It can integrate communication, data exchange, and transactional processes, providing stakeholders with a unified and streamlined experience. Moreover, operating environment 200 can include one or more integration points 210 to ensure smooth data flow and connectivity. These integration points include:

Customer System Integration: Integration point 210 can enable system 110 to connect with customer systems 220, enabling efficient data exchange and synchronization. Customer systems 220 may include various entities such as customer system 221, customer system 222, and customer system 223. Integration with customer systems 220 empowers customers to access real-time inventory information, pricing details, order tracking, and other relevant data, enhancing their visibility and decision-making capabilities.

Associate System Integration: Integration point 210 can enable system 110 to connect with associate systems 230, enabling efficient data exchange and synchronization. Associate systems 230 may include various entities such as associate system 231, associate system 233, and associate system 233. Integration with associate systems 220 empowers customers to access real-time inventory information, pricing details, order tracking, and other relevant data, enhancing their visibility and decision-making capabilities.

Vendor System Integration: Integration point 210 facilitates the integrated connection between system 110 and vendor systems 240. Vendor systems 240 may include entities such as vendor system 241, vendor system 242, and vendor system 243, representing the inventory management systems, pricing systems, and product catalogs employed by vendors. Integration with vendor systems 240 ensures that vendors can efficiently update their product offerings, manage pricing and promotions, and receive real-time order notifications and fulfillment details.

Reseller System Integration: Integration point 210 provides capabilities for reseller systems 250 to connect with system 110. Reseller systems 250 may encompass entities such as reseller system 251, reseller system 252, and reseller system 253, representing the sales systems, customer management systems, and service delivery platforms employed by resellers. Integration with reseller systems 250 empowers resellers to access up-to-date product information, manage customer accounts, track sales performance, and provide value-added services to their customers.

Other Entity System Integration: Integration point 210 also enables connectivity with other entities involved in the distribution process. These entities may include entities such as entity system 271, entity system 272, and entity system 273. Integration with these systems ensures integrated communication and data exchange, facilitating collaboration and efficient distribution processes.

Integration point 210 also enables connectivity with System of Records 280, for additional data management and integration. Representing System of Records 280 can represent enterprise resource planning (ERP) systems or customer relationship management (CRM) systems, including both future systems as well as legacy ERP systems such as SAP, Impulse, META, I-SCALA, and others. System of Records can include one or more storage repositories of critical and legacy business data. It facilitates integration of data exchange and synchronization between the distribution platform, System 110, and the ERPs, enabling real-time updates and ensuring the availability of accurate and up-to-date information. Integration points 210 establish connectivity between the System of Records 280 and the distribution platform, allowing stakeholders to leverage rich data stored in the ERPs for efficient collaboration, data-driven decision-making, and streamlined distribution processes. These systems represent the internal systems utilized by customers, vendors, and others.

Integration points 210 within the operating environment 200 are facilitated through standardized protocols, APIs, and data connectors. These mechanisms ensure compatibility, interoperability, and secure data transfer between the distribution platform and the connected systems. System 110 employs industry-standard protocols, such as RESTful APIs, SOAP, or GraphQL, to establish communication channels and enable integrated data exchange.

In some embodiments, System 110 can incorporates authentication and authorization mechanisms to ensure secure access and data protection. Technologies such as OAuth or JSON Web Tokens (JWT) can be employed to authenticate users, authorize data access, and maintain the integrity and confidentiality of the exchanged information.

In some embodiments, integration points 210 and data flow within the operating environment 200 enable stakeholders to operate within a connected ecosystem. Data generated at various stages of the distribution process, including customer orders, inventory updates, shipment details, and sales analytics, flows efficiently between customer systems 220, vendor systems 240, reseller systems 250, and other entities. This data exchange facilitates real-time visibility, enables data-driven decision-making, and enhances operational efficiency throughout the distribution platform.

In some embodiments, System 110 leverages advanced technologies such as Typescript, NodeJS, ReactJS, .NET Core, C#, and other suitable technologies to support the integration points 210 and enable integrated communication within the operating environment 200. These technologies provide a robust foundation for system 110, ensuring scalability, flexibility, and efficient data processing capabilities. Moreover, the integration points 210 may also employ algorithms, data analytics, and machine learning techniques to derive valuable insights, optimize distribution processes, and personalize customer experiences. Integration points 210 and data flow within the operating environment 200 enable stakeholders to operate within a connected ecosystem. Data generated at various touchpoints, including customer orders, inventory updates, pricing changes, or delivery status, efficiently flows between the different entities, systems, and components. The integrated data is processed, harmonized, and made available in real-time to relevant stakeholders through system 110. This real-time access to accurate and up-to-date information empowers stakeholders to make informed decisions, optimize supply chain operations, and enhance customer experiences.

Several elements in the operating environment depicted in FIG. 2 can include conventional, well-known elements that are explained only briefly here. For example, each of the customer systems, such as customer systems 220, could include a desktop personal computer, workstation, laptop, PDA, cell phone, or any wireless access protocol (WAP) enabled device, or any other computing device capable of interfacing directly or indirectly with the Internet or other network connection. Each of the customer systems typically can run an HTTP client, such as Microsoft's Edge browser, Google's Chrome browser, Opera's browser, or a WAP-enabled browser for mobile devices, allowing customer systems to access, process, and view information, pages, and applications available from the distribution platform over the network.

Moreover, each of the customer systems can typically be equipped with user interface devices such as keyboards, mice, trackballs, touchpads, touch screens, pens, or similar devices for interacting with a graphical user interface (GUI) provided by the browser. These user interface devices enable users of customer systems to navigate the GUI, interact with pages, forms, and applications, and access data and applications hosted by the distribution platform.

The customer systems and their components can be operator-configurable using applications, including web browsers, which run on central processing units such as Intel Pentium processors or similar processors. Similarly, the distribution platform (System 110) and its components can be operator-configurable using applications that run on central processing units, such as the processor system, which may include Intel Pentium processors or similar processors, and/or multiple processor units.

Computer program product embodiments include machine-readable storage media containing instructions to program computers to perform the processes described herein. The computer code for operating and configuring the distribution platform and the customer systems, vendor systems, reseller systems, and other entities' systems to intercommunicate, process webpages, applications, and other data, can be downloaded and stored on hard disks or any other volatile or non-volatile memory medium or device, such as ROM, RAM, floppy disks, optical discs, DVDs, CDs, micro-drives, magneto-optical disks, magnetic or optical cards, nano-systems, or any suitable media for storing instructions and data.

Furthermore, the computer code for implementing the embodiments can be transmitted and downloaded from a software source over the Internet or any other conventional network connection using communication mediums and protocols such as TCP/IP, HTTP, HTTPS, Ethernet, etc. The code can also be transmitted over extranets, VPNs, LANs, or other networks, and executed on client systems, servers, or server systems using programming languages such as C, C++, HTML, Java, JavaScript, ActiveX, VBScript, and others.

It will be appreciated that the embodiments can be implemented in various programming languages executed on client systems, servers, or server systems, and the choice of language may depend on the specific requirements and environment of the distribution platform.

Thereby, operating environment 200 can couple a distribution platform with one or more integration points 210 and data flow to enable efficient collaboration and streamlined distribution processes.

Figure 3:
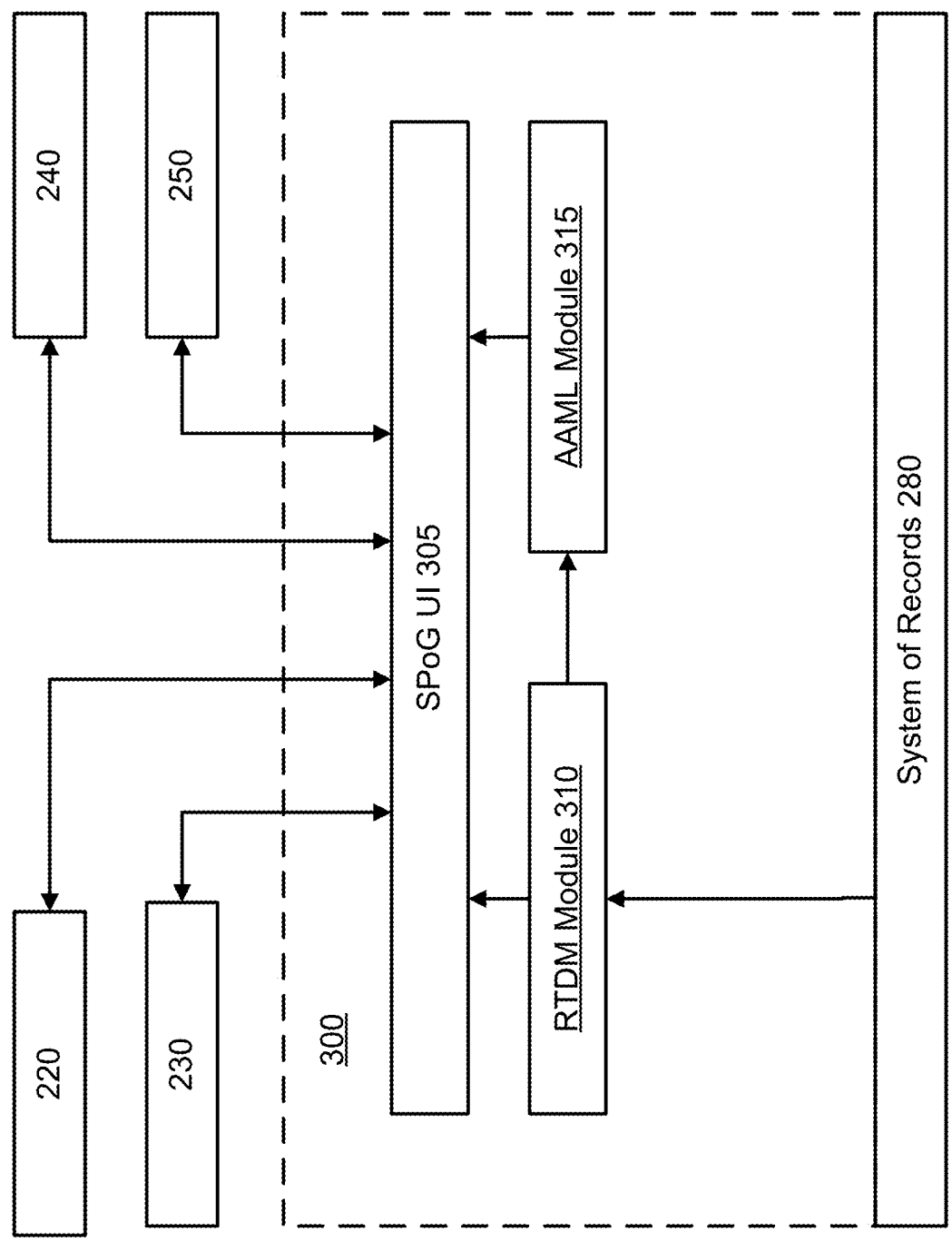
FIG. 3 illustrates one embodiment of a system for supply chain management.

FIG. 3 illustrates a system 300 for supply chain management. System 300 is a supply chain management solution designed to address the challenges faced by fragmented supply chain ecosystems in the global distribution industry. System 300 can include several interconnected components and modules that work in harmony to optimize supply chain operations, enhance collaboration, and drive business efficiency.

In some embodiments, SPoG UI 305 serves as a centralized user interface, providing stakeholders with a unified view of the entire supply chain. It consolidates information from various sources and presents real-time data, analytics, and functionalities tailored to the specific roles and responsibilities of users. By offering a customizable and intuitive dashboard-style layout, the SPoG UI 305 enables users to access relevant information and tools, empowering them to make data-driven decisions and efficiently manage their supply chain activities.

For example, a logistics manager can use the SPoG UI 305 to monitor the status of shipments, track delivery routes, and view real-time inventory levels across multiple warehouses. They can visualize data through interactive charts and graphs, such as a map displaying the current location of each shipment or a bar chart showing inventory levels by product category. By having a unified view of the supply chain, the logistics manager can identify bottlenecks, optimize routes, and ensure timely delivery of goods.

In some embodiments, SPoG UI 305 integrates with other modules of system 300, facilitating real-time data exchange, synchronized operations, and streamlined workflows. Through API integrations, data synchronization mechanisms, and event-driven architectures, SPoG UI 305 ensures smooth information flow and enables collaborative decision-making across the supply chain ecosystem.

For instance, when a purchase order is generated in the SPoG UI 305, system 300 automatically updates the inventory levels, triggers a notification to the warehouse management system, and initiates the shipping process. This integration enables efficient order fulfillment, reduces manual errors, and enhances overall supply chain visibility.

In some embodiments, Real-Time Data Mesh (RTDM) module 310 can be configured to provide an integrated flow of data within the supply chain ecosystem. It aggregates data from multiple sources, harmonizes it, and ensures its availability in real-time.

In one non limiting example, RTDM module 310 can collect data from System of Records 280, which can represent various systems, including disparate inventory management systems, point-of-sale terminals, and customer relationship management systems. It harmonizes this data by aligning formats, standardizing units of measurement, and reconciling any discrepancies. The harmonized data is then made available in real-time, allowing stakeholders to access accurate and up-to-date information across the supply chain.

In some embodiments, RTDM module 310 can be configured to capture changes in data across multiple transactional systems in real-time. It employs a sophisticated Change Data Capture (CDC) mechanism that constantly monitors the transactional systems, detecting any updates or modifications. The CDC component is specifically designed to work with various transactional systems, which can include future and legacy ERP systems, Customer Relationship Management (CRM) systems, and other enterprise-wide systems, ensuring compatibility and flexibility for businesses operating in diverse environments.

By providing continuous access to real-time data, stakeholders can make timely decisions and respond quickly to changing market conditions. For example, if RTDM module 310 detects a sudden spike in demand for a particular product, it can trigger alerts to the production team, enabling them to adjust manufacturing schedules and prevent stockouts.

In some embodiments, RTDM module 310 facilitates data management within supply chain operations. It enables real-time harmonization of data from multiple sources, freeing vendors, resellers, customers, and end customers from constraints imposed by legacy ERP systems. This enhanced flexibility supports improved efficiency, customer service, and innovation.

System 300 can also include Advanced Analytics and Machine Learning (AAML) module 315. AAML module 315 can leverage powerful analytics tools and algorithms such as Apache Spark, TensorFlow, or scikit-learn, the AAML module extracts valuable insights from the collected data. It performs advanced analytics, predictive modeling, anomaly detection, and other machine learning operations.

For instance, AAML module 315 can analyze historical sales data to identify seasonal patterns and predict future demand. It can generate forecasts that help optimize inventory levels, ensure stock availability during peak seasons, and minimize excess inventory costs. By leveraging machine learning algorithms, AAML module 315 automates repetitive tasks, predicts customer preferences, and optimizes supply chain processes.

In addition to demand forecasting, AAML module 315 can provide insights into customer behavior, enabling targeted marketing campaigns and personalized customer experiences. For example, by analyzing customer data, the module can identify cross-selling or upselling opportunities and recommend relevant products to individual customers.

Furthermore, AAML module 315 can analyze data from various sources, such as social media feeds, customer reviews, and market trends, to gain a deeper understanding of consumer sentiment and preferences. This information can be used to inform product development decisions, identify emerging market trends, and adapt business strategies to meet evolving consumer expectations.

System 300 can perform integration and interoperability functions to connect with existing enterprise systems such as ERP systems, warehouse management systems, and customer relationship management systems. By establishing connections and data flows between these systems, System 300 enables smooth data exchange, process automation, and end-to-end visibility across the supply chain. Integration protocols, APIs, and data connectors facilitate integrated communication and interoperability among different modules and components, creating a holistic and connected supply chain ecosystem.

The implementation and deployment of system 300 can be tailored to meet specific business needs. In some non-limiting examples, it can be deployed as a cloud-native solution using containerization technologies like Docker® and orchestration frameworks like Kubernetes®. This approach ensures scalability, easy management, and efficient updates across different environments. The implementation process involves configuring the system to align with specific supply chain requirements, integrating with existing systems, and customizing the modules and components based on the business's needs and preferences.

System 300 for supply chain management is a comprehensive and innovative solution that addresses the challenges faced by fragmented supply chain ecosystems. It combines the power of the SPoG UI 305, RTDM module 310, and AAML module 315, along with integration with existing systems. By leveraging a diverse technology stack, scalable architecture, and robust integration capabilities, System 300 provides end-to-end visibility, data-driven decision-making, and optimized supply chain operations. The examples and options provided in this description are non-limiting and can be customized to meet specific industry requirements, driving efficiency and success in supply chain management.

Figure 4:
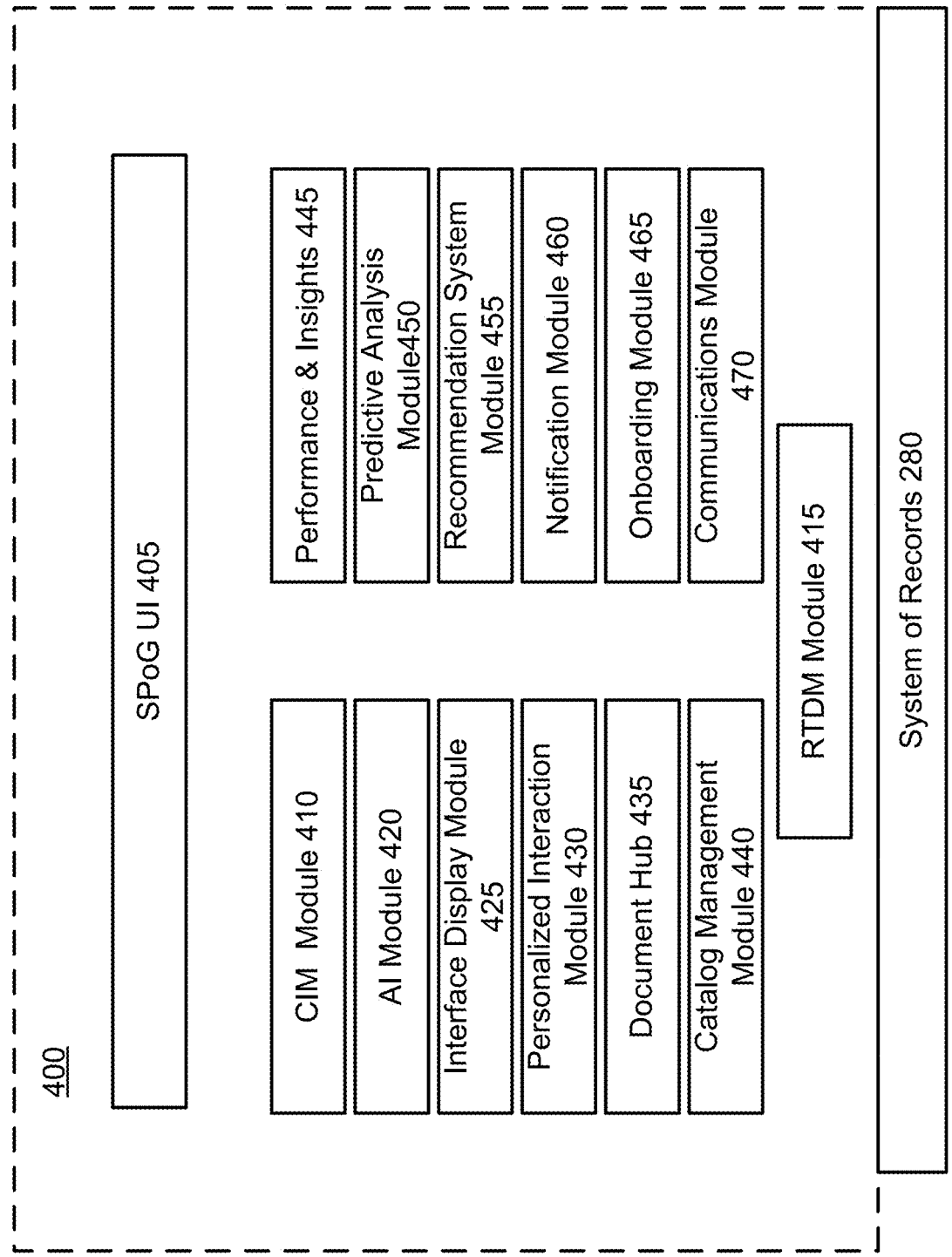
FIG. 4 depicts an embodiment of an advanced distribution platform including System for managing a complex distribution network, which can be an embodiment of System, and provides a technology distribution platform for optimizing the management and operation of distribution networks.

FIG. 4 depicts an embodiment of an advanced distribution platform including system 400 for managing a complex distribution network, which can be an embodiment of system 300, and provides a technology distribution platform for optimizing the management and operation of distribution networks. System 400 includes several interconnected modules, each serving specific functions and contributing to the overall efficiency of supply chain operations. In some embodiments, these modules can include SPoG UI 405, Customer Interaction Module (CIM) 410, RTDM module 415, AI module 420, Interface Display Module 425, Personalized Interaction Module 430, Document Hub 435, Catalog Management Module 440, Performance and Insight Markers Display 445, Predictive Analytics Module 450, Recommendation System Module 455, Notification Module 460, Self-Onboarding Module 465, and Communication Module 470.

System 400, as an embodiment of system 300, leverages a range of technologies and algorithms to integrate and consolidate supply chain management. These technologies and algorithms facilitate efficient data processing, personalized interactions, real-time analytics, secure communication, and effective management of documents, catalogs, and performance metrics.

In some embodiments, SPoG UI 405, in some embodiments, serves as the central interface within system 400, providing stakeholders with a unified view of the entire distribution network. It utilizes frontend technologies such as ReactJS, TypeScript, and Node.js to create interactive and responsive user interfaces. These technologies enable the SPoG UI 405 to deliver a user-friendly experience, allowing stakeholders to access relevant information, navigate through different modules, and perform tasks efficiently.

In some embodiments, CIM 410, or Customer Interaction Module, employs algorithms and technologies such as Oracle® Eloqua®, Adobe® Target, and Okta® to manage customer relationships within the distribution network. These technologies enable the module to handle customer data securely, personalize customer experiences, and provide integrated access control for stakeholders.

In some embodiments, RTDM module 415, or Real-Time Data Mesh module, is a critical component of system 400 that ensures the smooth flow of data across the supply chain ecosystem. It utilizes technologies such as Apache® Kafka®, Apache® Flink®, or Apache® Pulsar for data ingestion, processing, and stream management. These technologies enable the RTDM module 415 to handle real-time data streams, process large volumes of data, and ensure low-latency data processing. Additionally, the module employs Change Data Capture (CDC) mechanisms to capture real-time data updates from various transactional systems, such as legacy ERP systems and CRM systems. This capability allows stakeholders to access up-to-date and accurate information for informed decision-making.

In some embodiments, AI module 420 within system 400 leverages advanced analytics and machine learning algorithms, including Apache® Spark, TensorFlow®, and Scikit-Learn®, to extract valuable insights from data. These algorithms enable the module to automate repetitive tasks, predict demand patterns, optimize inventory levels, and improve overall supply chain efficiency. For example, the AI module 420 can utilize predictive models to forecast demand, allowing stakeholders to optimize inventory management and minimize stockouts or overstock situations.

In some embodiments, Interface Display Module 425 focuses on presenting data and information in a clear and user-friendly manner. It utilizes technologies such as HTML, CSS, and JavaScript frameworks like ReactJS to create interactive and responsive user interfaces. These technologies allow stakeholders to visualize data using various data visualization techniques, such as graphs, charts, and tables, enabling efficient data comprehension, comparison, and trend analysis.

In some embodiments, Personalized Interaction Module 430 utilizes customer data, historical trends, and machine learning algorithms to generate personalized recommendations for products or services. In some non-limiting examples, it can be implemented utilizing Adobe® Target, Apache® Spark, and TensorFlow® for data analysis, modeling, and delivering targeted recommendations. For example, the module can analyze customer preferences and purchase history to provide personalized product recommendations, enhancing customer satisfaction and driving sales.

In some embodiments, Document Hub 435 serves as a centralized repository for storing and managing documents within system 400. In some non-limiting examples, it can be implemented utilizing SeeBurger® and Elastic Cloud for efficient document management, storage, and retrieval. For instance, the Document Hub 435 can employ SeeBurger's document management capabilities to categorize and organize documents based on their types, such as contracts, invoices, product specifications, or compliance documents, allowing stakeholders to easily access and retrieve relevant documents when needed.

In some embodiments, Catalog Management Module 440 enables the creation, management, and distribution of up-to-date product catalogs. It ensures that stakeholders have access to the latest product information, including specifications, pricing, availability, and promotions. In some non-limiting examples, it can be implemented utilizing Kentico® and Akamai® to integrate and consolidate catalog updates, content delivery, and caching. For example, the module can leverage Akamai's content delivery network (CDN) to deliver catalog information to stakeholders quickly and efficiently, regardless of their geographical location.

In some embodiments, Performance and Insight Markers Display 445 collects, analyzes, and visualizes real-time performance metrics and insights related to supply chain operations. It utilizes tools like Splunk® and Datadog® to enable effective performance monitoring and provide actionable insights. For instance, the module can utilize Splunk's log analysis capabilities to identify performance bottlenecks in the supply chain, enabling stakeholders to take proactive measures to optimize operations.

In some embodiments, Predictive Analytics Module 450 employs machine learning algorithms and predictive models to forecast demand patterns, optimize inventory levels, and enhance overall supply chain efficiency. It utilizes technologies such as Apache® Spark and TensorFlow® for data analysis, modeling, and prediction. For example, the module can utilize TensorFlow's deep learning capabilities to analyze historical sales data and predict future demand, allowing stakeholders to optimize inventory levels and minimize costs.

In some embodiments, Recommendation System Module 455 focuses on providing intelligent recommendations to stakeholders within the distribution network. It generates personalized recommendations for products or services based on customer data, historical trends, and machine learning algorithms. In some non-limiting examples, it can be implemented utilizing Adobe® Target and Apache® Spark for data analysis, modeling, and delivering targeted recommendations. For instance, the module can leverage Adobe Target's recommendation engine to analyze customer preferences and behavior, and deliver personalized product recommendations across various channels, enhancing customer engagement and driving sales.

In some embodiments, Notification Module 460 enables the distribution of real-time notifications to stakeholders regarding important events, updates, or alerts within the supply chain. In some non-limiting examples, it can be implemented utilizing Apigee® X and TIBCO® for message queues, event-driven architectures, and integrated notification delivery. For example, the module can utilize TIBCO's messaging infrastructure to send real-time notifications to stakeholders' devices, ensuring timely and relevant information dissemination.

In some embodiments, Self-Onboarding Module 465 facilitates the onboarding process for new stakeholders entering the distribution network. It provides guided steps, tutorials, or documentation to help users become familiar with the system and its functionalities. In some non-limiting examples, it can be implemented utilizing technologies such as Okta® and Kentico® to ensure secure user authentication, access control, and self-learning resources. For instance, the module can utilize Okta's identity and access management capabilities to securely onboard new stakeholders, providing them with appropriate access permissions and guiding them through the system's functionalities.

In some embodiments, Communication Module 470 enables integrated and consolidated communication and collaboration within system 400. It provides channels for stakeholders to interact, exchange messages, share documents, and collaborate on projects. In some non-limiting examples, it can be implemented utilizing Apigee® Edge and Adobe® Launch are employed to facilitate secure and efficient communication, document sharing, and version control. For example, the module can utilize Apigee Edge's API management capabilities to ensure secure and reliable communication between stakeholders, enabling them to collaborate effectively.

Thereby, System 400 can incorporate various modules that utilize a diverse range of technologies and algorithms to optimize supply chain management. These modules, including SPoG UI 405, CIM 410, RTDM module 415, AI module 420, Interface Display Module 425, Personalized Interaction Module 430, Document Hub 435, Catalog Management Module 440, Performance and Insight Markers Display 445, Predictive Analytics Module 450, Recommendation System Module 455, Notification Module 460, Self-Onboarding Module 465, and Communication Module 470, work together to provide end-to-end visibility, data-driven decision-making, personalized interactions, real-time analytics, and streamlined communication within the distribution network. The incorporation of specific technologies and algorithms enables efficient data management, secure communication, personalized experiences, and effective performance monitoring, contributing to enhanced operational efficiency and success in supply chain management.

Real Time Data Mesh

Figure 5:
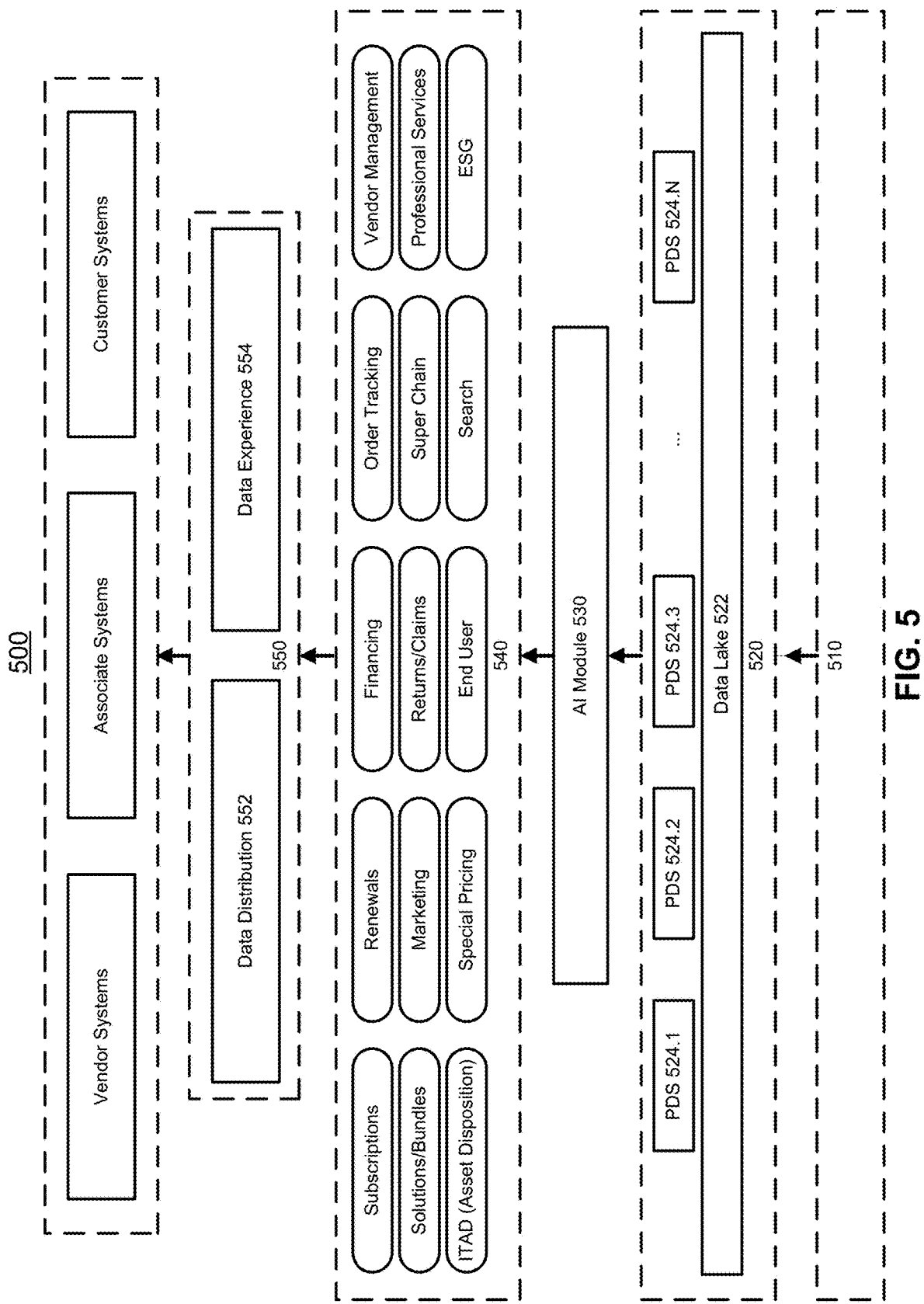
FIG. 5 illustrates an RTDM module, according to an embodiment.

FIG. 5 illustrates RTDM module 500, according to an embodiment. RTDM module 500, which can be an embodiment of RTDM module 310, can include interconnected components, processes, and sub-systems configured to enable real-time data management and analysis.

In some embodiments, RTDM module 500, as depicted in FIG. 5, represents an effective data mesh and change capture component within the overall system architecture. The module is designed to provide real-time data management and harmonization capabilities, enabling efficient operations within the supply chain management domain.

RTDM module 500 can include an integration layer 510 (also referred to as a "system of records") that integrates with various enterprise systems. These enterprise systems can include ERPs such as SAP®, Impulse, META, and I-SCALA, among others, and other data sources. Integration layer 510 can process data exchange and synchronization between RTDM module 500 and these systems. Data feeds are established to retrieve relevant information from the system of records, such as sales orders, purchase orders, inventory data, and customer information. These feeds enable real-time data updates and ensure that the RTDM module operates with the most current and accurate data.

RTDM module 500 can include data layer 520 configured to process and translate data for retrieval and analysis. RTDM module 500 generates a data mesh as a cloud-based infrastructure designed to provide scalable and fault-tolerant data storage capabilities. Within the data mesh, multiple Purposive Datastores (PDS) are deployed to store specific types of data, such as customer data, product data, or inventory data. Each PDS is optimized for efficient data retrieval based on specific use cases and requirements. The PDSes are configured to store specific types of data, such as customer data, product data, finance data, and more. These PDS serve as repositories for harmonized and standardized data, ensuring data consistency and integrity across the system.

In some embodiments, RTDM module 500 implements a data replication mechanism to capture real-time changes from multiple data sources, including transactional systems like ERPs (e.g., SAP®, Impulse, META, I-SCALA). The captured data is then processed and harmonized on-the-fly, transforming it into a standardized format suitable for analysis and integration. This process ensures that the data is readily available and up-to-date within the data mesh, facilitating real-time insights and decision-making.

More specifically, data layer 520 within the RTDM module 500 can be configured as a powerful and flexible foundation for managing and processing data within the supply chain ecosystem. In some embodiments, data layer 520 can encompasses a highly scalable and robust data lake, which can be referred to as data lake 522, along with a set of purposive datastores (PDSes), which can be denoted as PDSes 524.1 to 524.N. These components work in harmony to ensure efficient data management, harmonization, and real-time availability.

In some embodiments, data layer 520 includes data lake 522, a novel storage and processing infrastructure designed to handle the ever-increasing volume, variety, and velocity of data generated within the supply chain. Built upon a scalable distributed file system, such as Apache® Hadoop® Distributed File System (HDFS) or Amazon® S3, the data lake can provide a unified and scalable platform for storing both structured and unstructured data. Leveraging the elasticity and fault-tolerance of cloud-based storage, data lake 522 can aggregate and accommodate the influx of data from diverse sources.

Associated with data lake 522, a plurality of purposive datastores, PDSes 524.1 to 524.N, can be employed. Each PDS 524 can function as a purpose-built repository optimized for storing and retrieving specific types of data relevant to the supply chain domain. In some non-limiting examples, PDS 524.1 may be dedicated to customer data, storing information such as customer profiles, preferences, and transaction history. PDS 524.2 may be focused on product data, encompassing details about SKU codes, descriptions, pricing, and inventory levels. These purposive datastores allow for efficient data retrieval, analysis, and processing, catering to the diverse needs of supply chain stakeholders.

To ensure real-time data synchronization, data layer 520 can be configured to employ one or more sophisticated change data capture (CDC) mechanisms. These CDC mechanisms are integrated with the transactional systems, such as legacy ERPs like SAP®, Impulse, META, and I-SCALA, as well as other enterprise-wide systems. CDC constantly monitors these systems for any updates, modifications, or new transactions and captures them in real-time. By capturing these changes, data layer 520 ensures that the data within the data lake 522 and PDSes 524 remains up-to-date, providing stakeholders with real-time insights into the supply chain ecosystem.

In some embodiments, data layer 520 can be implemented to facilitate integration with existing enterprise systems using one or more frameworks, such as .NET or Java, ensuring compatibility with a wide range of existing systems and providing flexibility for customization and extensibility. For example, data layer 520 can utilize the Java technology stack, including frameworks like Spring and Hibernate®, to facilitate integration with a system of records having a population of diverse ERP systems and other enterprise-wide solutions. This can facilitate smooth data exchange, process automation, and end-to-end visibility across the supply chain.

In some embodiments, to facilitate data processing and analytics, data layer 520 can include one or more distributed computing frameworks, such as Apache® Spark or Apache® Flink in some non-limiting examples. These frameworks can enable parallel processing and distributed computing across large-scale datasets stored in the data lake and PDSes. By leveraging these frameworks, supply chain stakeholders can perform complex analytical tasks, apply machine learning algorithms, and derive valuable insights from the data. For instance, data layer 520 can leverage Apache Spark's machine learning libraries to develop predictive models for demand forecasting, optimize inventory levels, and identify potential supply chain risks.

In some embodiments, data layer 520 can incorporate robust data governance and security measures. Fine-grained access control mechanisms and authentication protocols ensure that only authorized users can access and modify the data within the data lake and PDSes. Data encryption techniques, both at rest and in transit, safeguard the sensitive supply chain information against unauthorized access. Additionally, data layer 520 can implement data lineage and audit trail mechanisms, allowing stakeholders to trace the origin and history of data, ensuring data integrity and compliance with regulatory requirements.

In some embodiments, data layer 520 can be deployed in a cloud-native environment, leveraging containerization technologies such as Docker® and orchestration frameworks like Kubernetes®. This approach ensures scalability, resilience, and efficient resource allocation. For example, data layer 520 can be deployed on cloud infrastructure provided by AWS®, Azure®, or Google® Cloud, utilizing their managed services and scalable storage options. This allows for efficient scaling of resources based on demand, minimizing operational overhead and providing an elastic infrastructure for managing supply chain data.

Data layer 520 of RTDM module 500 can incorporate a highly scalable data lake, data lake 522, along with purpose-built PDSes, PDSes 524.1 to 524.N, and employing sophisticated CDC mechanisms, data layer 520 ensures efficient data management, harmonization, and real-time availability. The integration of diverse technology stacks, such as .NET or Java, and distributed computing frameworks like Apache® Spark, enables powerful data processing, advanced analytics, and machine learning capabilities. With robust data governance and security measures, data layer 520 ensures data integrity, confidentiality, and compliance. Through its scalable infrastructure and efficient integration with existing systems, data layer 520 empowers supply chain stakeholders to make data-driven decisions, optimize operations, and drive business success in the dynamic and complex supply chain landscape.

RTDM module 500 can include an AI module 530 configured to implement one or more algorithms and machine learning models to analyze the stored data in data layer 520 and derive meaningful insights. In some non-limiting examples, AI module 530 can apply predictive analytics, anomaly detection, and optimization algorithms to identify patterns, trends, and potential risks within the supply chain. AI module 530 can continuously learn from new data inputs and adapt its models to provide accurate and up-to-date insights. AI module 530 can generate predictions, recommendations, and alerts and publish such insights to dedicated data feeds.

Data engine layer 540 can comprise a set of interconnected systems responsible for specialized data ingestion, processing, transformation, and integration. Within the RTDM module 500, these systems include a collection of headless engines 540 operate autonomously, representing distinct functionalities. These engines represent distinct functionalities within the system and can include, for example, one or more recommendation engines, insights engines, and subscription management engines. Non-limiting examples of these headless engines include engines for subscriptions, solutions/bundles, ITAD (IT Asset Disposition), renewals, marketing, special pricing, financing, returns/claims, end user, order tracking, super chain, search, vendor management, professional services, and ESG (Environmental, Social, and Governance). These headless engines leverage the harmonized data stored in the data mesh to deliver specific business logic and services. Engines 540 can leverage the harmonized data stored in the data mesh to deliver specific business logic and services. Each engine is designed to be pluggable, allowing for flexibility and future expansion of the module's capabilities.

These systems can be configured to receive data from multiple sources, such as transactional systems, IoT devices, and external data providers. The data ingestion process involves extracting data from these sources and transforming it into a standardized format. Data processing algorithms are applied to cleanse, aggregate, and enrich the data, making it ready for further analysis and integration.

Further, to facilitate integration and access to RTDM module 500, a data distribution mechanism 545 can be employed. Data distribution mechanism 545 can be configured to include one or more APIs to facilitate distribution of data from the data mesh and engines to various endpoints, including user interfaces, micro front-ends, and external systems.

Experience layer 550 focuses on delivering an intuitive and user-friendly interface for interacting with supply chain data. Experience layer 550 can include data visualization tools, interactive dashboards, and user-centric functionalities. Through this layer, users can retrieve and analyze real-time data related to various supply chain metrics such as inventory levels, sales performance, and customer demand. The user experience layer supports personalized data feeds, allowing users to customize their views and receive relevant updates based on their roles and responsibilities. Users can subscribe to specific data updates, such as inventory changes, pricing updates, or new SKU notifications, tailored to their preferences and roles.

Thereby, in some embodiments, RTDM module 500 for supply chain management can include an integration with a system of records and include one or more of a data layer with a data mesh and purposive datastores, an AI component, a data engine layer, and a user experience layer. These components work together to provide users with intuitive access to real-time supply chain data, efficient data processing and analysis, and efficient integration with existing enterprise systems. The technical feeds and retrievals within the module ensure that users can retrieve relevant, up-to-date information and insights to make informed decisions and optimize supply chain operations. Accordingly, RTDM module 500 facilitates supply chain management by providing a scalable, real-time data management solution. Its innovative architecture allows for the rich integration of disparate data sources, efficient data harmonization, and advanced analytics capabilities. The module's ability to replicate and harmonize data from diverse ERPs, while maintaining auditable and repeatable transactions, provides a distinct advantage in enabling a unified view for vendors, resellers, customers, end customers, and other entities in a distribution system, including an IT distribution system.

Single Pane of Glass UI

Figure 6:
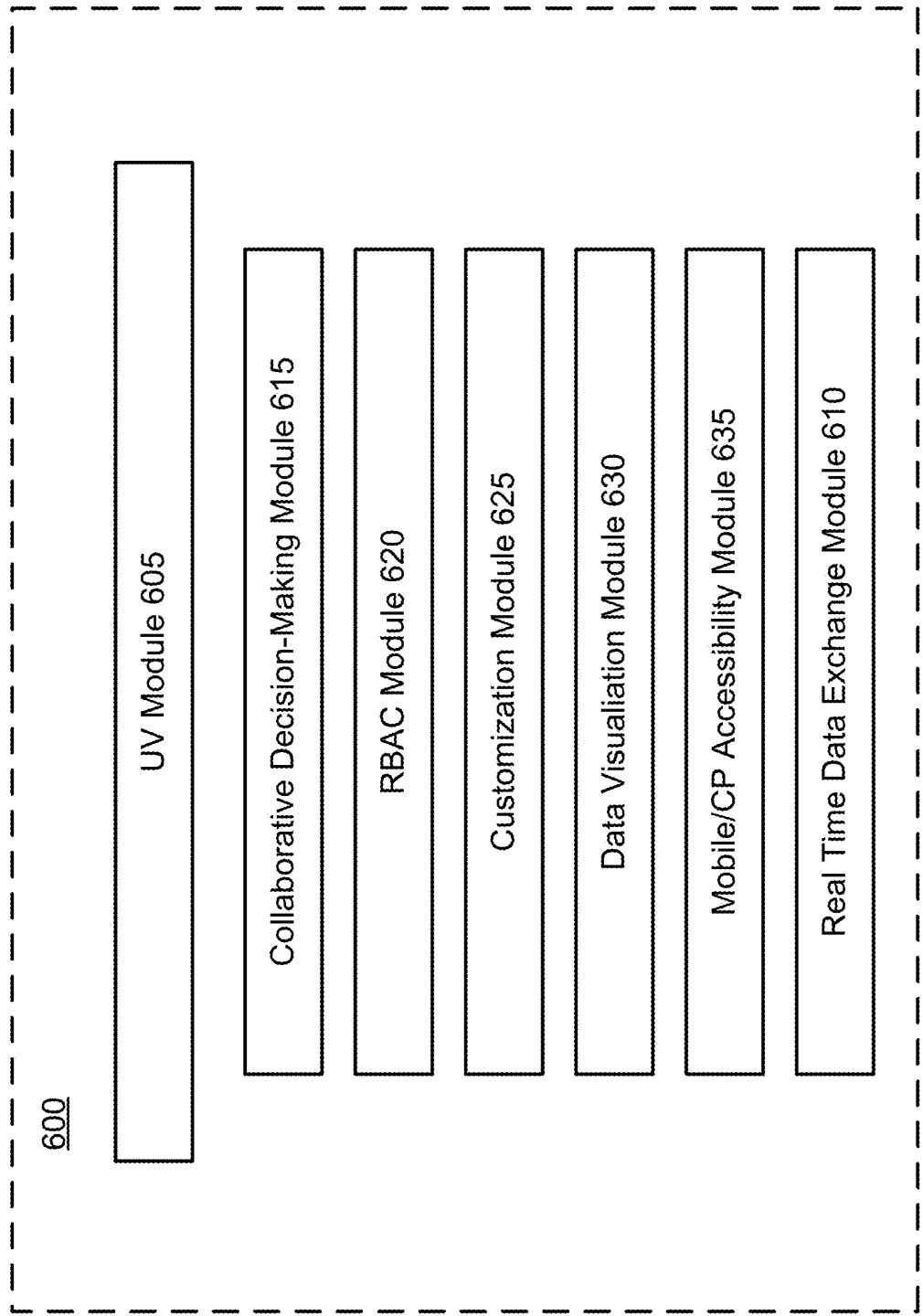
FIG. 6 illustrates a SPoG UI, according to an embodiment.

FIG. 6 illustrates an SPoG UI, according to an embodiment, generally indicated as SPoG UI 600. In some embodiments, SPoG UI 600, which can be an embodiment of SPoG UI 305, represents a comprehensive and intuitive user interface designed to provide stakeholders with a unified and customizable view of the entire supply chain ecosystem. It combines a range of features and functionalities that enable users to gain a comprehensive understanding of the supply chain and efficiently manage their operations.

SPoG 600 can incorporate High-Velocity Data in Data-Rich Environments. In contemporary data-rich environments, conventional UI designs frequently grapple with presenting a large amount of information in an understandable, efficient, and visually appealing manner. The challenge intensifies when data is dynamic, changing in real-time, and needs to be displayed effectively in single-pane environments that emphasize clean, white-space-oriented designs.

SPoG UI 600 can integrate capabilities with the RTDM module 310/500, stakeholders to provide a powerful and user-friendly interface for supply chain management. In some embodiments, SPoG UI 600 can include Unified View (UV) Module 605 to provide a customizable and holistic view of the supply chain, and Real-Time Data Exchange Module 610 to ensure accurate and up-to-date data synchronization based on the RTDM module 310/500. Collaborative Decision-Making Module 615 promotes effective communication and collaboration between populations of diverse groups. RBAC Module 620 can be configured to secure access control. Customization Module 625, Data Visualization Module 630, and Mobile and Cross-Platform Accessibility Module 635 can be configured to enhance the user experience, data analysis, and accessibility, respectively. In some embodiments, the above-mentioned modules can enable stakeholders to make informed decisions, optimize supply chain operations, and drive business efficiency within the supply chain ecosystem.

SPoG UI 600 can include UV Module 605, which provides stakeholders with a centralized and customizable dashboard-style layout. This module allows users to access real-time data, analytics, and functionalities tailored to their specific roles and responsibilities within the supply chain ecosystem. The UV Module 605 serves as a single-entry point for users, offering a holistic and comprehensive view of the supply chain operations and empowering them to make data-driven decisions. UV module 605 can be configured to manage real-time data efficiently, maintaining a visually clean interface without compromising performance. This innovative approach includes a unique configuration of the UI structure, responsive data visualizations, real-time data handling methods, adaptive information architecture, and white space optimization.

UV module 605 can be structured around a grid-based layout system, leveraging CSS Grid and Flexbox technologies. This structure offers the flexibility to create a fluid layout with elements that adjust automatically to the available space and content. HTML5 and CSS3 serve as the foundational technologies for creating the UI, while JavaScript, specifically React.js, manages the dynamic aspects of the UI.

SPoG UI 600 can integrate UV module 605 with Real-Time Data Exchange Module 610, to facilitate continuous exchange of data between SPoG UI 600 and RTDM module 310, to leverage one or more data sources, which can include one or more ERPs, CRMs, or other sources. Through this module, stakeholders can access up-to-date, accurate, and harmonized data. Real-time data synchronization ensures that the information presented in SPoG UI 600 reflects the latest insights and developments across the supply chain. This integration enables stakeholders to make informed decisions based on accurate and synchronized data.

In some embodiments, Collaborative Decision-Making Module 615 within SPoG UI 600 fosters real-time collaboration and communication among stakeholders. This module enables the exchange of information, initiation of workflows, and sharing of insights and recommendations. By integrating with the RTDM module 310/500, the Collaborative Decision-Making Module 615 ensures that stakeholders can collaborate effectively based on accurate and synchronized data. This promotes overall operational efficiency and collaboration within the supply chain ecosystem.

To ensure secure and controlled access to functionalities and data, SPoG UI 600 incorporates Role-Based Access Control (RBAC) Module 620. Administrators can define roles, assign permissions, and control user access based on their responsibilities and organizational hierarchy. RBAC Module 620 ensures that only authorized users can access specific features and information, safeguarding data privacy, security, and compliance within the supply chain ecosystem.

In some embodiments, Customization Module 625 empowers users to personalize their dashboard and tailor the interface to their preferences and needs. Users can arrange widgets, charts, and data visualizations to prioritize the information most relevant to their specific roles and tasks. This module allows stakeholders to customize their view of the supply chain operations, providing a user-centric experience that enhances productivity and usability.

SPoG UI 600 can include Data Visualization Module 630, which enables stakeholders to analyze and interpret supply chain data through interactive dashboards, charts, graphs, and visual representations. Leveraging advanced visualization techniques, this module presents complex data in a clear and intuitive manner. Users can gain insights into key performance indicators (KPIs), trends, patterns, and anomalies, facilitating data-driven decision-making and strategic planning.

SPoG UI 600 can include Mobile and Cross-Platform Accessibility Module 635 to ensure accessibility across multiple devices and platforms. Stakeholders can access the interface from desktop computers, laptops, smartphones, and tablets, allowing them to stay connected and informed while on the go. This module optimizes the user experience for different screen sizes, resolutions, and operating systems, ensuring integrated access to real-time data and functionalities across various devices.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 7:
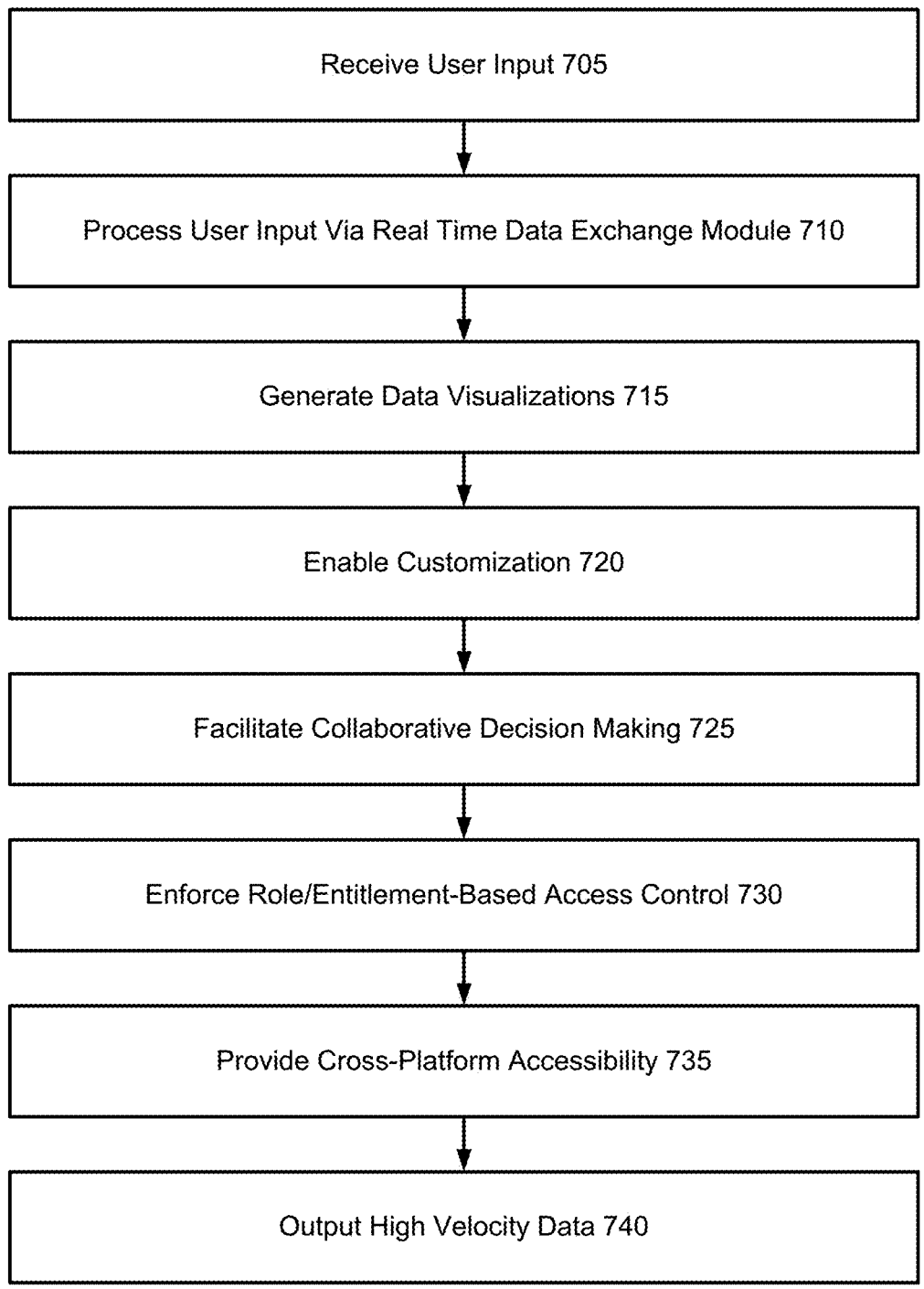
FIG. 7 is a flow diagram of a method for performing comprehensive supply chain management operations using the SPoG UI, according to some embodiments of the present disclosure.

FIG. 7 is a flow diagram of a method 700 for performing comprehensive supply chain management operations using the SPoG UI, according to some embodiments of the present disclosure. In some embodiments, method 700 provides operational steps to streamline supply chain processes, enhance decision-making, and optimize operations within the supply chain ecosystem. In some embodiments, method 700 performs real-time data retrieval, visualization, customization, collaboration, access control, and cross-platform accessibility functionalities through the SPoG UI. Based on the disclosure herein, operations in method 700 can be performed in a different order and/or vary to suit specific implementation requirements.

At operation 705, a computing device receives user input through the SPoG UI, representing a wide range of requests and commands related to supply chain management. The user input encompasses actions such as selecting specific data visualizations, accessing different modules or functionalities, initiating workflows, configuring the interface, and performing data-driven analyses. This interactive input mechanism enables stakeholders to effectively engage with the SPoG UI and obtain relevant insights to support their decision-making processes.

At operation 710, the computing device processes the user input and interacts with the Real-Time Data Exchange Module, leveraging its integration capabilities with the RTDM module. This integration ensures efficient data retrieval and synchronization, allowing the computing device to access up-to-date and accurate information from diverse data sources within the supply chain ecosystem. By establishing a connection with the RTDM module and leveraging the real-time data exchange, the computing device ensures that the insights presented in the SPoG UI reflect the latest developments and provide a comprehensive view of the supply chain operations.

At operation 715, the computing device employs the Data Visualization Module to generate visually appealing and interactive representations of the retrieved supply chain data. This module utilizes advanced visualization techniques to create dynamic dashboards, charts, graphs, and other visual elements that effectively communicate key performance indicators, trends, patterns, anomalies, and correlations within the supply chain ecosystem. Through these visualizations, stakeholders can gain valuable insights, identify critical areas, and assess the overall health of their supply chain operations.

At operation 720, the computing device enables users to personalize their dashboards and tailor the SPoG UI interface according to their specific preferences and needs. The Customization Module empowers stakeholders to arrange widgets, charts, data visualizations, and other UI components to prioritize the information most relevant to their roles and responsibilities. This flexibility ensures a user-centric experience, allowing stakeholders to focus on critical data points and streamline their decision-making processes within the SPoG UI.

At operation 725, the computing device facilitates real-time collaboration and communication among stakeholders through the Collaborative Decision-Making Module. This module provides features that enable stakeholders to exchange information, share insights and recommendations, initiate workflows, and engage in discussions within the SPoG UI interface. By integrating with the RTDM module, the Collaborative Decision-Making Module ensures that stakeholders can collaborate effectively based on accurate and synchronized data, fostering a cohesive and agile supply chain ecosystem.

At operation 730, the computing device enforces secure access control mechanisms through the Role-Based Access Control (RBAC) Module integrated into the SPoG UI. This module enables administrators to define roles, assign permissions, and control user access based on their responsibilities and organizational hierarchy. By enforcing RBAC, the computing device safeguards data privacy, ensures confidentiality, and maintains regulatory compliance within the supply chain ecosystem. Authorized stakeholders can access specific features, functionalities, and information based on their assigned roles, minimizing the risk of unauthorized data access or misuse.

At operation 735, the computing device optimizes the SPoG UI for integrated accessibility across multiple devices and platforms through the Mobile and Cross-Platform Accessibility Module. This module ensures that stakeholders can access the SPoG UI interface from desktop computers, laptops, smartphones, and tablets, enabling them to stay connected, informed, and engaged with supply chain operations while on the go. The interface is optimized to provide a consistent and intuitive user experience across different screen sizes, resolutions, and operating systems, facilitating real-time data access and enhancing stakeholder productivity.

At operation 740, the computing device leverages the High-Velocity Data in Data-Rich Environments module to efficiently handle real-time data and maintain a visually clean interface. This module incorporates a unique configuration of the SPoG UI structure, responsive data visualizations, real-time data handling methods, adaptive information architecture, and optimization techniques. Operation 740 can include processing a large amount of dynamic supply chain data in a comprehensible, efficient, and visually appealing manner. The SPoG UI's grid-based layout system, powered by CSS® Grid and Flexbox® technologies, enables fluid adaptation of UI elements to available space and content, while HTML5, CSS3, and JavaScript (specifically React.js) manage the dynamic aspects of the interface.

In summary, the method 700 depicted in FIG. 7 outlines a comprehensive approach to supply chain management through the SPoG UI. By leveraging real-time data retrieval, visualization, customization, collaboration, access control, and cross-platform accessibility functionalities, stakeholders gain valuable insights into supply chain operations and can make informed decisions. The method facilitates efficient integration with the RTDM module, ensuring accurate and up-to-date data synchronization. Through personalized dashboards, interactive data visualizations, collaborative decision-making, secure access control, and cross-device accessibility, the SPoG UI empowers stakeholders to optimize their supply chain operations, enhance collaboration, and drive efficiency in the dynamic and complex supply chain ecosystem.

Figure 8:
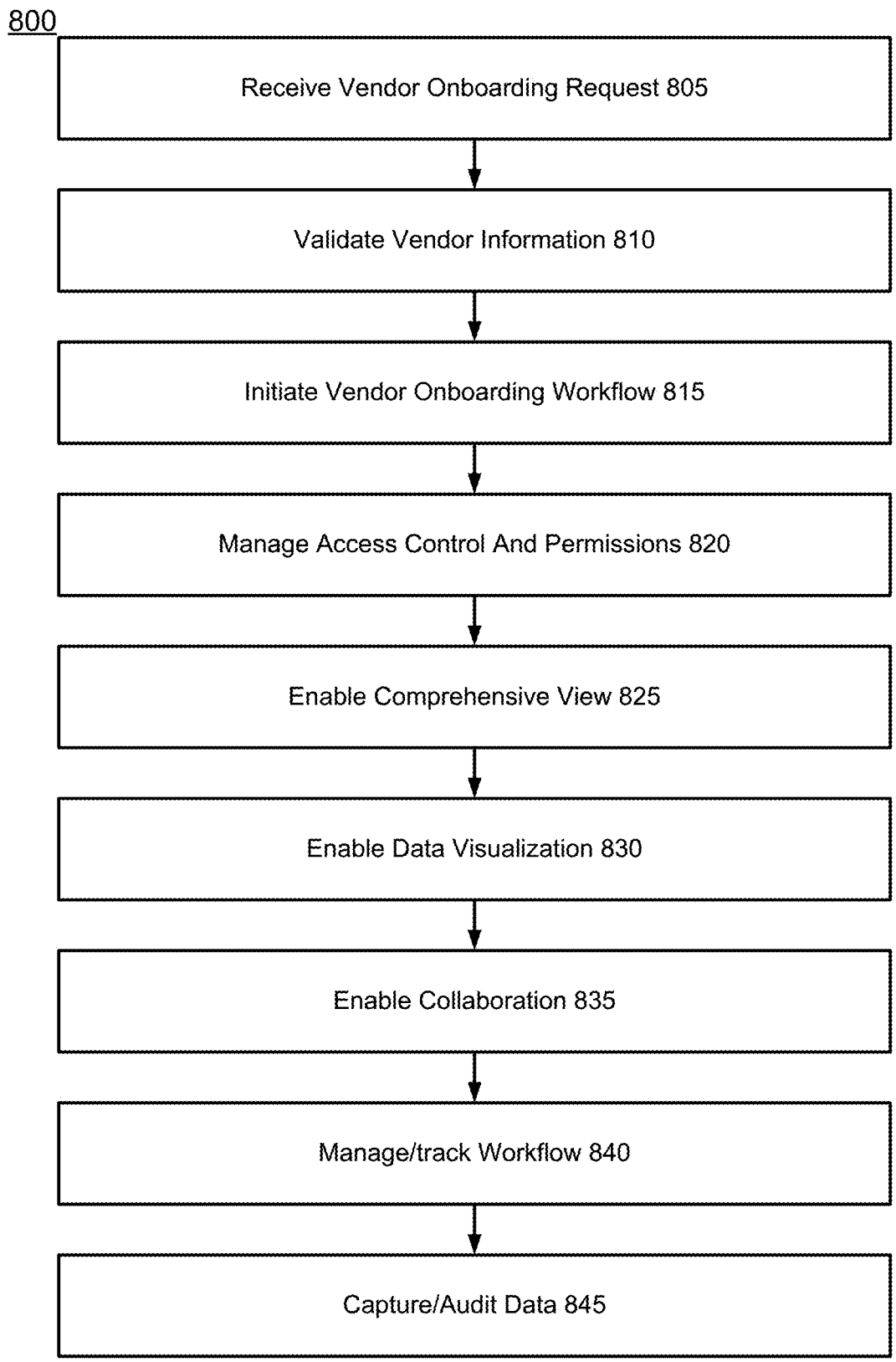
FIG. 8 is a flow diagram of a method for vendor onboarding using the SPoG UI, according to some embodiments of the present disclosure.

FIG. 8 is a flow diagram of a method 800 for vendor onboarding using the SPoG UI, according to some embodiments of the present disclosure. In some embodiments, method 800 outlines a streamlined and efficient process that leverages the capabilities of the SPoG UI to facilitate the onboarding of vendors into the supply chain ecosystem. By integrating real-time data, collaborative decision-making, and role-based access control functionalities, the SPoG UI enables stakeholders to effectively manage and optimize the vendor onboarding process. Based on the disclosure herein, operations in method 800 can be performed in a different order and/or vary to suit specific implementation requirements.

At operation 805, the process is initiated when a vendor expresses interest in joining the supply chain ecosystem. The computing device, utilizing the SPoG UI, receives the vendor's information and relevant details. This can include company profiles, contact information, product catalogs, certifications, and any other pertinent data required for the vendor onboarding process.

At operation 810, the computing device validates the vendor's information using integration capabilities with the Real-Time Data Exchange Module. By leveraging real-time data synchronization and access to external systems, the computing device ensures that the vendor's details are accurate and up to date. This validation step helps maintain data integrity, minimizes errors, and establishes a reliable foundation for the vendor onboarding process.

At operation 815, the computing device initiates the vendor onboarding workflow through the Collaborative Decision-Making Module. This module allows stakeholders involved in the onboarding process, such as procurement officers, legal teams, and vendor managers, to collaborate and make informed decisions based on the vendor's information. The SPoG UI facilitates efficient communication, file sharing, and workflow initiation, enabling stakeholders to collectively assess the vendor's suitability and efficiently progress through the onboarding steps.

At operation 820, the computing device employs the Role-Based Access Control (RBAC) Module to manage access control and permissions throughout the vendor onboarding process. The RBAC Module ensures that stakeholders only have access to the specific information and functionalities necessary for their roles. This control mechanism protects sensitive data, maintains privacy, and aligns with regulatory requirements. Authorized stakeholders can securely review and contribute to the vendor onboarding process, fostering a transparent and compliant environment.

At operation 825, the computing device provides stakeholders with a comprehensive view of the vendor onboarding process through the SPoG UI's Unified View (UV) Module. This module presents an intuitive and customizable dashboard-style layout, consolidating relevant information, milestones, and tasks associated with the vendor onboarding process. Stakeholders can monitor progress, track documentation requirements, and access real-time updates to ensure efficient and timely completion of the onboarding tasks.

At operation 830, the computing device enables stakeholders to interact with the SPoG UI's Data Visualization Module, which provides dynamic visualizations and analytics related to the vendor onboarding process. Through interactive charts, graphs, and reports, stakeholders can assess key performance indicators, identify bottlenecks, and gain insights into the overall efficiency of the vendor onboarding process. This data-driven approach empowers stakeholders to make informed decisions, allocate resources effectively, and optimize the onboarding workflow.

At operation 835, the computing device facilitates integrated collaboration among stakeholders involved in the vendor onboarding process through the Collaborative Decision-Making Module. This module enables real-time communication, document sharing, and workflow coordination, allowing stakeholders to streamline the onboarding process. By providing a centralized platform for discussion, feedback, and approvals, the SPoG UI promotes efficient collaboration and reduces delays in the vendor onboarding workflow.

At operation 840, the computing device ensures effective management and tracking of the vendor onboarding process using the SPoG UI's Workflow Management Module. This module enables stakeholders to define and manage the sequence of tasks, approvals, and reviews required for successful vendor onboarding. Workflow templates can be configured, allowing for standardization and repeatability in the onboarding process. Stakeholders can monitor the status of each task, track completion, and receive notifications to ensure timely progress.

At operation 845, the computing device captures and records the vendor onboarding activities within the SPoG UI's Audit Trail Module. This module maintains a detailed history of the onboarding process, including actions taken, documents reviewed, and decisions made. The audit trail enhances transparency, accountability, and compliance, providing stakeholders with a reliable record for future reference and potential audits.

At operation 850, the computing device concludes the vendor onboarding process within the SPoG UI. Once all necessary steps, reviews, and approvals are completed, the vendor is officially onboarded into the supply chain ecosystem. The SPoG UI can provide stakeholders with a summary of the onboarding process, allowing them to verify the completion of all requirements and initiate further actions, such as contract signing, product listing, and collaboration.

In conclusion, method 800 depicted in FIG. 8 outlines a streamlined and efficient vendor onboarding process using the SPoG UI. By leveraging real-time data integration, collaborative decision-making, role-based access control, comprehensive visualization, and workflow management functionalities, the SPoG UI empowers stakeholders to successfully onboard vendors into the supply chain ecosystem. This process ensures data accuracy, promotes transparency, enhances collaboration, and facilitates informed decision-making throughout the vendor onboarding workflow. The SPoG UI's intuitive interface, combined with its customizable features and notifications, streamlines the onboarding process, reduces manual effort, and optimizes vendor integration within the dynamic and complex supply chain landscape.

Figure 9:
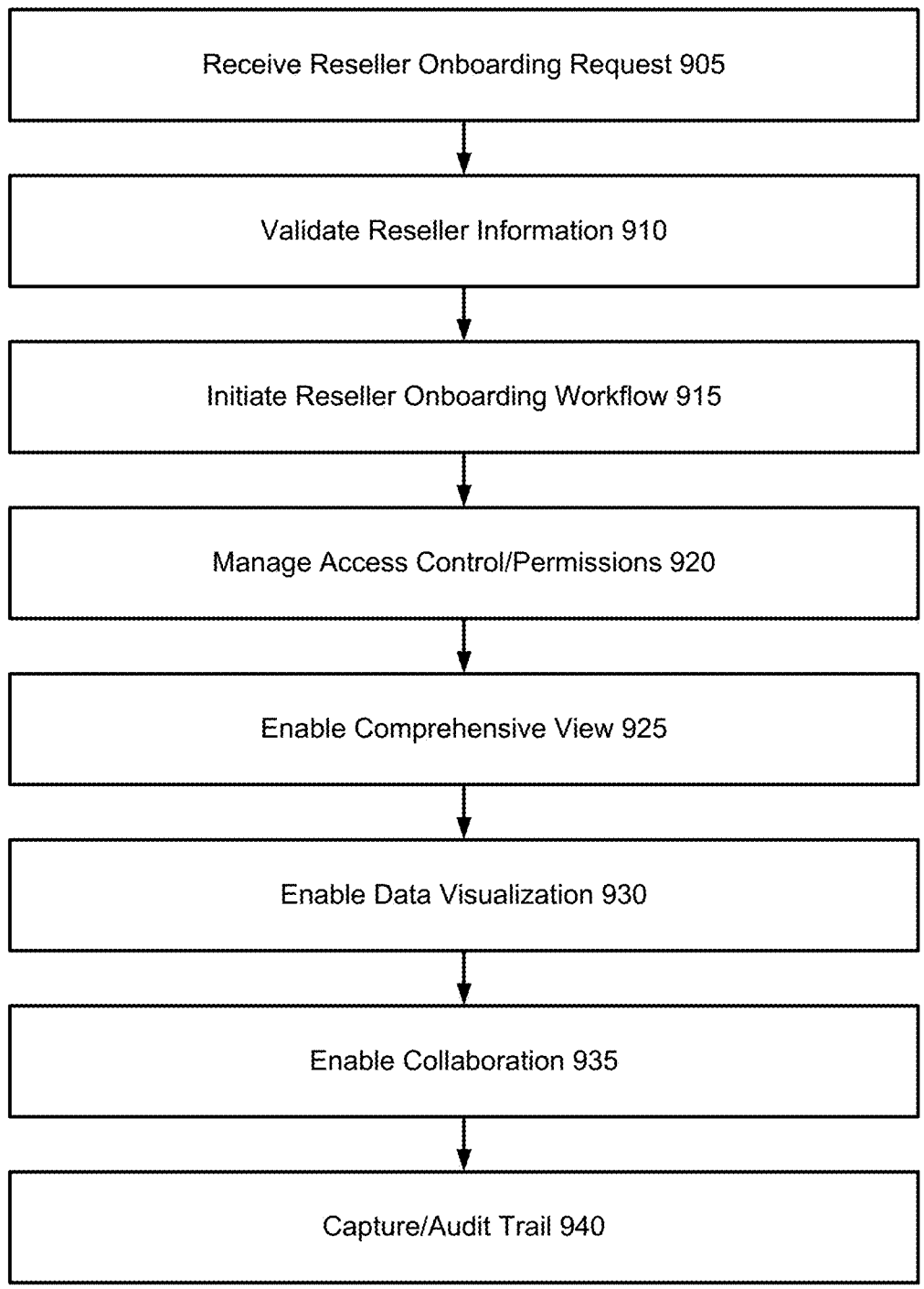
FIG. 9 is a flow diagram of a method for reseller onboarding using the SPoG UI, according to some embodiments of the present disclosure.

FIG. 9 is a flow diagram of a method 900 for reseller onboarding using the SPoG UI, according to some embodiments of the present disclosure. Method 900 outlines a streamlined and efficient process that leverages the capabilities of the SPoG UI to facilitate the onboarding of resellers into the supply chain ecosystem. By integrating real-time data, collaborative decision-making, and role-based access control functionalities, the SPoG UI enables stakeholders to effectively manage and optimize the reseller onboarding process. Based on the disclosure herein, operations in method 900 can be performed in a different order and/or vary to suit specific implementation requirements.

At operation 905, the process begins when a reseller expresses interest in joining the supply chain ecosystem. The computing device, utilizing the SPoG UI, receives the reseller's information and relevant details. This includes company profiles, contact information, business certifications, reseller agreements, and any other pertinent data required for the reseller onboarding process.

At operation 910, the computing device validates the reseller's information using integration capabilities with the Real-Time Data Exchange Module. By leveraging real-time data synchronization and access to external systems, the computing device ensures that the reseller's details are accurate and up to date. This validation step helps maintain data integrity, minimizes errors, and establishes a reliable foundation for the reseller onboarding process.

At operation 915, the computing device initiates the reseller onboarding workflow through the Collaborative Decision-Making Module. This module allows stakeholders involved in the onboarding process, such as sales representatives, legal teams, and account managers, to collaborate and make informed decisions based on the reseller's information. The SPoG UI facilitates integrated communication, file sharing, and workflow initiation, enabling stakeholders to collectively assess the reseller's suitability and efficiently progress through the onboarding steps.

At operation 920, the computing device employs the Role-Based Access Control (RBAC) Module to manage access control and permissions throughout the reseller onboarding process. The RBAC Module ensures that stakeholders only have access to the specific information and functionalities necessary for their roles. This control mechanism protects sensitive data, maintains privacy, and aligns with regulatory requirements. Authorized stakeholders can securely review and contribute to the reseller onboarding process, fostering a transparent and compliant environment.

At operation 925, the computing device provides stakeholders with a comprehensive view of the reseller onboarding process through the SPoG UI's Unified View (UV) Module. This module presents an intuitive and customizable dashboard-style layout, consolidating relevant information, milestones, and tasks associated with the reseller onboarding process. Stakeholders can monitor progress, track documentation requirements, and access real-time updates to ensure efficient and timely completion of the onboarding tasks.

At operation 930, the computing device enables stakeholders to interact with the SPoG UI's Data Visualization Module, which provides dynamic visualizations and analytics related to the reseller onboarding process. Through interactive charts, graphs, and reports, stakeholders can assess key performance indicators, identify bottlenecks, and gain insights into the overall efficiency of the onboarding process. This data-driven approach empowers stakeholders to make informed decisions, allocate resources effectively, and optimize the reseller onboarding workflow.

At operation 935, the computing device facilitates efficient collaboration among stakeholders involved in the reseller onboarding process through the Collaborative Decision-Making Module. This module enables real-time communication, document sharing, and workflow coordination, allowing stakeholders to streamline the onboarding process. By providing a centralized platform for discussion, feedback, and approvals, the SPoG UI promotes efficient collaboration and reduces delays in the reseller onboarding workflow.

At operation 940, the computing device records and maintains an audit trail of the reseller onboarding activities within the SPoG UI's Audit Trail Module. This module captures detailed information about actions taken, decisions made, and documents reviewed during the onboarding process. The audit trail enhances transparency, accountability, and compliance, serving as a valuable reference for future audits, reviews, and assessments.

At operation 945, the computing device concludes the reseller onboarding process within the SPoG UI. Once all necessary tasks, reviews, and approvals are completed, the reseller is officially onboarded into the supply chain ecosystem. The SPoG UI provides stakeholders with a summary of the onboarding process, ensuring that all requirements are met and facilitating further actions, such as contract signing, product listing, and collaboration with the reseller.

In conclusion, method 900 depicted in FIG. 9 highlights the streamlined and efficient reseller onboarding process using the SPoG UI. By leveraging real-time data integration, collaborative decision-making, role-based access control, comprehensive visualization, and audit trail functionalities, the SPoG UI empowers stakeholders to successfully onboard resellers into the supply chain ecosystem. The intuitive interface, customizable features, and robust collaboration capabilities of the SPoG UI streamline the onboarding process, enhance transparency, and foster efficient communication among stakeholders. The SPoG UI's data visualization capabilities facilitate data-driven decision-making, while the audit trail ensures compliance and provides a reliable record of the onboarding activities. Through the effective utilization of the SPoG UI, the reseller onboarding process becomes a well-orchestrated workflow, optimizing the integration of resellers and promoting business success within the dynamic supply chain environment.

Figure 10:
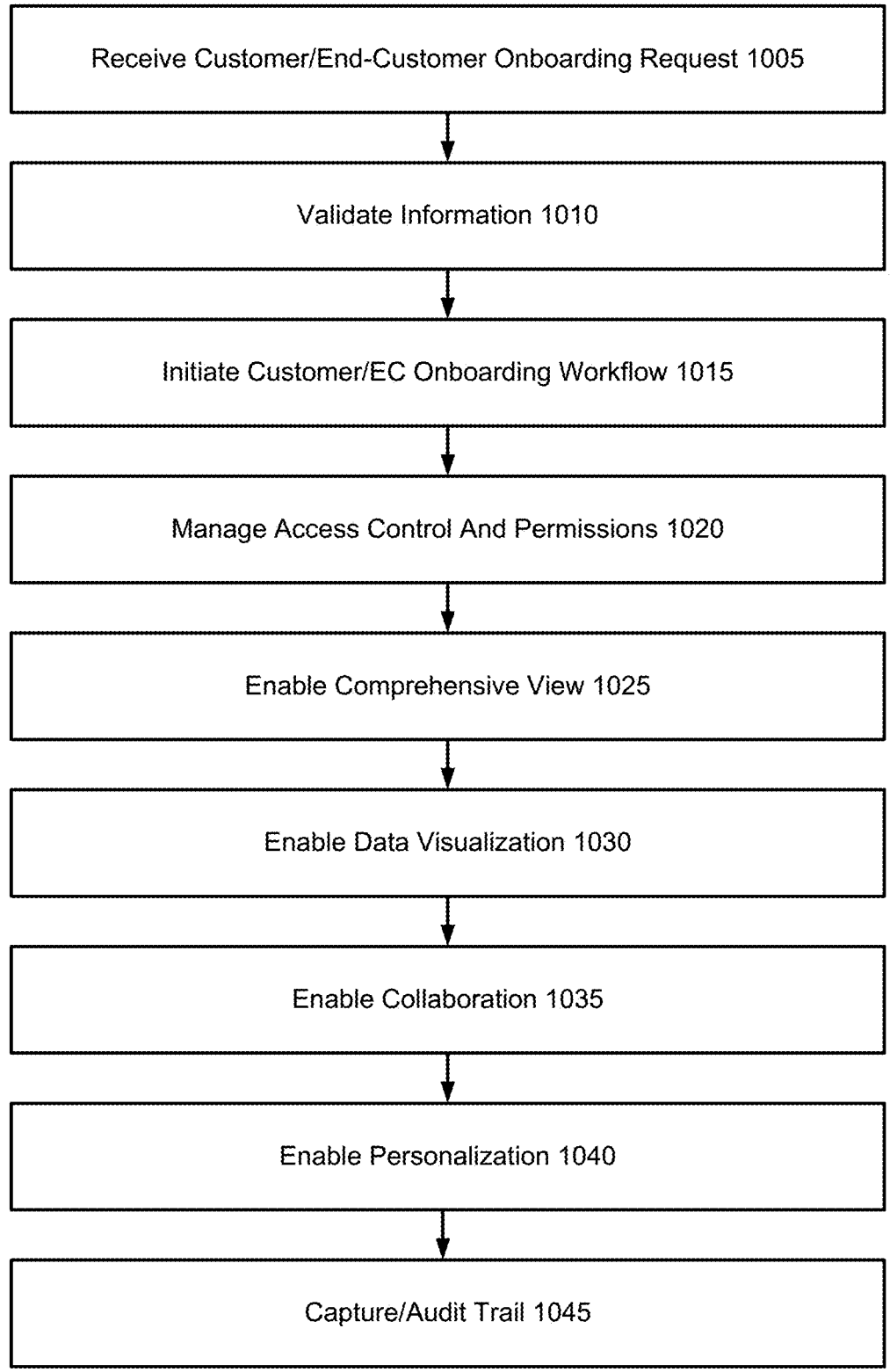
FIG. 10 is a flow diagram of a method for customer and end customer onboarding using the SPoG UI, according to some embodiments of the present disclosure.

FIG. 10 is a flow diagram of a method 1000 for customer and end customer onboarding using the SPoG UI, according to some embodiments of the present disclosure. Method 1000 outlines a comprehensive and user-centric approach to efficiently onboard customers and end customers into the supply chain ecosystem. By leveraging the capabilities of the SPoG UI, including real-time data integration, collaborative decision-making, and personalized user experiences, stakeholders can successfully onboard and engage customers, providing them with an efficient and tailored onboarding experience. Based on the disclosure herein, operations in method 1000 can be performed in a different order and/or vary to suit specific implementation requirements.

At operation 1005, the process begins when a potential customer or end customer expresses interest in joining the supply chain ecosystem. The computing device, utilizing the SPoG UI, captures the customer's or end customer's information, preferences, and requirements necessary for the onboarding process. This includes contact details, business profiles, industry-specific preferences, and any other relevant data.

At operation 1010, the computing device validates the customer's or end customer's information using real-time data integration capabilities with external systems. By synchronizing and accessing data from various sources, such as customer relationship management (CRM) systems or other enterprise-wide solutions, the computing device ensures the accuracy and completeness of the customer's or end customer's information. This validation step helps establish a reliable foundation for the onboarding process and enhances data integrity.

At operation 1015, the computing device initiates the customer or end customer onboarding workflow through the Collaborative Decision-Making Module. This module facilitates integrated communication and collaboration among stakeholders involved in the onboarding process, such as sales representatives, account managers, and customer support teams. The SPoG UI provides a centralized platform for stakeholders to collectively assess customer requirements, define personalized onboarding journeys, and make informed decisions throughout the onboarding process.

At operation 1020, the computing device utilizes the Role-Based Access Control (RBAC) Module to manage access control and permissions during the onboarding process. The RBAC Module ensures that stakeholders have appropriate access to customer or end customer data based on their roles and responsibilities. This control mechanism protects sensitive information, maintains data privacy, and aligns with regulatory requirements. Authorized stakeholders can securely review, update, and track the onboarding progress, fostering a transparent and compliant onboarding environment.

At operation 1025, the computing device leverages the SPoG UI's Unified View (UV) Module to provide stakeholders with a comprehensive and customizable dashboard-style layout of the customer or end customer onboarding process. This module consolidates relevant information, tasks, and milestones associated with the onboarding journey, offering stakeholders a holistic view of the onboarding progress. Stakeholders can monitor the status, review documentation, and access real-time updates to ensure an efficient and integrated onboarding experience.

At operation 1030, the computing device utilizes the SPoG UI's Data Visualization Module to present dynamic visualizations and analytics related to the onboarding process. Through interactive charts, graphs, and reports, stakeholders gain insights into key onboarding metrics, customer engagement levels, and potential bottlenecks. The data-driven approach empowers stakeholders to make informed decisions, optimize onboarding strategies, and personalize the onboarding experience for each customer or end customer.

At operation 1035, the computing device enables stakeholders to interact with the Collaborative Decision-Making Module to facilitate integrated collaboration during the onboarding process. Stakeholders can share documents, initiate workflows, and exchange information in real-time. The SPoG UI fosters effective communication, reducing delays and ensuring alignment among stakeholders involved in customer or end customer onboarding.

At operation 1040, the computing device employs the Customization Module to allow stakeholders to personalize the onboarding experience for each customer or end customer. Stakeholders can tailor the interface, workflows, and communications to align with the customer's or end customer's preferences, industry-specific requirements, and strategic objectives. The customization capability enhances customer satisfaction and engagement during the onboarding journey.

At operation 1045, the computing device utilizes the Audit Trail Module within the SPoG UI to maintain a detailed record of the customer or end customer onboarding activities. This module captures information about actions taken, decisions made, and documents reviewed throughout the onboarding process. The audit trail enhances transparency, accountability, and compliance, serving as a valuable reference for future audits, reviews, and assessments.

At operation 1050, the computing device concludes the customer or end customer onboarding process within the SPoG UI. Once all necessary tasks, reviews, and approvals are completed, the customer or end customer is officially onboarded into the supply chain ecosystem. The SPoG UI provides stakeholders with a summary of the onboarding process, ensuring that all requirements are met and facilitating further actions, such as account activation, provisioning of services, or personalized customer engagement.

In conclusion, method 1000 depicted in FIG. 10 illustrates the customer and end customer onboarding process facilitated by the SPoG UI. By leveraging real-time data integration, collaborative decision-making, role-based access control, comprehensive visualization, customization, and audit trail functionalities, the SPoG UI empowers stakeholders to successfully onboard customers and end customers into the supply chain ecosystem. The intuitive interface, personalized features, and robust collaboration capabilities of the SPoG UI streamline the onboarding process, enhance transparency, and foster efficient communication among stakeholders. The SPoG UI's data visualization capabilities facilitate data-driven decision-making, while the customization and audit trail modules ensure a tailored and compliant onboarding experience. Through the effective utilization of the SPoG UI, the customer and end customer onboarding processes become integrated workflows, optimizing the integration of customers and end customers and promoting business success within the dynamic supply chain environment.

Figure 11:
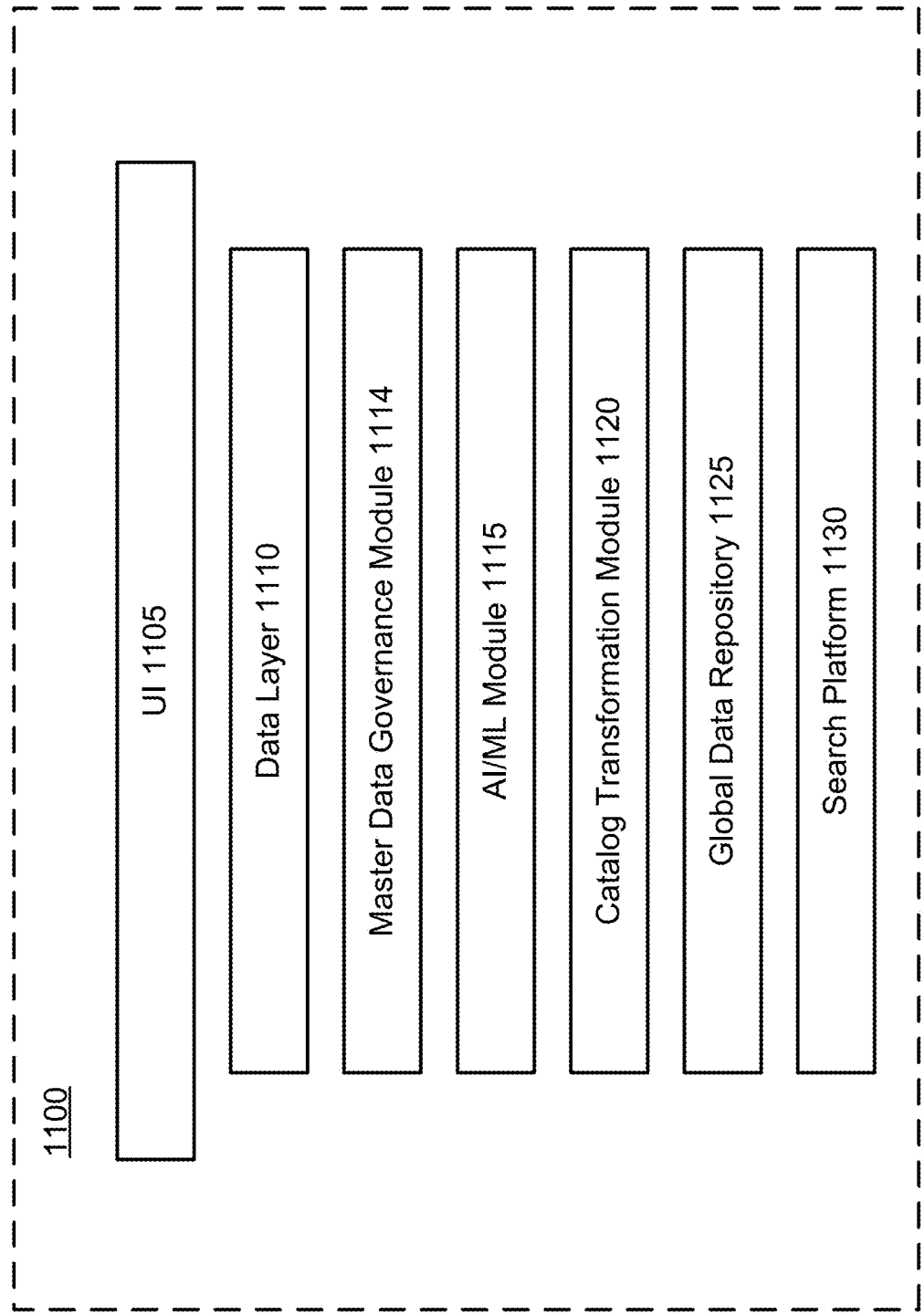
FIG. 11 depicts an embodiment of a system for managing SKUs in a distribution network, according to some embodiments.

FIG. 11 depicts system 1100 for automated SKU management, according to some embodiments. In some embodiments, system 1100 can provide a comprehensive solution for SKU management, leveraging the functionalities of the UI 1105, the data layer 1110, and Catalog Transformation module 1115. System 1100 can be configured to enhance the accuracy and efficiency of SKU management processes by enabling data exchange, real-time SKU creation, and dynamic pricing. System 1100 can be further configured to empower vendors and entities to effectively manage SKUs, optimize inventory levels, and provide superior customer experiences in the rapidly evolving marketplace.

System 1100 is provided to efficiently managing a large number of SKUs in a distribution platform. The system aims to automate SKU management and integrate with vendors to facilitate easy self-service. In some embodiments, one or more SKUs can be generated as virtual SKUs until an order is placed, at which point they become actual SKUs. The entire process is designed to be synchronous, ensuring an efficient and integrated experience for customers. The system can handle a vast number of SKUs by presenting them in the customer platform without overwhelming the backend systems. This approach enables scalability and avoids operational overhead. The SKU creation process utilizes AI/ML algorithms and proprietary algorithms within the distribution platform to transform catalogs and create virtual SKUs. Data integrity and validation are crucial aspects addressed by the system, particularly in the Master Data Governance (MDG) module. The MDG module ensures data accuracy, consistency, and quality control. The system also incorporates pricing engines to fetch and compute prices, including special pricing, for the SKUs. The architecture of the system allows for dynamic SKU creation, efficient data processing, and integration with vendors, thereby enabling scalability and aggregation of products from multiple vendors. The virtual SKU concept, powered by AI/ML algorithms and rules engines, is a significant paradigm shift that helps overcome scaling challenges and enables the handling of a broader range of SKUs. Through self-service capabilities, vendors can upload their catalogs without manual intervention, reducing operational overhead. The system incorporates caching mechanisms and data governance practices to manage SKU lifecycle, identify inactive SKUs, and retain historical data for compliance and security purposes. Overall, the system's innovative approach to SKU management, virtual SKU creation, and pricing optimization drives scalability, operational efficiency, and enhanced customer experiences.

In some embodiments, system 1100 can include one or more interconnected modules and sub-systems, each serving a specific function and contributing to the management of SKUs. In some embodiments, these components can include a Catalog Transformation module, a Real-Time Data Mesh (RTDM) module, a Master Data Governance (MDG) module, a Global Data Repository (GDR), a Search Platform, a Dynamic SKU Creation module, and a Global Pricing Engine (GPE). In some embodiments, the Real-Time Data Mesh (RTDM) module (reference number 1110) and the Engine Layer (reference number 1140) play crucial roles in facilitating real-time data management and processing.

In some embodiments, UI 1105 can serve as the central point of interaction for users within system 1100. In one non-limiting examples, UI 1105 can be an embodiment of a SPoG UI, such as SPoG UI 305, 410, 600, or any other UI, that allows users, such as one or more vendors, to easily navigate through different modules, access relevant information, and perform various tasks related to SKU management. The UI 1105 is designed to be intuitive, user-friendly, and responsive, enabling users to efficiently interact with the system.

In some embodiments, data layer 1110 can be configured to enable an efficient flow of data across the SKU management ecosystem. Data layer 1110, which can be an embodiment of RTDM module 310, 415, 500, or any other data layer, can encompasses a data lake, which serves as a scalable and robust storage infrastructure for storing structured and unstructured data related to SKUs. In some embodiments, data layer 1110 integrates with the RTDM module, enabling real-time data exchange and synchronization. This integration ensures that the data within the data layer 1110 is up-to-date and readily available for SKU management operations.

In some embodiments, data layer 1110 can be an embodiment of an RTDM module, such as RTDM module 310 or RTDM module 415, or RTDM module 500. In some embodiments, data layer 1110 can be a separate data layer that interacts with an RTDM module. As described above, an RTDM module can be configured to function as an ERP-agnostic real-time data mesh. In some embodiments, RTDM module collects and incorporates data from a System of Records layer, including the data from various enterprise systems such as ERPs, into the data lake within the Data Layer 1110.

The Data Layer 1110 acts as a repository for the harmonized and standardized data obtained from the RTDM module. Within the Data Layer 1110, various purposive datastores are deployed to store specific types of data, such as customer data, product data, finance data, and more. These purposive datastores optimize data retrieval based on specific use cases and requirements, ensuring efficient SKU management.

In the dynamic SKU process, as customers add non-transactional products to their carts, the Data Layer 1110 interacts with the RTDM module to facilitate real-time SKU creation. The Data Layer 1110, with its access to the most up-to-date and accurate data, provides the necessary information to the Dynamic SKU Creation module. This module utilizes the data from the Data Layer 1110, in conjunction with other relevant data sources, to generate SKUs in real-time within the ERP system.

By leveraging the data available within the Data Layer 1110 and the real-time capabilities of the RTDM module, system 1100 is configured to enable an efficient, accurate SKU creation process that is aligned with the most current information. This interaction between the Data Layer 1110 and the RTDM module facilitates an integrated data flow and enables the dynamic SKU creation process to be carried out effectively within the overall SKU management ecosystem.

In some embodiments, Catalog Transformation 1115 can be an embodiment of an AAML module, such as AAML module 315 or AI module 420, or the like. In some embodiments, Catalog Transformation 1115 can be a separate data layer that interacts with an AAML or AI module. In a non-limiting example, Catalog Transformation module 1115 can employ advanced AI/ML algorithms, leveraging frameworks such as TensorFlow and PyTorch. These algorithms are trained on a vast dataset of existing vendor catalog files, categorized based on a comprehensive data governance process. By utilizing deep learning techniques and neural networks, the module gains the ability to accurately propose categorization and attribute mapping for new catalogs with 80% accuracy or above.

In some embodiments, Catalog Transformation module 1115 operates by processing the vendor catalog files received from UI 1105 of system 1100. It applies the trained AI/ML models, which can encompass classification and clustering algorithms, to predict the most suitable categorization and attribute mapping for each item within the catalog.

To achieve optimal results, Catalog Transformation module 1115 can consider multiple data points, including product descriptions, keywords, and historical mapping patterns. It can employ natural language processing (NLP) techniques to analyze and extract meaningful information from textual data, enabling accurate categorization and attribute mapping.

Additionally, Catalog Transformation module 1115 can be configured to facilitate flexibility and adaptability in the catalog mapping process. It can provide a feedback mechanism that allows vendor users or internal associates to review and refine the proposed categorization and attribute mapping. This feedback can be incorporated into the module's iterative learning process, further enhancing its accuracy and performance over time.

In a non-limiting example, consider a vendor catalog that includes electronic and/or IT products such as laptops, servers, and other computing devices. Catalog Transformation 1115 module can analyze the product descriptions, identifying relevant keywords, and apply clustering algorithms to group similar products together. It can then assign appropriate categories and map the relevant attributes, such as brand, model, specifications, and pricing, to each item.

In some embodiments, Catalog Transformation module 1115 collaborates with the Master Data Governance (MDG) module 1120 to ensure data integrity and validation. Catalog Transformation module 1115 can be configured to communicate with the MDG module to validate the transformed catalogs and identifies any errors or inconsistencies in the categorization and attribute mapping process. Indications or notifications, such as a flag, are generated to alert vendors, administrators, or the like, of these issues, allowing them to make the necessary corrections and updates.

Catalog Transformation module 1115 module can be configured to operate within the broader system 1100 architecture, interacting with other components such as the Real-Time Data Mesh (RTDM) module (reference number 1110). Through this interaction, the transformed catalogs are synchronized in real-time, ensuring the availability of accurate and up-to-date product information across the system.

Catalog Transformation module 1115 leverages advanced AI/ML algorithms and a comprehensive tech stack to transform vendor catalog files into a standardized format. Through the application of deep learning techniques and iterative learning processes, it accurately predicts categorization and attribute mapping for each catalog item. This module enhances efficiency in SKU management, streamlines operations, and provides businesses with the capability to effectively manage their product catalogs.

The AI/ML module (AAML) 1115 leverages advanced analytics and machine learning algorithms to enhance SKU management capabilities within system 1100. In some non-limiting examples, the AAML 1115 can utilize technologies such as Apache Spark, TensorFlow, and scikit-learn to extract valuable insights from the data. These algorithms enable the AAML 1115 to automate repetitive tasks, predict demand patterns, optimize inventory levels, and improve overall SKU management efficiency.

In a non-limiting example, Catalog Transformation module within system 1100 utilizes the data layer 1110 and the AAML 1115 to transform diverse catalog files into a standardized format. The AAML 1115, trained with existing catalog datasets, predicts categorization and attribute mapping for new catalogs, ensuring accurate and efficient transformation. The transformed catalogs are then validated by the MDG module and stored in the GDR, ensuring data integrity and consistency.

The RTDM module, integrated with the data layer 1110, enables real-time data synchronization across the SKU management ecosystem. It facilitates data exchange and ensures that all system components have access to the most up-to-date information for SKU management operations. This real-time data exchange capability enhances the accuracy and efficiency of SKU management processes.

The Dynamic SKU Creation module, in collaboration with the GDR and the RTDM module, enables the creation of SKUs in real-time for non-transactional products. When customers add these products to their carts, the Dynamic SKU Creation module generates SKUs in the ERP system, facilitating order processing and fulfillment. The GPE, integrated with the data layer 1110, determines real-time pricing for the catalog items based on vendor price files, market trends, and historical pricing data.

In some embodiments, SPoG UI 1105 presents a unified view of various system elements and functionalities, delivering a user-friendly experience by consolidating multiple system components into a singular platform. It supports multiple data inputs, including vendor catalogs in diverse formats. In some embodiments, SPoG UI 1105 receives this catalog data and interfaces with other system components to enable efficient SKU management.

In some embodiments, RTDM module 1110 is a vital component that facilitates real-time data synchronization across system components. It works in tandem with SPoG UI 1105, ensuring the interface displays accurate real-time data, critical during SKU creation and inventory management. In some embodiments, RTDM 1110 enables real-time interactions between users and the system, allowing for instantaneous updates to be reflected across the system.

Incorporating the AAML module 1115, the system transforms catalog files into a standardized format using machine learning models. This module predicts and proposes catalog item categorizations and attribute mappings, maintaining a feedback loop to enhance prediction accuracy over time. The AAML 1115 is trained with existing datasets and uses iterative learning to improve its predictions, contributing to its robustness and versatility in handling diverse catalog formats.

The MDG module 1120 validates the transformed catalogs, ensuring data accuracy and reliability. In some embodiments, MDG 1120 communicates errors back to vendors, enabling correction and re-upload of corrected catalog data via SPoG UI 1105. This continuous feedback loop further enriches the data input into the AAML module 1115, thereby enhancing the overall system's performance and accuracy.

The GDR 1125 plays a significant role in storing validated catalogs and maintaining data integrity. It collaborates with the RTDM 1110 to support real-time data synchronization, ensuring that all components have access to the most accurate and current data. The GDR 1125 also facilitates the MDG 1120 by storing a record of previously validated catalogs, thus providing a comprehensive repository for the system.

The Search Platform 1130 is integral to the retrieval and indexing of stored catalogs. It works synergistically with the SPoG UI 1105, providing users with a product discovery experience. The Search Platform 1130 also interacts with the RTDM 1110 for real-time data updates, which enhances the relevance and accuracy of search results.

In some embodiments, the system 1100 may include additional modules such as a Dynamic SKU Creation module 1135 and a Global Pricing Engine (GPE) 1140. The Dynamic SKU Creation module 1135 generates SKUs for non-transactional products dynamically during checkout, enabling these products to be added to customer carts. On the other hand, the GPE 1140 determines real-time pricing for the catalog items based on diverse factors like vendor price files, market trends, and historical pricing data.

As described above data layer 1110 can be an embodiment of an RTDM module (e.g., 310, 415, 500) that leverages the principles of a data mesh, integrating interconnected components, processes, and sub-systems to enable efficient real-time data management and analysis. In one non-limiting example, RTDM module 1110 can incorporate a cloud-based infrastructure that includes a data lake (e.g., Data Lake 522 as depicted in FIG. 5) and purposive datastores (PDSes) (e.g., PDSes 524.1 to 524.N). The data lake can be configured to provide scalable and fault-tolerant data storage capabilities, while the PDSes are optimized repositories for storing specific types of data relevant to the SKU management domain.

The Engine Layer 1140 within system 1100 represents a collection of interconnected systems responsible for specialized data ingestion, processing, transformation, and integration. Engine layer 1140 can be an embodiment of one or more engines 540, as depicted in FIG. 5. For example, engine layer 1140 can include one or more engines configured to operate autonomously and perform distinct functionalities within the system, such as an engine configured to determine real-time pricing for one or more catalog items based on diverse factors like vendor price files, market trends, and historical pricing data.

In a non-limiting example, the Engine Layer 1140 can include recommendation engines, insights engines, subscription management engines, and various other specialized engines tailored to meet the specific needs of SKU management. These engines utilize the harmonized data stored in the data mesh to deliver targeted business logic and services.

The Engine Layer 1140 is designed to receive data from multiple sources, including transactional systems, IoT devices, and external data providers. It processes the incoming data, applies algorithms for data cleansing, aggregation, and enrichment, and prepares the data for further analysis and integration within the system.

In some embodiments, the Engine Layer 1140 also incorporates a Data Distribution Mechanism (reference number 1145), similar to the Data Distribution Mechanism 545 in FIG. 5. This mechanism includes one or more APIs to facilitate the distribution of data from the data mesh and engines to various endpoints, including user interfaces and external systems.

Engine Layer 1140, an embodiment of headless engines 540 can perform operations to facilitate the SKU management system and contribute functionalities and advanced algorithms for category assignments, pricing, and other tasks related to SKU management. Engine Layer 1140 can be operably connected to other engines and interconnected elements of RTDM module 500 that operate autonomously to deliver specialized services and enable efficient processing of incoming catalog items.

For example, Engine Layer 1140 can include a Category Assignment Engine (CAE) responsible for assigning categories to catalog items based on their attributes and characteristics. In some embodiments, the CAE can be configured to perform one or more techniques, including natural language processing (NLP), machine learning, and rule-based systems, to perform accurate and automated categorization.

Using NLP algorithms, the CAE analyzes the textual descriptions of the catalog items, extracting relevant keywords and phrases. It can then map terms to a predefined category hierarchy, considering synonyms, abbreviations, and variations in language usage. Machine learning models trained on vast amounts of historical data assist in recognizing patterns and relationships between attributes and categories, enhancing the accuracy of categorization.

Additionally, the CAE utilizes rule-based systems to incorporate specific business rules and logic. These rules can be customized to match the unique requirements of the SKU management system, allowing for fine-grained control over category assignments. For example, rules may be defined to prioritize certain attributes or consider specific criteria when assigning categories, ensuring consistent and accurate results.

To support the pricing aspect of the SKU management system, the Engine Layer 1140 incorporates the Pricing Engine (PE), which determines optimal pricing for catalog items based on various factors. The PE considers inputs such as vendor price files, market trends, historical pricing data, and predefined pricing algorithms or rules.

The PE leverages advanced algorithms to analyze the pricing inputs and generate competitive and profitable prices. For instance, it may employ machine learning algorithms, such as regression models or neural networks, to predict optimal price ranges based on historical sales data and market dynamics. Alternatively, it can utilize rule-based systems that incorporate pricing strategies and guidelines set by the business.

The Engine Layer 1140 also interfaces with the Real-Time Data Mesh (RTDM) module, a scalable and fault-tolerant data storage infrastructure that ensures real-time data management and analysis. The RTDM module integrates with various enterprise systems, such as ERPs, to capture real-time changes and harmonize data for efficient processing within the SKU management system.

By leveraging the harmonized and standardized data within the RTDM module, the engines in the Engine Layer 1140 make informed decisions during the category assignment and pricing processes. They retrieve relevant information, such as customer data, product data, finance data, and more, from the RTDM module to enhance accuracy and consistency.

Moreover, the Engine Layer 1140 incorporates advanced data processing capabilities through technologies such as Apache Spark or Apache Flink. These distributed computing frameworks enable parallel processing and distributed computing across large-scale datasets, facilitating efficient analysis and computation for category assignments and pricing.

In some embodiments, the Engine Layer 1140 can also utilize machine learning algorithms, such as clustering or classification models, to identify patterns or group similar catalog items together. This can aid in accurate category assignments and facilitate dynamic pricing strategies based on product similarities or customer segmentation.

Furthermore, the Engine Layer 1140 encompasses fine-grained access control mechanisms and authentication protocols to ensure data security and prevent unauthorized access to sensitive information. Data lineage and audit trail mechanisms track the origin and history of data, ensuring compliance with regulatory requirements and maintaining data integrity.

The Engine Layer 1140 operates in real-time, continuously monitoring incoming catalog items and updating category assignments and pricing information as new data becomes available. It efficiently handles large volumes of catalog items, ensuring scalability and performance within the SKU management system.

Engine Layer 1140 is integrated with RTDM module to utilize advanced algorithms and incorporate customizable business rules to ensure accurate categorization and competitive pricing, ultimately driving improved productivity and customer satisfaction. By leveraging the capabilities of the Engine Layer 1140, system 1100 enables vendors and other entities to automate and streamline category assignments and pricing operations, reducing manual efforts and improving overall efficiency. The integration with the RTDM module, advanced algorithms, and data processing technologies empower headless engines of Engine Layer 1140 to deliver accurate and timely results, enhancing the effectiveness of the SKU management system within system 1100.

The combination of the RTDM module 1110, the Engine Layer 1140, and other system components within system 1100 enables data flow, real-time insights, and efficient management of SKU-related information. Through the integration of diverse technology stacks, data processing frameworks, and distribution mechanisms, businesses can leverage the power of system 1100 to streamline their SKU management processes, optimize operations, and make data-driven decisions.

Overall, the RTDM module 1110 and the Engine Layer 1140 within system 1100 provide the necessary infrastructure and capabilities to handle real-time data management, processing, and analysis, ensuring efficient SKU management operations.

FIG. 11 depicts an embodiment of a system for SKU management, referred to as system 1100. In this implementation, System 1100 incorporates specific components that enable efficient and accurate SKU management, including a user interface (UI) 1105, a data layer 1110, and an AI/ML module (AAML) 1115. These components work together to streamline the process of SKU creation, management, and pricing, enhancing the overall efficiency of the system. FIG. 11 depicts an embodiment of a system for SKU management, referred to as system 1100. In this implementation, System 1100 incorporates specific components that enable efficient and accurate SKU management, including a user interface (UI) 1105, a data layer 1110, and an AI/ML module (AAML) 1115. These components work together to streamline the process of SKU creation, management, and pricing, enhancing the overall efficiency of the system.

Figure 12:
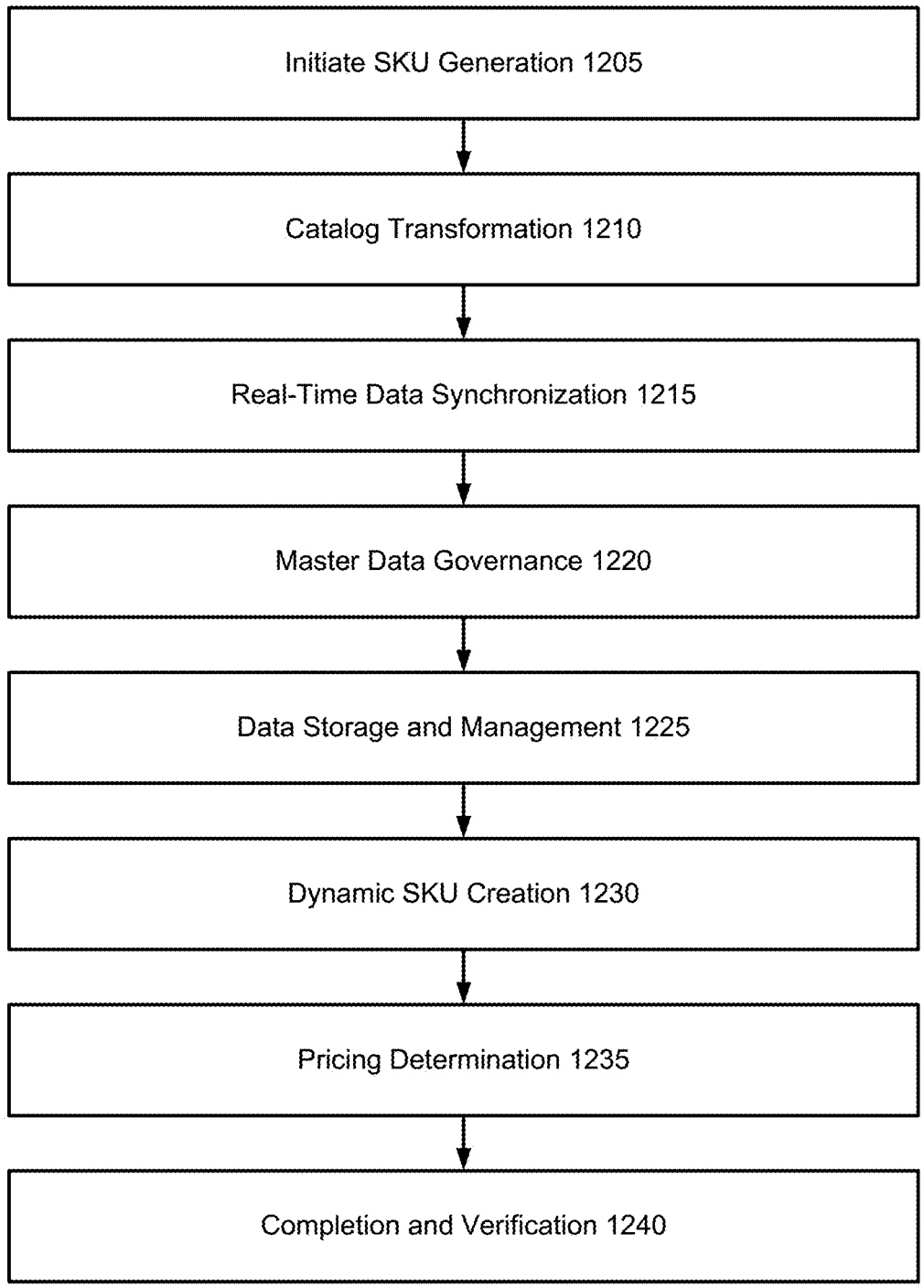
FIG. 12 is a flow diagram of a method for managing SKUs in a distribution network, according to some embodiments of the present disclosure.

FIG. 12 depicts a process flow for SKU generation, which is an integral part of the onboarding process within system 1200, as described in FIG. 11. This process flow outlines the steps involved in efficiently generating SKUs based on vendor catalog files, ensuring accuracy, real-time synchronization, and integration within the SKU management ecosystem.

At operation 1205, includes SKU generation process initiation when the system receives vendor catalog files. These catalog files contain information about the products offered by the vendor, including their descriptions, attributes, and pricing details. Triggering the SKU generation process allows the system to transform these catalogs into standardized and structured data, facilitating efficient SKU management.

Operation 1210 can include a Catalog Transformation step. Within this step, advanced AI/ML algorithms are applied to the vendor catalog files to transform them into a standardized format. Leveraging techniques such as deep learning and neural networks, the algorithms predict categorization and attribute mapping for each item in the catalog. These predictions are based on the analysis of product descriptions, keywords, historical mapping patterns, and other relevant data points. The Catalog Transformation module further enhances the accuracy of predictions by employing natural language processing (NLP) techniques to extract meaningful information from textual data. The module also allows for feedback and refinement of the proposed categorization and attribute mapping, incorporating iterative learning processes to continuously improve prediction accuracy.

To ensure real-time availability and synchronization of SKU information, operation 1215 can include Real-Time Data Synchronization. The transformed catalogs from the Catalog Transformation step are synchronized with the data layer within the system. This synchronization guarantees that the SKU information remains up-to-date and readily available for SKU management operations. By integrating the Real-Time Data Mesh (RTDM) module, the system facilitates data exchange and synchronization, allowing stakeholders to access the most accurate and current SKU information.

Operation 1220 can include a Master Data Governance (MDG) step, which is crucial for maintaining data integrity and validation. The transformed catalogs are validated within the MDG module to ensure their accuracy, consistency, and compliance with data governance practices. This validation process identifies any errors or inconsistencies in the categorization and attribute mapping of the catalogs. Stakeholders, such as vendors or administrators, are notified of these issues through indications or notifications, enabling them to make the necessary corrections and updates. The MDG module plays a significant role in maintaining data quality and reliability throughout the SKU generation process.

Operation 1225 can include Data Storage and Management. The validated and transformed catalogs are stored within the Global Data Repository (GDR) to ensure data integrity and accessibility. The GDR acts as a central repository for the standardized and harmonized data obtained from the Real-Time Data Mesh (RTDM) module. This data storage mechanism supports real-time data synchronization and facilitates the availability of accurate and up-to-date SKU information across the system. Additionally, the GDR retains historical data for compliance and security purposes, providing a comprehensive repository for SKU-related information.

Operation 1230 can include a Dynamic SKU Creation step. During this step, the system generates SKUs in real-time for non-transactional products, typically during the checkout process. By leveraging the transformed and synchronized catalog data, the system dynamically creates SKUs within the ERP system. This enables efficient order processing and fulfillment by associating the appropriate SKUs with the selected products. The real-time nature of this process ensures that customers can add non-transactional products to their carts and complete their purchases without delays.

Operation 1235 can include Pricing Determination. Within this step, the system determines the real-time pricing for catalog items. The pricing engine, integrated with the data layer, fetches relevant data such as vendor price files, market trends, and historical pricing data. Using advanced algorithms, such as machine learning models or rule-based systems, the pricing engine analyzes this data to generate competitive and profitable prices for the catalog items. The determination of real-time pricing enhances the overall pricing optimization process, ensuring accurate and up-to-date pricing information for SKU management operations.

Operation 1240 can include termination and verification of the SKU generation process. At this stage, the entire SKU generation process is completed, and the system verifies the generated SKUs and pricing information for accuracy. Any necessary actions, such as order processing or further SKU management operations, can be initiated based on the generated SKUs. This step concludes the SKU generation process, which is designed to enhance the efficiency, accuracy, and integration of SKU management within the system.

The process flow depicted in FIG. 12 illustrates the steps involved in the SKU generation process related to the onboarding process within system 1200. By leveraging advanced AI/ML algorithms, real-time data synchronization, and data governance practices, the system ensures accurate and timely generation of SKUs based on vendor catalog files. This process flow supports integration, scalability, and efficiency in managing a large number of SKUs, ultimately enhancing the overall SKU management capabilities within the system.

Figure 13:
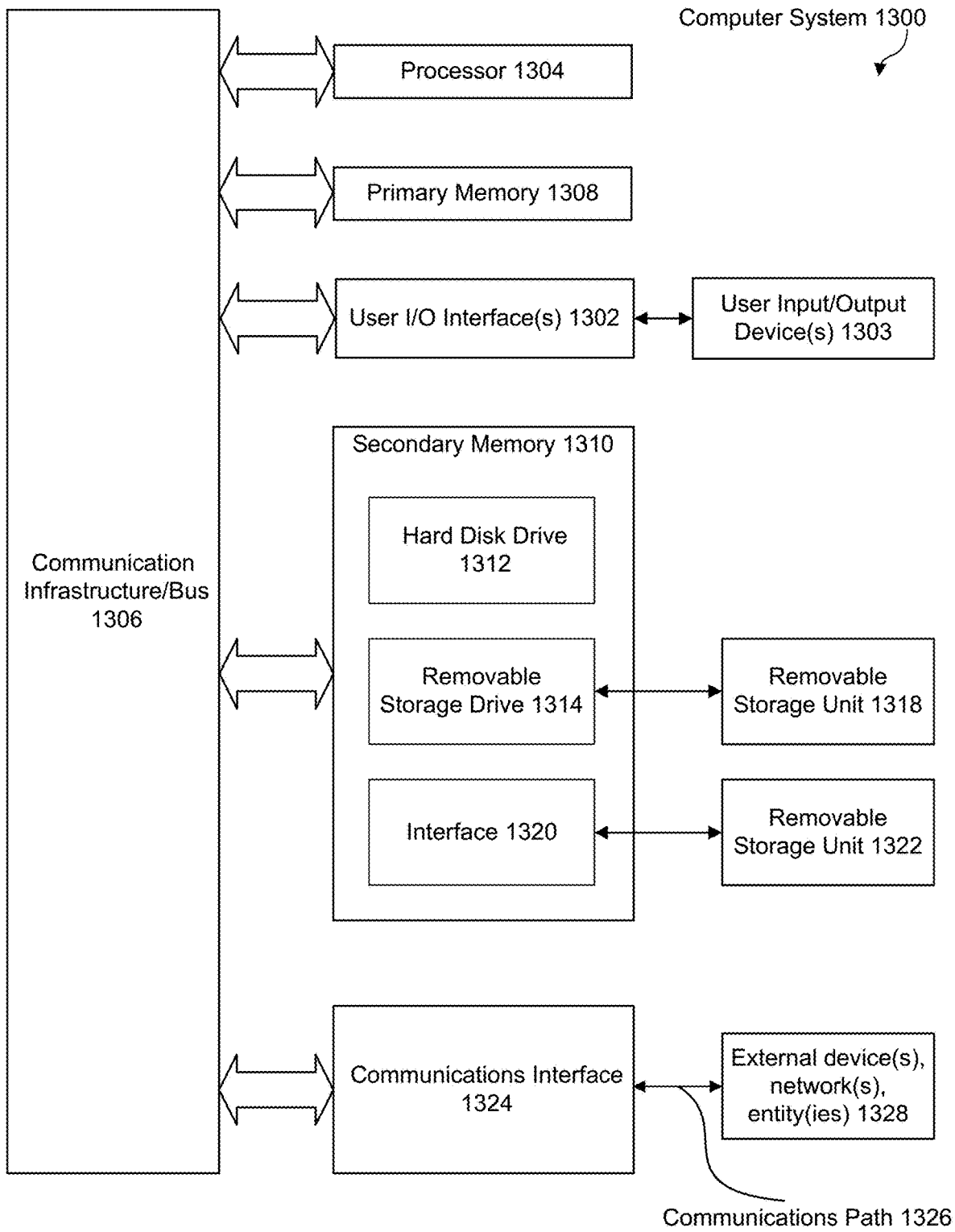
FIG. 13 is a block diagram of example components of device, according to some embodiments of the present disclosure.

FIG. 13 is a block diagram of example components of device 1300. One or more computer systems 1300 may be used, for example, to implement any of the embodiments discussed herein, as well as combinations and sub-combinations thereof. Computer system 1300 may include one or more processors (also called central processing units, or CPUs), such as a processor 1304. Processor 1304 may be connected to a communication infrastructure or bus 1306.

Computer system 1300 may also include user input/output device(s) 1303, such as monitors, keyboards, pointing devices, etc., which may communicate with communication infrastructure 1306 through user input/output interface(s) 1302.

One or more processors 1304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 may also include a main or primary memory 1308, such as random access memory (RAM). Main memory 1308 may include one or more levels of cache. Main memory 1308 may have stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314.

Removable storage drive 1314 may interact with a removable storage unit 1318. Removable storage unit 1318 may include a computer-usable or readable storage device having stored thereon computer software (control logic) and/or data. Removable storage unit 1318 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 1314 may read from and/or write to removable storage unit 1318.

Secondary memory 1310 may include other means, devices, components, instrumentalities or other approaches for allowing computer programs and/or other instructions and/or data to be accessed by computer system 1300. Such means, devices, components, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 may enable computer system 1300 to communicate and interact with any combination of external devices, external networks, external entities, etc. (individually and collectively referenced by reference number 1328). For example, communication interface 1324 may allow computer system 1300 to communicate with external or remote devices 1328 over communications path 1326, which may be wired and/or wireless (or a combination thereof), and which may include any combination of LANs, WANs, the Internet, etc. Control logic and/or data may be transmitted to and from computer system 1300 via communication path 1326.

Computer system 1300 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 1300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), may cause such data processing devices to operate as described herein.

Figure 14A:
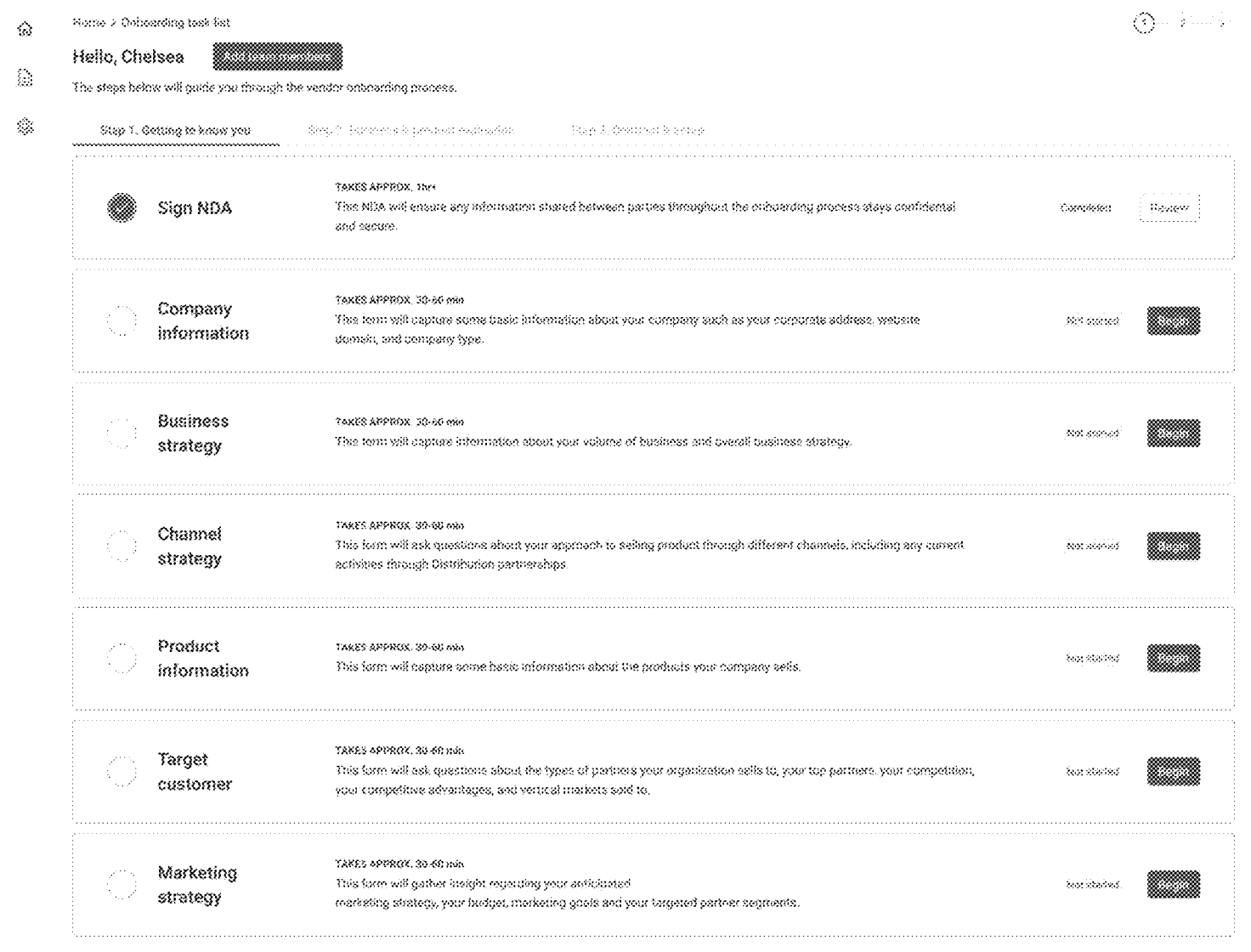

FIGS. 14A to 14Q depict various screens and functionalities of the SPoG UI related to vendor onboarding, partner dashboard, customer carts, order summary, SKU generation, order tracking, shipment tracking, subscription history, and subscription modifications. A detailed description of each figure is provided below:

FIG. 14A depicts a Vendor Onboarding Initiation screen that represents the initial step of the vendor onboarding process. It provides a form or interface where vendors can express their interest in joining the supply chain ecosystem. Vendors can enter their basic information, such as company details, contact information, and product catalogs.

Figure 14B:
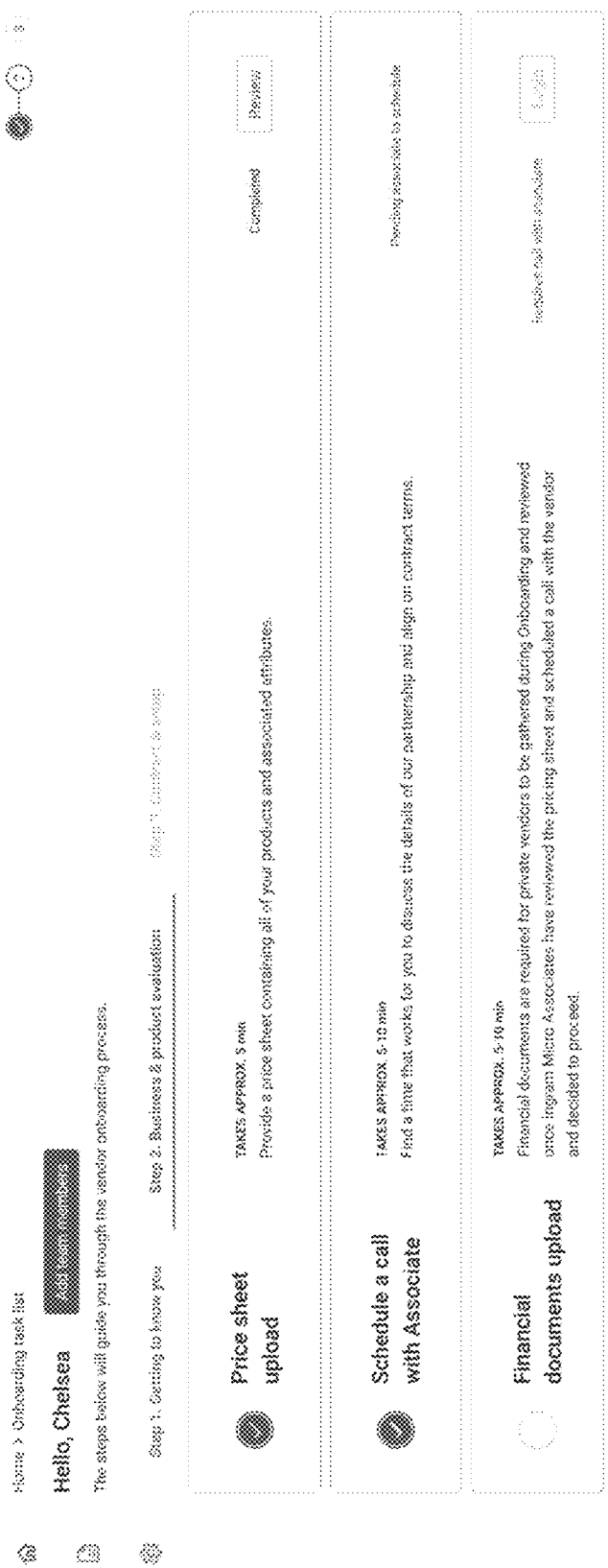
FIGS. 14A to 14Q depict various screens and functionalities of the SPoG UI, according to some embodiments.

FIG. 14B depicts a Vendor Onboarding Guide that displays a step-by-step guide or checklist for vendors to follow during the onboarding process. It outlines the necessary tasks and requirements, ensuring that vendors have a clear understanding of the onboarding process and can progress smoothly.

Figure 14C:
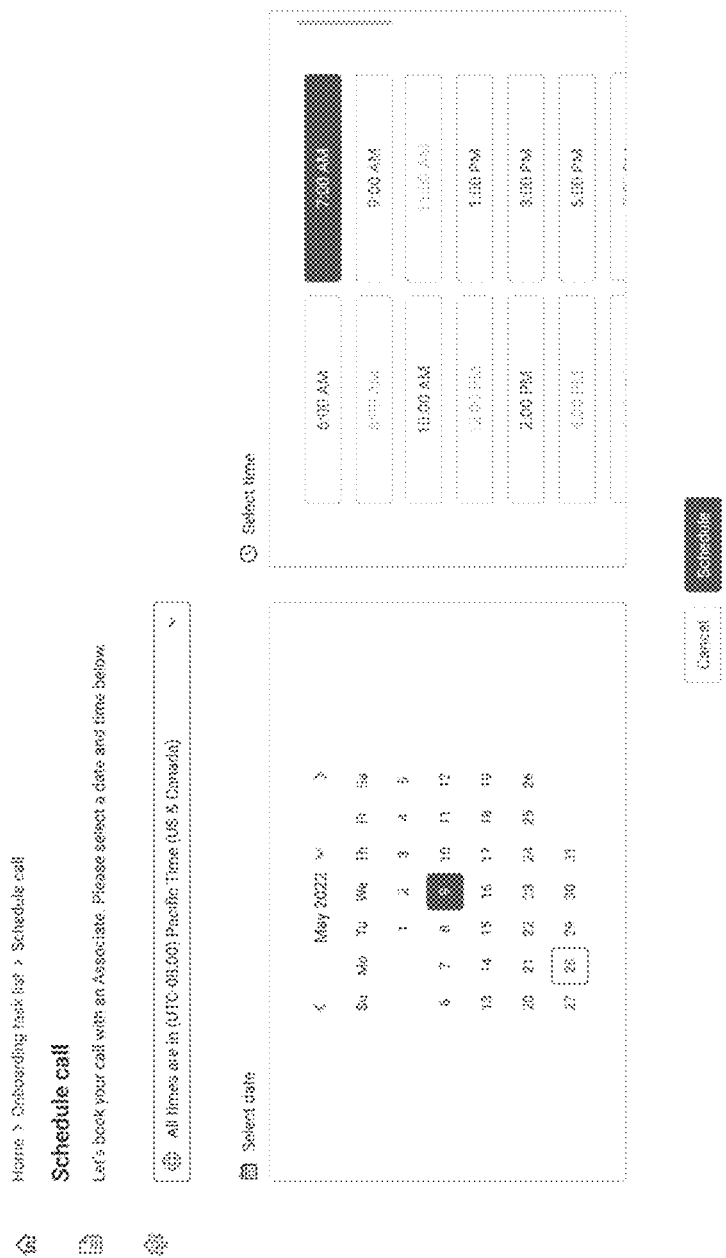
Figure 14D:
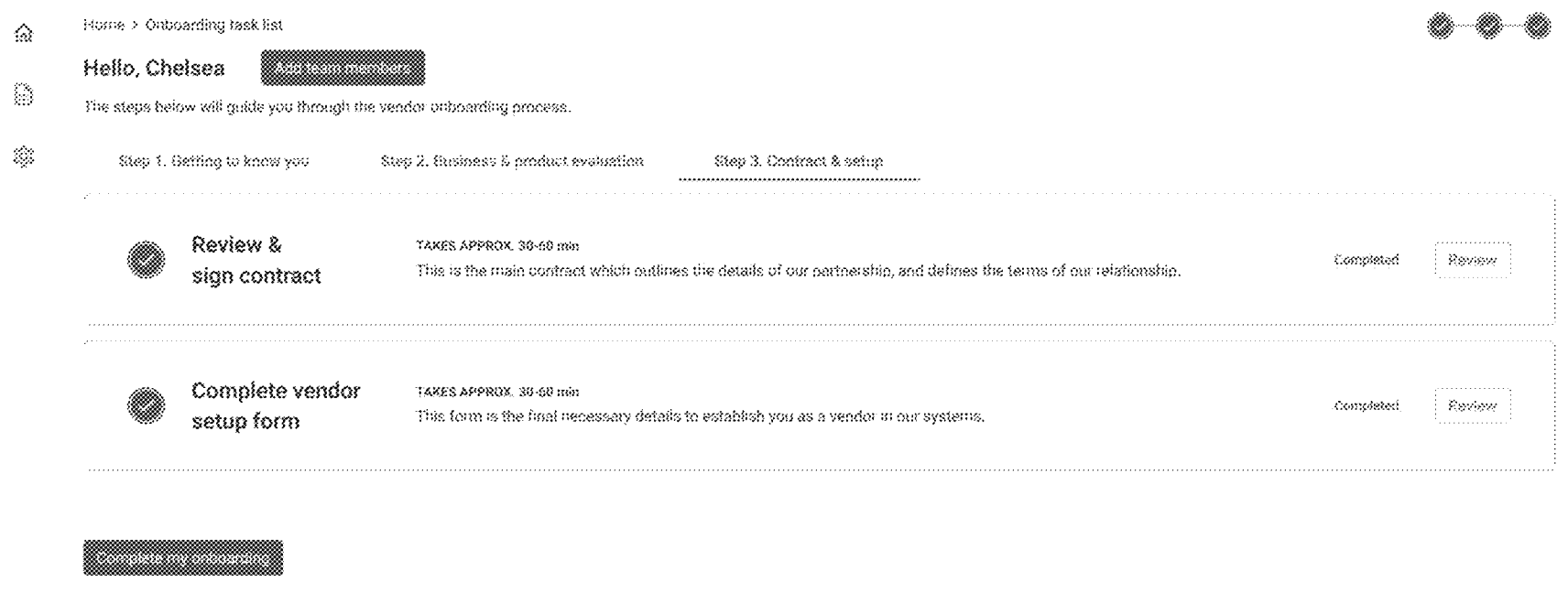

FIG. 14C depicts a Vendor Onboarding Call Scheduler that facilitates scheduling calls or meetings between vendors and platform associates or representatives responsible for guiding them through the onboarding process. Vendors can select suitable time slots or request a call, ensuring effective communication and assistance throughout the onboarding journey.

FIG. 14D depicts a Vendor Onboarding Task List that presents a comprehensive task list or dashboard that outlines the specific steps and actions required for successful vendor onboarding. It provides an overview of pending tasks, completed tasks, and upcoming deadlines, helping vendors track their progress and ensure timely completion of each onboarding task.

Figure 14E:
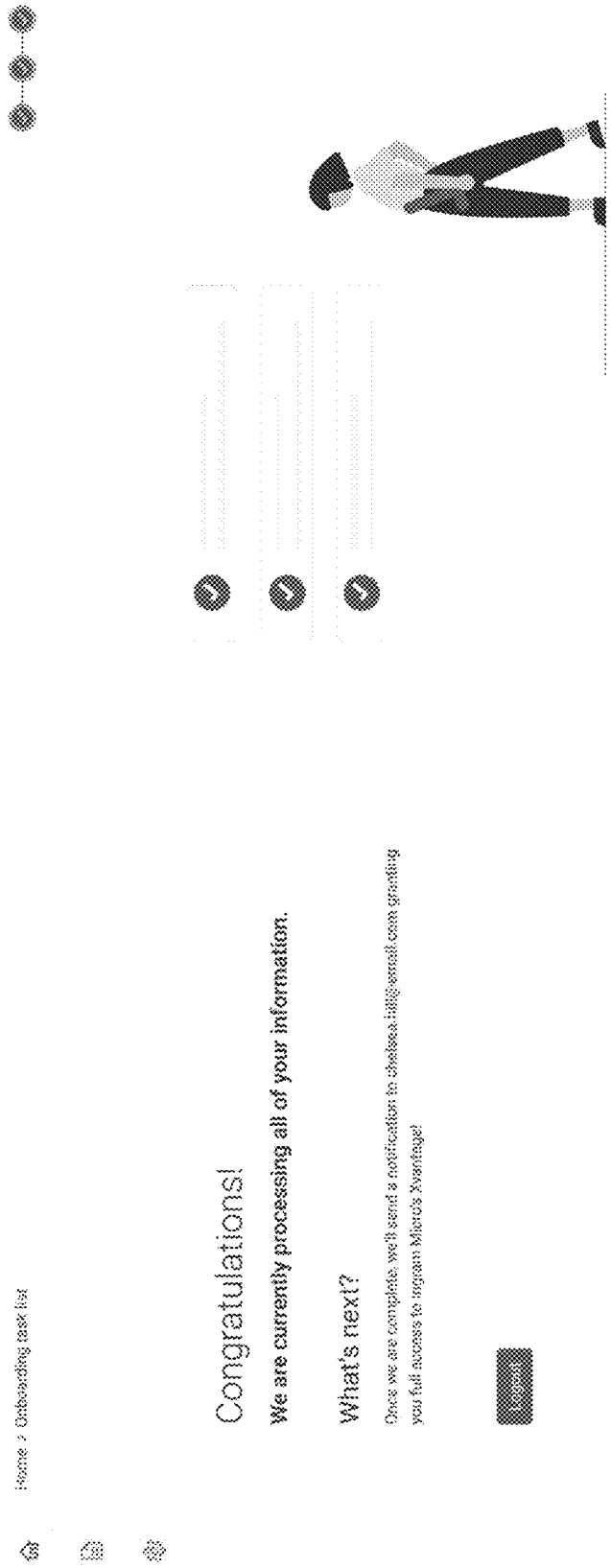

FIG. 14E depicts a Vendor Onboarding Completion Screen that confirms the successful completion of the vendor onboarding process. It may display a congratulatory message or summary of the completed tasks, indicating that the vendor is now officially onboarded into the supply chain ecosystem.

Figure 14F:
Figure 14G:
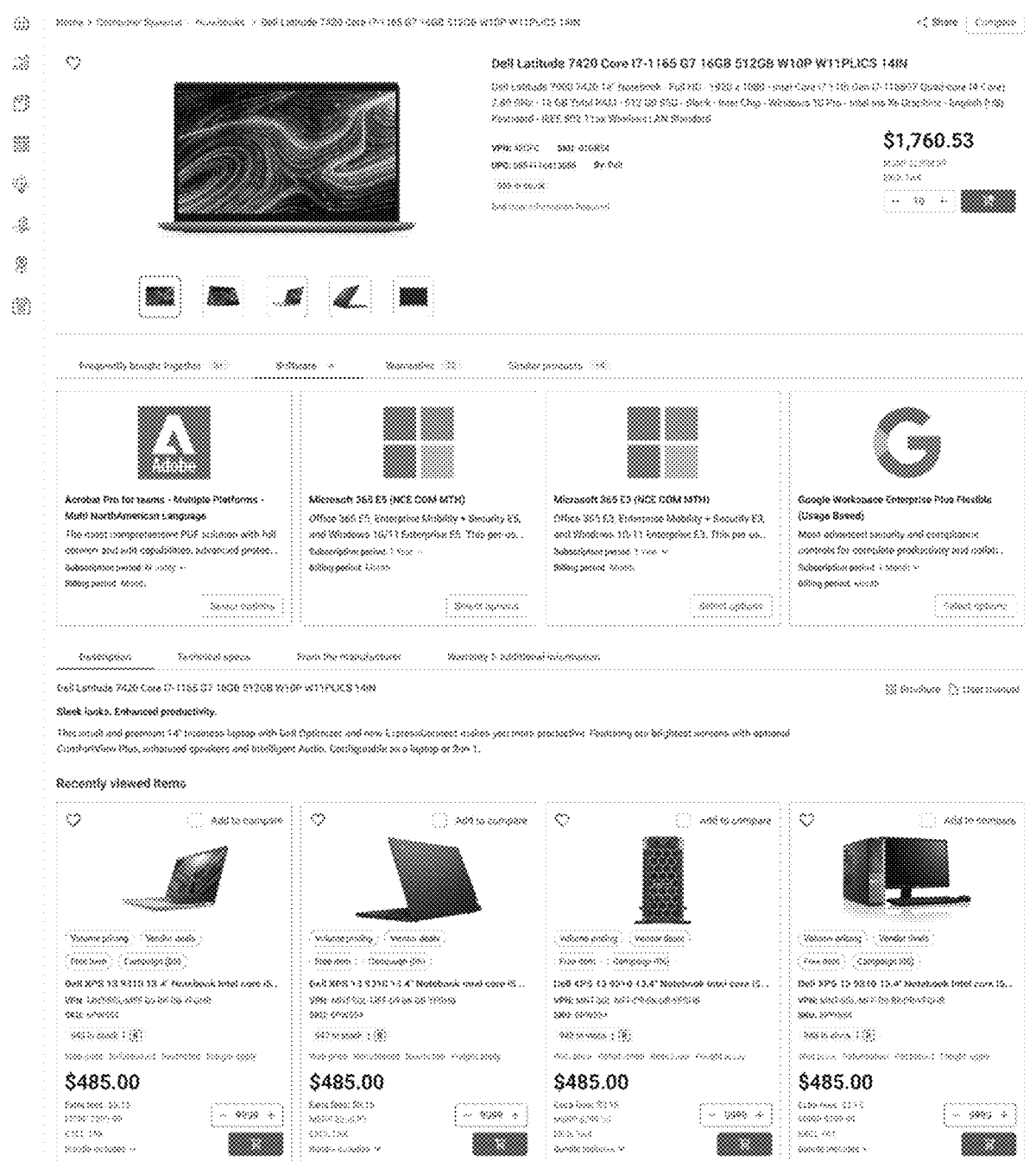
Figure 14H:
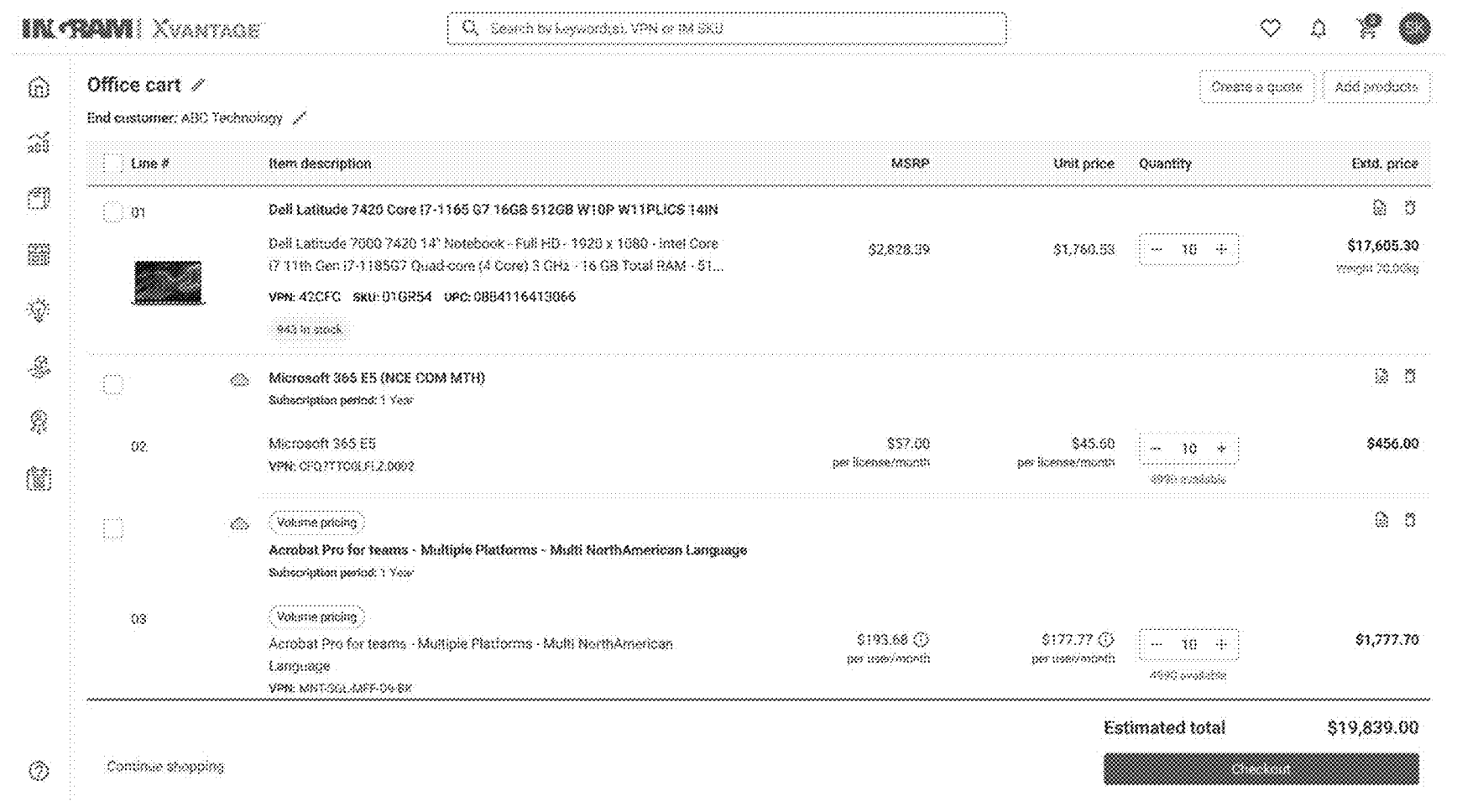
Figure 14I:
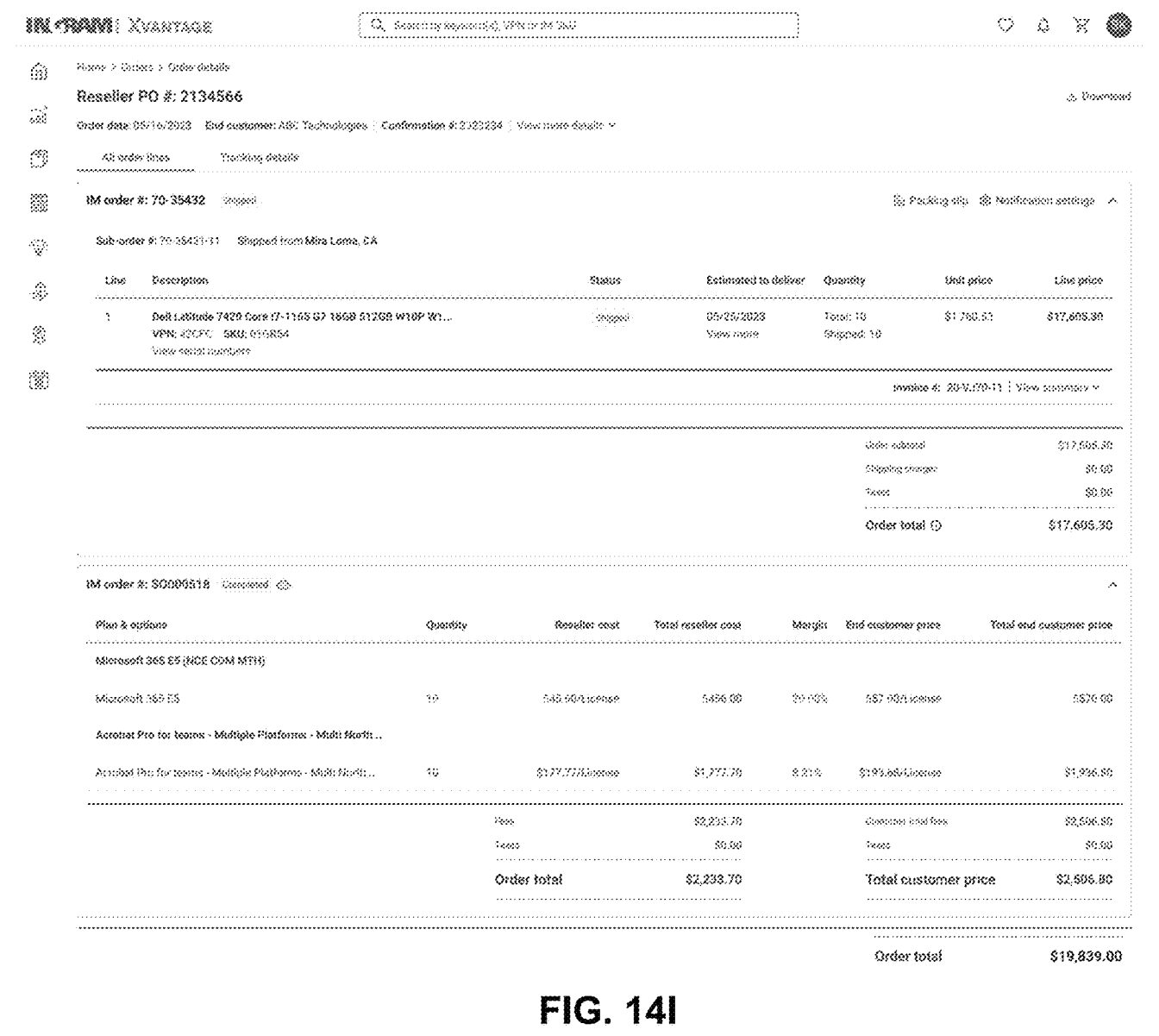
Figure 14J:
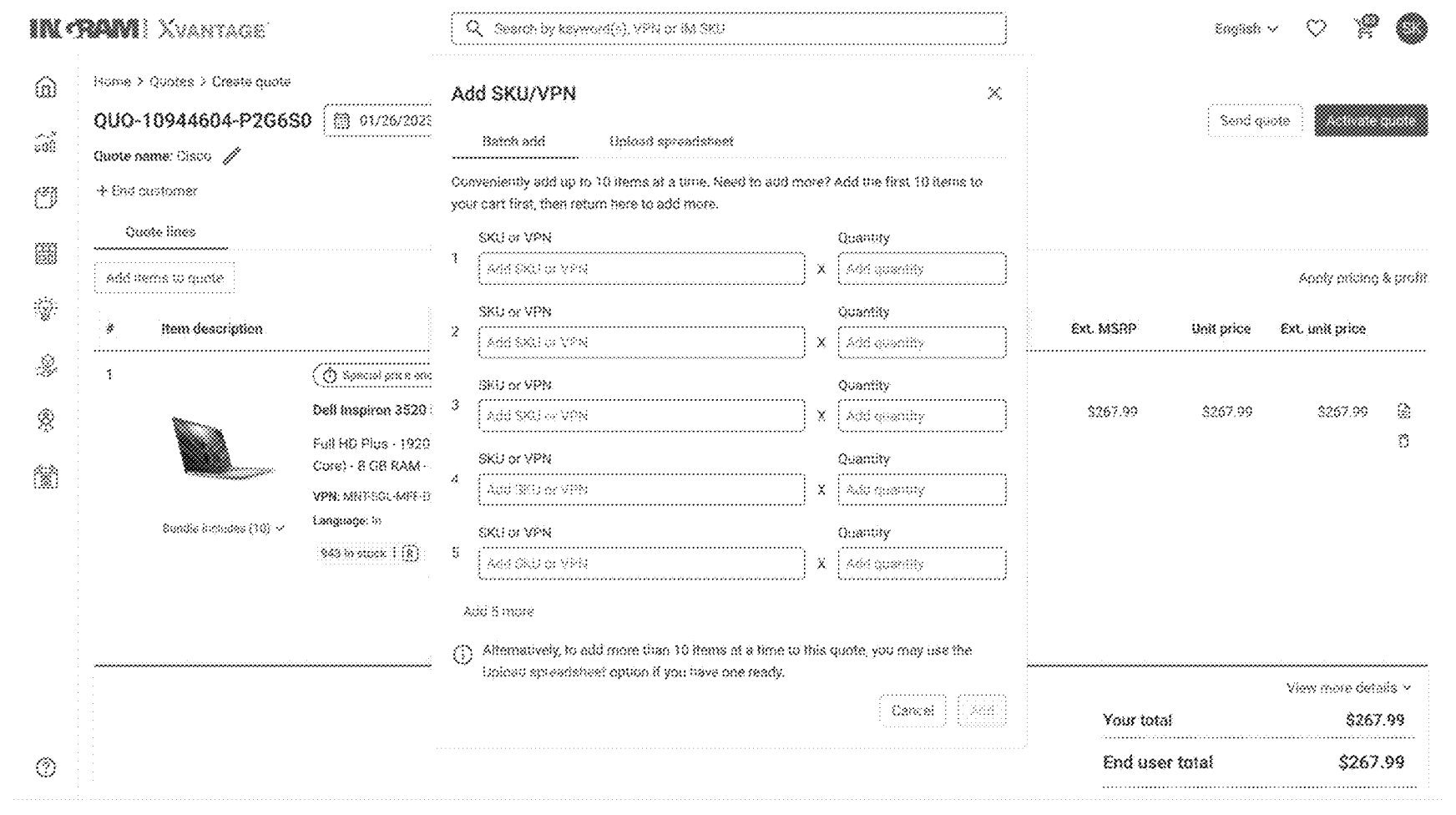

FIG. 14F depicts a Partner Dashboard that offers partners or stakeholders a centralized view of relevant information and metrics related to their partnership with the supply chain ecosystem. It provides an overview of performance indicators, key data points, and actionable insights to facilitate effective collaboration and decision-making.

FIG. 14G depicts a Customer Product Cart that represents the customer's product cart, where they can add items they wish to purchase. It displays a list of selected products, quantities, prices, and other relevant details. Customers can review and modify their cart contents before proceeding to the checkout process.

FIG. 14H depicts a Customer Subscription Cart that allows customers to manage their subscription-based purchases. It displays the selected subscription plans, pricing, and duration. Customers can review and modify their subscription details before finalizing their choices.

FIG. 14I depicts a Customer Order Summary that provides a summary of the customer's order, including details such as the products or subscriptions purchased, quantities, pricing, and any applied discounts or promotions. It allows customers to review their order before confirming the purchase.

FIG. 14J depicts a Vendor SKU Generation screen for generating unique Stock Keeping Unit (SKU) codes for vendor products. It may include fields or options where vendors can specify the product details, attributes, and pricing, and the system automatically generates the corresponding SKU code.

Figure 14K:
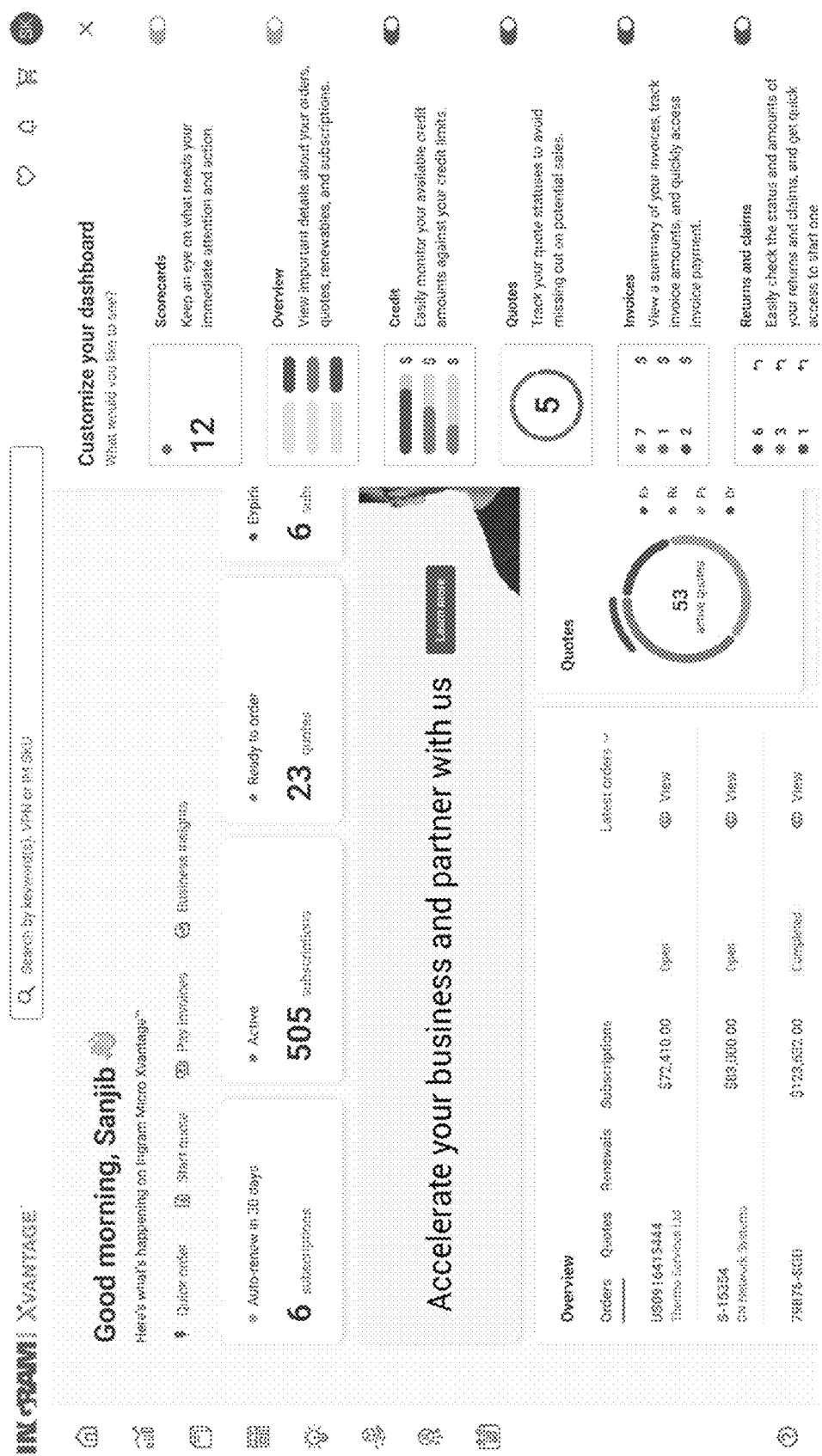
Figure 14L:
Figure 14M:
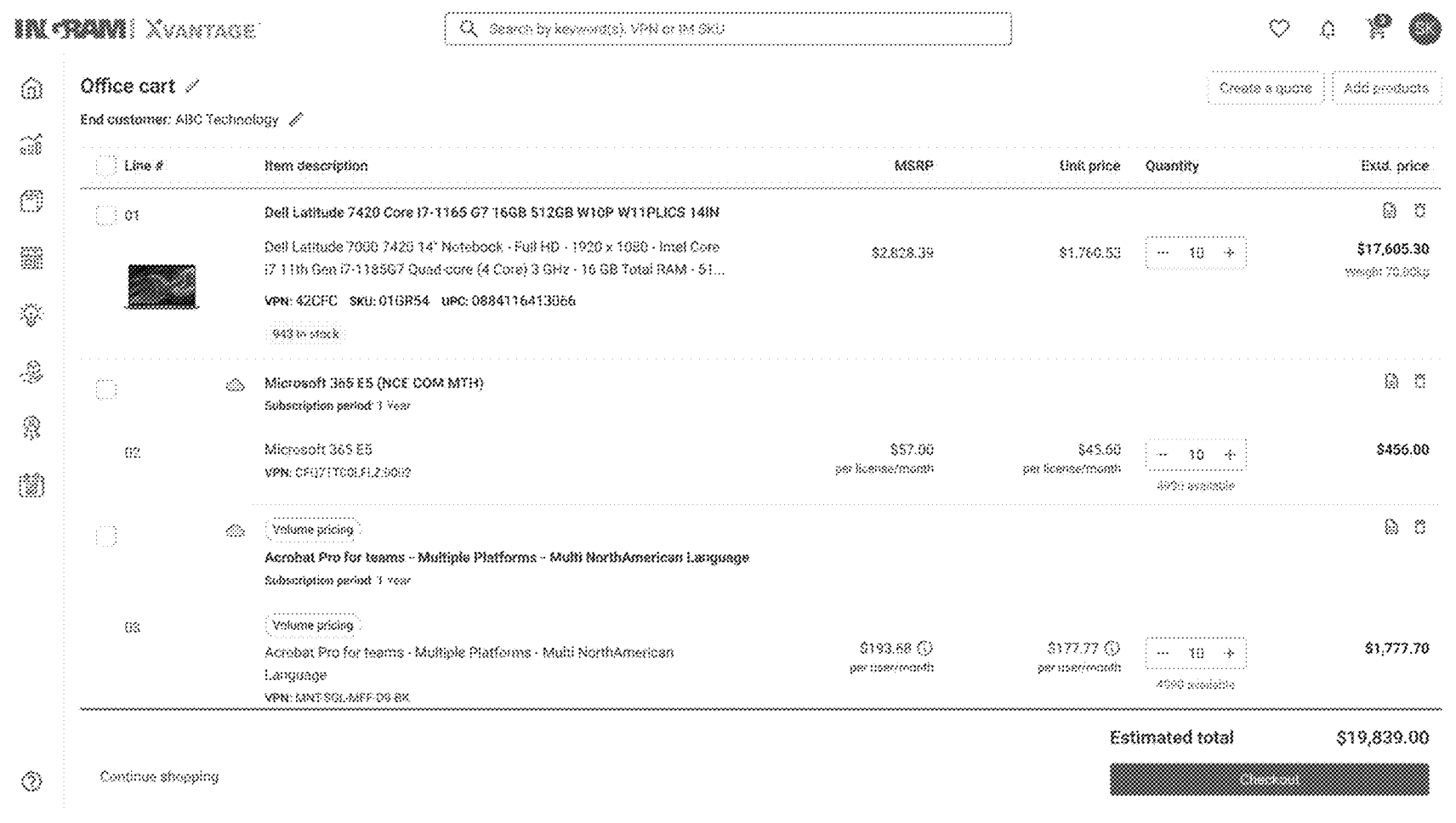
Figure 14N:
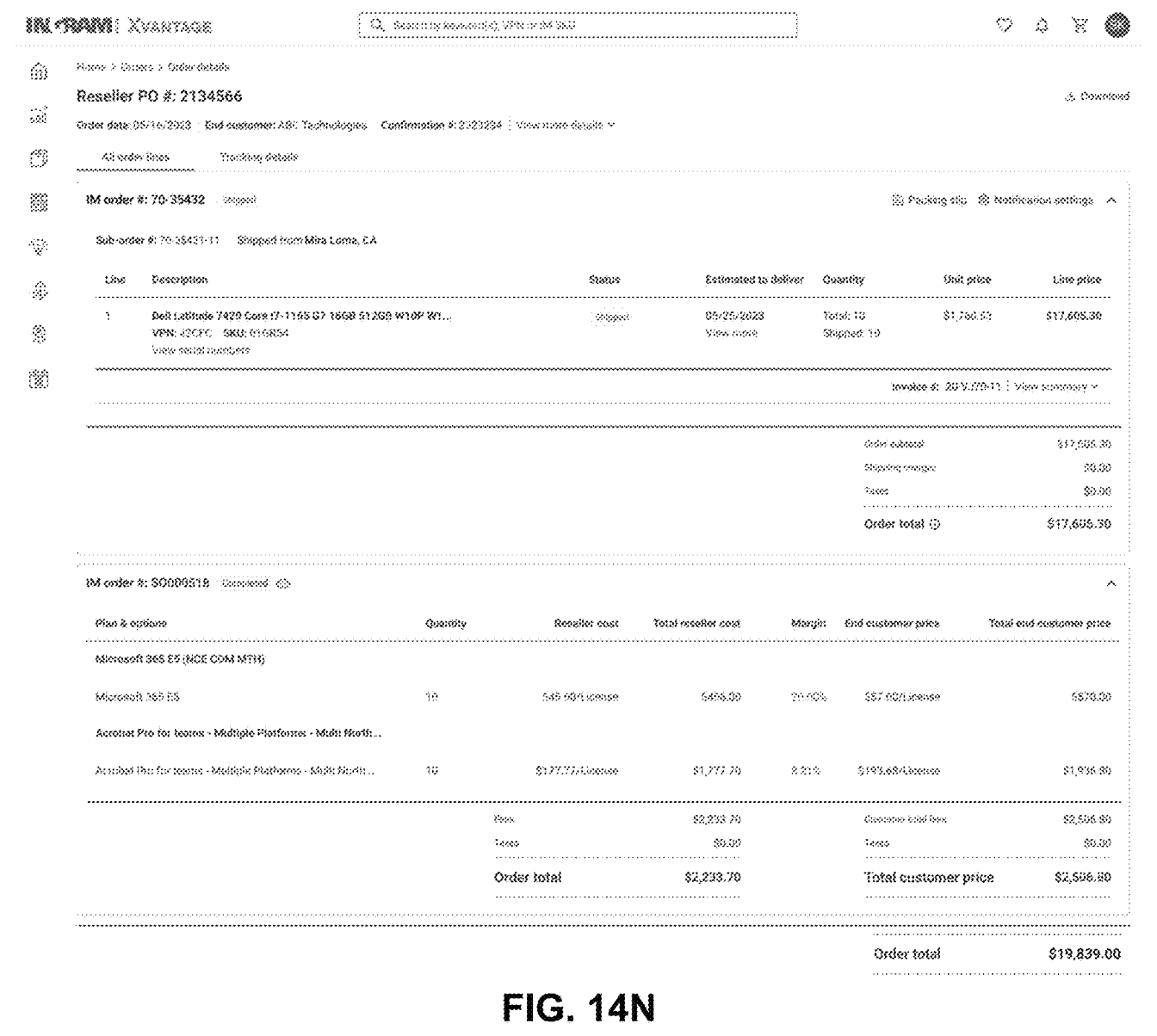

FIGS. 14K and 14L depicts Dashboard Order Summary to display summarized information about orders placed within the supply chain ecosystem. They present key order details, such as order number, customer name, product or subscription information, quantity, and order status. The dashboard provides an overview of order activity, enabling stakeholders to track and manage orders efficiently.

FIG. 14M depicts a Customer Subscription Cart that permits a customer to add, modify, or remove subscription plans. It can display a list of selected subscriptions, pricing, and renewal dates. Customers can manage their subscriptions and make changes according to their preferences and requirements.

FIG. 14N depicts a Customer Order Tracking screen that enables customers to track the status and progress of their orders within the supply chain. It displays real-time updates on order fulfillment, including processing, packaging, and shipping. Customers can monitor the movement of their orders and anticipate delivery times.

Figure 14O:
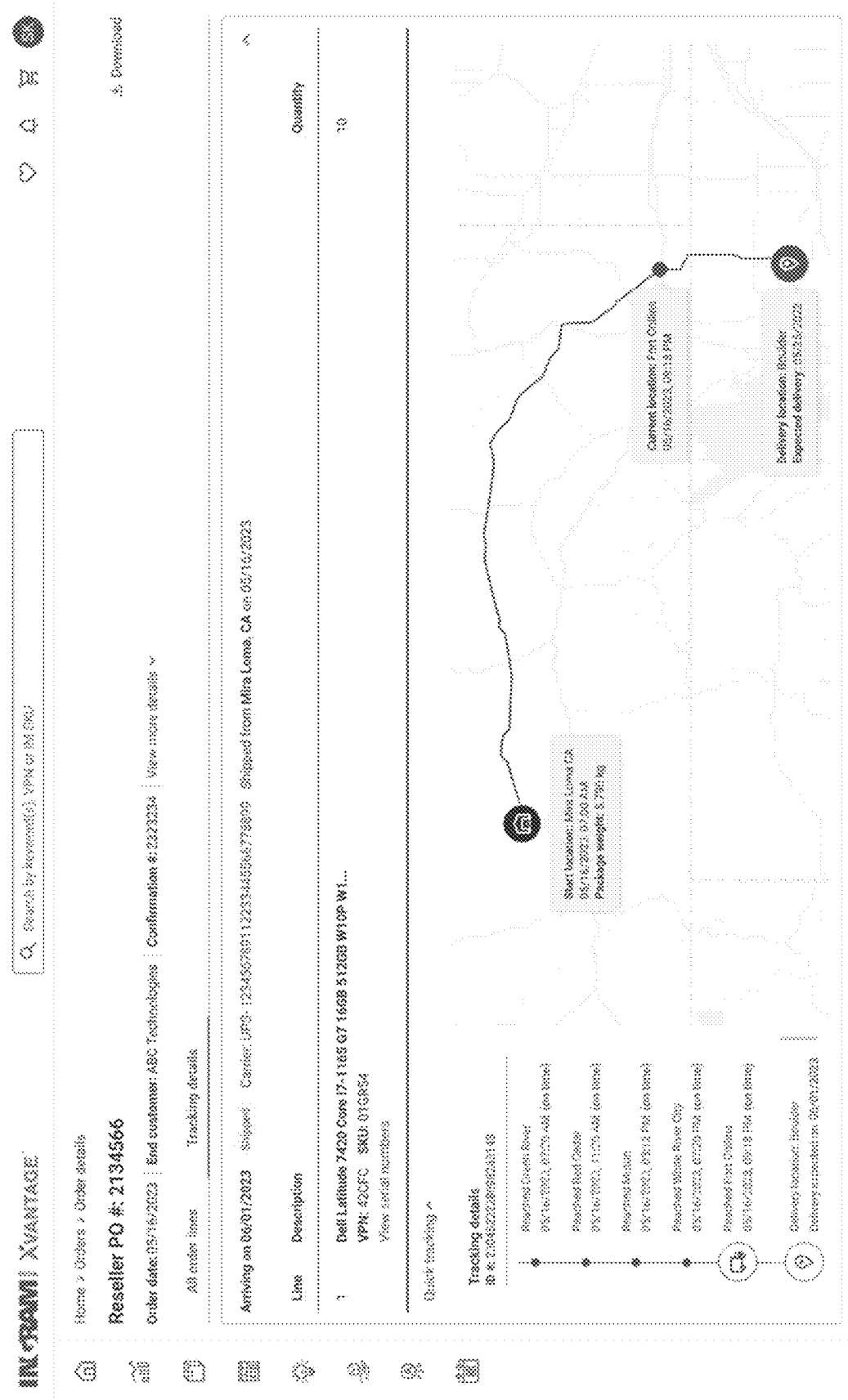
Figure 14P:
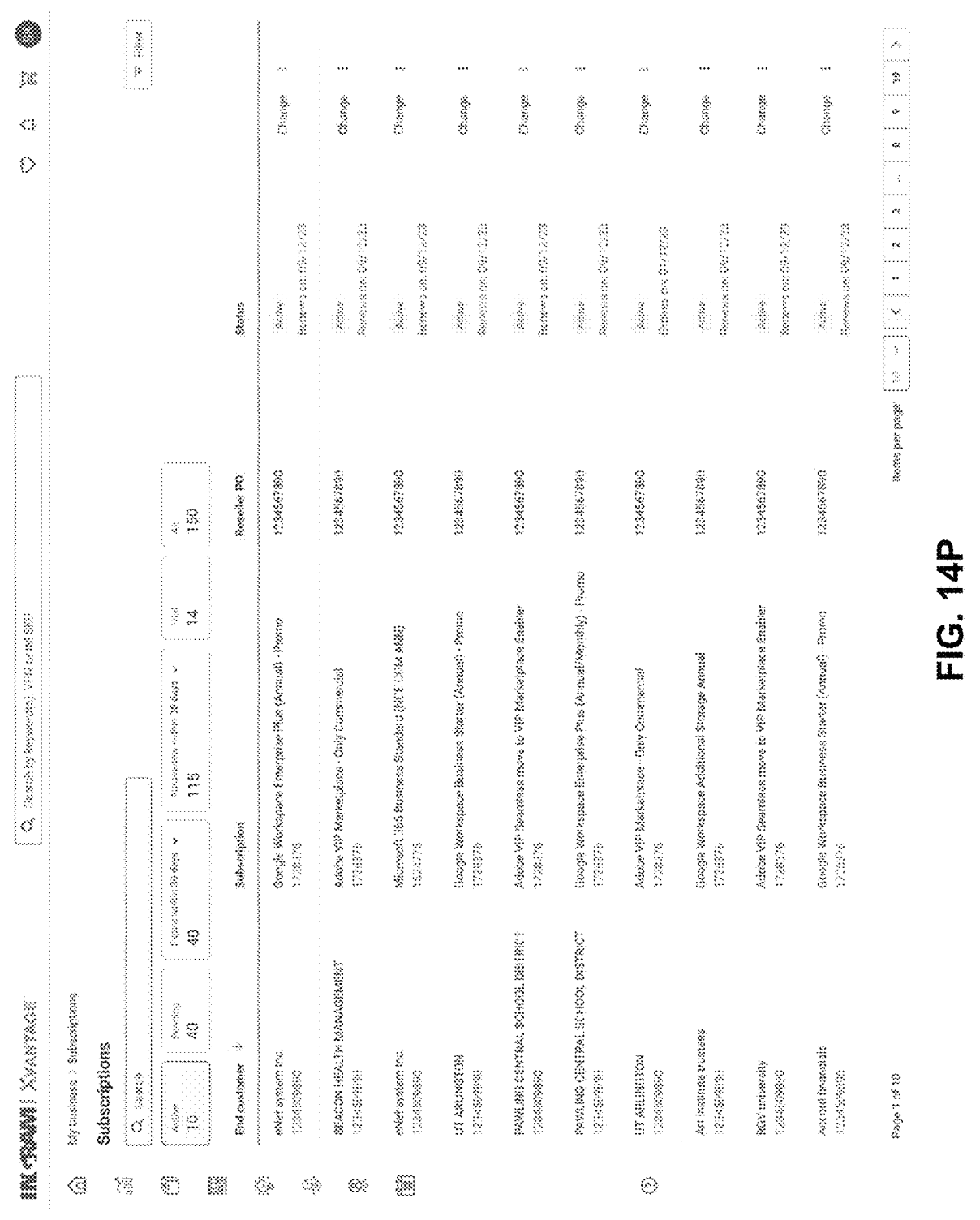
Figure 14Q:
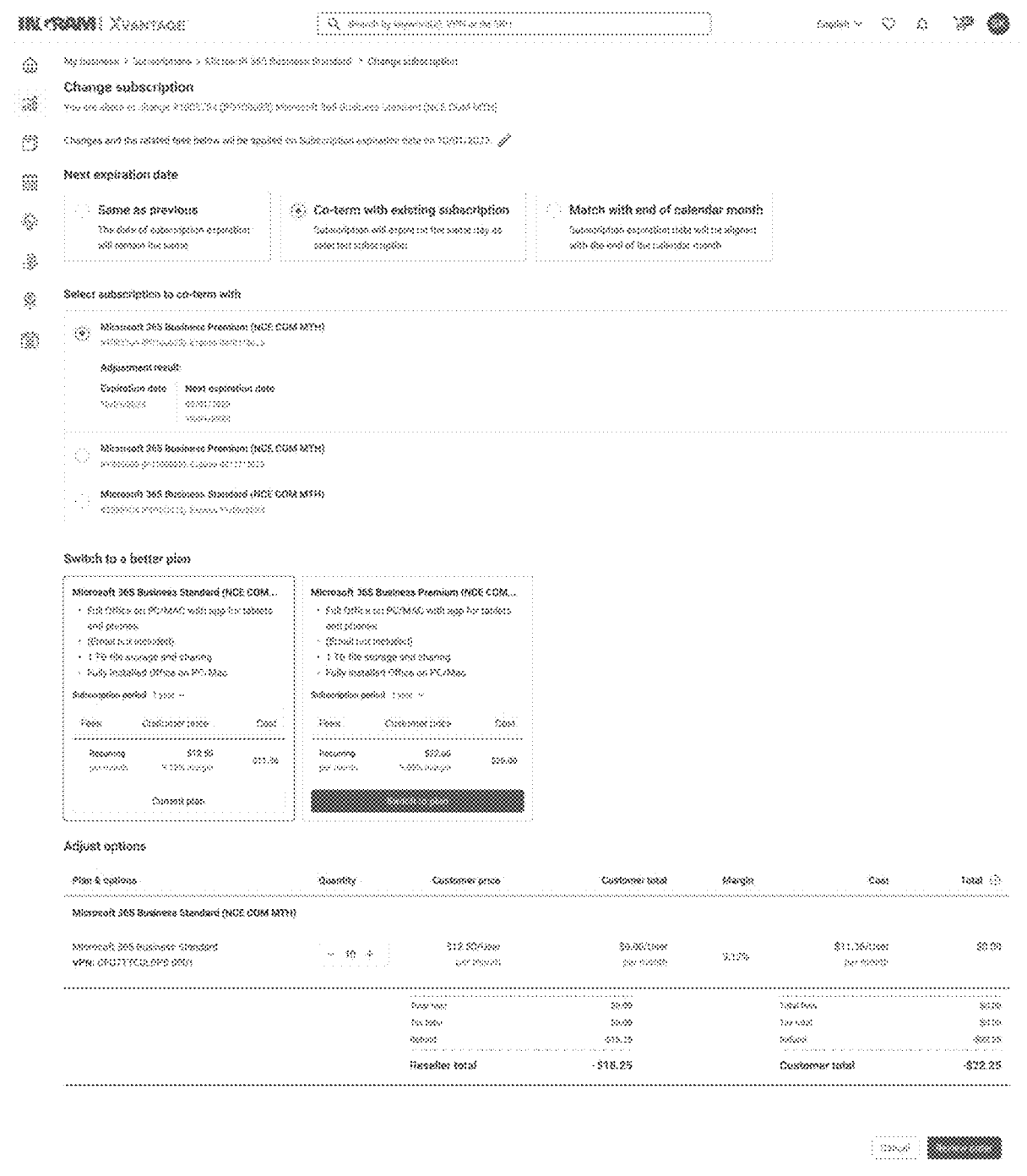

FIG. 14O depicts a Customer Shipment Tracking that provides customers with real-time tracking information about their shipments. It may include details such as the carrier, tracking number, current location, and estimated delivery date. Customers can stay informed about the whereabouts of their shipments.

FIG. 14P depicts a Customer Subscription History, that presents a historical record of the customer's subscription activities. It displays a list of previous subscriptions, including the subscription plan, duration, and status. Customers can review their subscription history, track past payments, and refer to previous subscription details.

FIG. 14Q depicts a Customer Subscription Modifications dialog, that allows customers to modify their existing subscriptions. It offers options to upgrade or downgrade subscription plans, change billing details, or adjust other subscription-related preferences. Customers can manage their subscriptions according to their evolving needs or preferences.

The depicted UI screens are not limiting. In some embodiments the UI screens of FIGS. 14A to 14Q collectively represent the diverse functionalities and features offered by the SPoG UI, providing stakeholders with a comprehensive and user-friendly interface for vendor onboarding, partnership management, customer interaction, order management, subscription management, and tracking within the supply chain ecosystem.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, computer-implemented method may include integrating multiple communication channels (i.e., touchpoints) between the population of users into a unified interactive interface in a computer system, said unified interactive interface herein referred to as a SPoG UI, where the SPoG is a central interface component configured to consolidate user interactions, data, and/or functionalities of the population of users and where the SPoG UI is arranged to facilitate operations across a supply chain ecosystem. Computer-implemented method may also include managing end-to-end lifecycle of the user interactions utilizing the SPoG UI. Method may furthermore include collecting data from said user interactions within the SPoG UI. Method may in addition include analyzing said collected data to generate one or more insights for business growth. Method may moreover include performing one or more artificial intelligence and/or machine learning algorithms to enhance business operations based on the analyzed data. Method may also include incorporating regular updates and improvements into the SPoG UI based on the analyzed data. Method may furthermore include where the population of users may include users selected from two or more diverse groups, the groups having of distributors, resellers, customers, end-customers, vendors, and suppliers. Other embodiments of this aspect include corresponding computer systems, apparatus, and computer programs recorded on one or more computer storage devices, each configured to perform the actions of the methods.

Implementations may include one or more of the following features. Method where the integrating includes establishing communication links with multiple pre-existing business platforms. Method where the consolidated interaction points may include one or more websites, customer relationship management systems, vendor platforms, and supply chain management systems. Method where the managing of end-to-end lifecycle may include one or more of an initial contact, a service fulfillment, and a follow-up interaction. Method where the collecting data may include monitoring and/or logging of user activities within the SPoG UI. Method where the analyzing of collected data is performed using advanced statistical algorithms. Method where the artificial intelligence and machine learning algorithms include predictive analytics to identify market trends. Method where the artificial intelligence and machine learning algorithms include recommendation systems to personalize user interactions. The improvements can be based on analytics and/or the analyzed user feedback received through the SPoG UI. Implementations of the described techniques may include hardware, a method or process, or a computer tangible medium.

In one general aspect, system may include a communication integration module configured to integrate multiple communication channels (i.e., touchpoints). System may also include a consolidation module configured to combine the integrated communication channels into an unified interactive interface, said unified interactive interface herein referred to as a SPoG UI, where the SPoG is a central interface component configured to consolidate user interactions, data, and/or functionalities of the population of users and where the SPoG UI is arranged to facilitate operations across a supply chain ecosystem. System may furthermore include a lifecycle management module configured to manage end-to-end lifecycle of the user interactions within the SPoG. The system may additionally or alternatively include a data collection module configured to automatically collect data from the user interactions within the SPoG. System may moreover include a data analysis module configured to generate one or more insights based on the collected data. System may also include an artificial intelligence module configured to perform one or more AI and/or ML algorithms based on the analyzed data. System may furthermore include where the population of users may include users selected from two or more diverse groups, the groups having distributors, resellers, customers, end-customers, vendors, and suppliers. Other embodiments of this aspect include corresponding computer systems, apparatus, and computer programs recorded on one or more computer storage devices, each configured to perform the actions of the methods.

Systems and methods for automating SKU management can include a user interface configured to receive, from a user, catalog files in two or more diverse formats, a Catalog Transformation module configured to transform the catalog files into a standard format, predicting categorization and attribute mapping for at least one catalog item, wherein the Catalog Transformation module proposes categorization and attribute mapping utilizing iterative learning, a Real-Time Data Mesh (RTDM) module for ensuring real-time data exchange and synchronization across the system components, wherein the RTDM module facilitates real-time interactions between the user and the system, a Master Data Governance (MDG) module for validating the transformed catalogs and communicating any errors back to vendors, a Global Data Repository (GDR) for storing the validated catalogs and maintaining data integrity of the stored catalogs.

The systems and methods can include a Search Platform for indexing and retrieving the stored catalogs. The user interface is a Single Pane of Glass User Interface (SPoG UI). A Dynamic SKU Creation module for generating SKUs in an ERP system for the catalog item, where the catalog item represents one or more non-transactional products, and wherein generating SKUs permits the one or more products to be added to a customer cart. The GDR integrates with the RTDM module to support real-time data synchronization across the system. The MDG module generates an indication to denote one or more errors occurring in a catalog transformation process associated with one or more transformed catalogs. A Global Pricing Engine (GPE) for determining real-time pricing for the catalog item. The GPE determines the price for a product based on one or more of: vendor price files, market trends, and historical pricing data. Implementations may include one or more of the following features. Method where the interactive elements include links to various business platforms. Method where the user interaction includes actions may include one or more clicks, hovers, and input data. Method where the collected data is analyzed using advanced statistical algorithms. Method where the personalized content is generated based on recommendation algorithms. Method may include updating the SPoG UI based on user feedback and data analysis results. Implementations of the described techniques may include hardware, a method or process, or a computer tangible medium It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for automating SKU management, the system comprising:
   a user interface configured to receive, from a user, catalog files in two or more diverse formats;
   a Catalog Transformation module configured to transform the catalog files into a standard format, predicting categorization and attribute mapping for at least one catalog item, wherein the Catalog Transformation module proposes categorization and attribute mapping utilizing iterative learning, wherein the Catalog Transformation module generates SKUs for each of the at least one catalog item, wherein each catalog item represents one or more non-transactional products, enabling the one or more products to be added to a customer cart using a Dynamic SKU Creation module, wherein the Catalog Transformation Module determines real-time pricing for the catalog item using a Global Pricing Engine (GPE), and wherein the GPE dynamically determines the real-time pricing of the at least one catalog item based on one or more of: vendor price files, market trends, and historical pricing data;
   a Real-Time Data Mesh (RTDM) module for ensuring real-time data exchange and synchronization across the system components, wherein the RTDM module facilitates real-time interactions between the user and the system, wherein the RTDM module dynamically adjusts the synchronization intervals for catalog transformations and SKU creations based on detected latency variations;
   a Master Data Governance (MDG) module for validating the transformed catalogs and communicating any errors back to vendors;
   a Global Data Repository (GDR) for storing the validated catalogs and maintaining data integrity of the stored catalogs;
   a Search Platform for indexing and retrieving the stored catalogs.

2. The system of claim 1, wherein the user interface is a Single Pane of Glass User Interface (SPoG UI).

3. The system of claim 1, further comprising a Dynamic SKU Creation module for generating SKUs in an ERP system for the catalog item, wherein the catalog item represents one or more non-transactional products, and wherein generating SKUs permits the one or more products to be added to a customer cart.

4. The system of claim 1, where the GDR integrates with the RTDM module to support real-time data synchronization across the system.

5. The system of claim 1, wherein the MDG module generates an indication to denote one or more errors occurring in a catalog transformation process associated with one or more transformed catalogs.

6. The system of claim 1, further comprising a Global Pricing Engine (GPE) for determining real-time pricing for the catalog item.

7. The system of claim 6, where the GPE determines the price for a product based on one or more of: vendor price files, market trends, and historical pricing data.

8. A computerized method for automating SKU management, the method comprising:
   receiving, from a user, catalog files in two or more diverse formats through a user interface;
   transforming the catalog files into a standard format, predicting categorization and attribute mapping for at least one catalog item utilizing iterative learning using a Catalog Transformation module;
   ensuring real-time data exchange and synchronization across the system components and facilitating real-time interactions between the user and the system using a Real-Time Data Mesh (RTDM) module, wherein the RTDM module dynamically adjusts the synchronization intervals for catalog transformations and SKU creations based on detected latency variations;
   validating the transformed catalogs and communicating any errors back to vendors using a Master Data Governance (MDG) module;
   storing the validated catalogs and maintaining data integrity of the stored catalogs using a Global Data Repository (GDR);
   indexing and retrieving the stored catalogs using a Search Platform;
   generating SKUs in an ERP system for the catalog item, wherein the catalog item represents one or more non-transactional products, enabling the one or more products to be added to a customer cart using a Dynamic SKU Creation module;
   determining real-time pricing for the catalog item using a Global Pricing Engine (GPE), wherein the GPE dynamically determines the real-time pricing of the at least one catalog item based on one or more of: vendor price files, market trends, and historical pricing data.

9. The computerized method of claim 8, wherein the user interface is a Single Pane of Glass User Interface (SPoG UI).

10. The computerized method of claim 8, further including generating SKUs in an ERP system for the catalog item, wherein the catalog item represents one or more non-transactional products, and wherein generating SKUs permits the one or more products to be added to a customer cart.

11. The computerized method of claim 8, where the Global Data Repository (GDR) integrates with the Real-Time Data Mesh (RTDM) module to support real-time data synchronization across the system.

12. The computerized method of claim 8, wherein the Master Data Governance (MDG) module generates an indication to denote one or more errors occurring in a catalog transformation process associated with one or more transformed catalogs.

13. The computerized method of claim 8, further including determining real-time pricing for the catalog item using a Global Pricing Engine (GPE).

14. The computerized method of claim 13, where the GPE determines the price for a product based on one or more of: vendor price files, market trends, and historical pricing data.

15. A non-transitory computer-readable medium having stored thereon a plurality of instructions, the plurality of instructions when executed by a processor, cause the processor to perform operations of:
- receiving, from a user, catalog files in two or more diverse formats through a user interface;
- transforming the catalog files into a standard format, predicting categorization and attribute mapping for at least one catalog item utilizing iterative learning using a Catalog Transformation module;
- ensuring real-time data exchange and synchronization across the system components and facilitating real-time interactions between the user and the system using a Real-Time Data Mesh (RTDM) module, wherein the RTDM module dynamically adjusts the synchronization intervals for catalog transformations and SKU creations based on detected latency variations;
- validating the transformed catalogs and communicating any errors back to vendors using a Master Data Governance (MDG) module;
- storing the validated catalogs and maintaining data integrity of the stored catalogs using a Global Data Repository (GDR);
- indexing and retrieving the stored catalogs using a Search Platform;
- generating SKUs in an ERP system for the catalog item, wherein the catalog item represents one or more non-transactional products, enabling the one or more products to be added to a customer cart using a Dynamic SKU Creation module;
- determining real-time pricing for the catalog item using a Global Pricing Engine (GPE), wherein the GPE dynamically determines the real-time pricing of the at least one catalog item based on one or more of: vendor price files, market trends, and historical pricing data.

16. The CRM of claim 15, wherein the user interface is a Single Pane of Glass User Interface (SPoG UI).

17. The CRM of claim 15, further including generating SKUs in an ERP system for the catalog item, wherein the catalog item represents one or more non-transactional products, and wherein generating SKUs permits the one or more products to be added to a customer cart.

18. The CRM of claim 15, where the Global Data Repository (GDR) integrates with the Real-Time Data Mesh (RTDM) module to support real-time data synchronization across the system.

19. The CRM of claim 15, wherein the Master Data Governance (MDG) module generates an indication to denote one or more errors occurring in a catalog transformation process associated with one or more transformed catalogs.

20. The CRM of claim 15, further including determining real-time pricing for the catalog item using a Global Pricing Engine (GPE), and wherein the GPE determines the price for a product based on one or more of: vendor price files, market trends, and historical pricing data.

* * * * *